(12) United States Patent
Adachi et al.

(10) Patent No.: US 6,533,937 B1
(45) Date of Patent: Mar. 18, 2003

(54) METHODS OF RUNNING AND WASHING SPIRAL WOUND MEMBRANE MODULES

(75) Inventors: Tetsurou Adachi; Masaaki Andou; Hajimu Hisada; Tomomi Ohara; Toshiyuki Kawashima; Ichirou Kawada, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/488,623

(22) Filed: Jan. 20, 2000

(30) Foreign Application Priority Data

| Jan. 22, 1999 | (JP) | 11-014966 |
| Apr. 30, 1999 | (JP) | 11-125232 |
| May 20, 1999 | (JP) | 11-140840 |
| Jun. 4, 1999 | (JP) | 11-158706 |
| Jun. 7, 1999 | (JP) | 11-160144 |

(51) Int. Cl.[7] ............................ B01D 61/00; B01D 63/10
(52) U.S. Cl. .............. 210/636; 210/650; 210/321.74; 210/90; 210/97; 210/257.2
(58) Field of Search .................. 210/321.74, 321.83, 210/493.4, 636, 650, 90, 97, 195.2, 257.2; 264/285

(56) References Cited

U.S. PATENT DOCUMENTS

| 3,992,301 A | * | 11/1976 | Shippey et al. |
| 4,046,685 A | * | 9/1977 | Bray |
| 4,301,013 A | * | 11/1981 | Setti et al. |
| 4,548,714 A | * | 10/1985 | Kirwan, Jr. et al. |
| 4,670,150 A | * | 6/1987 | Hsiung et al. |
| 4,906,372 A | * | 3/1990 | Hopkins |
| 4,988,444 A | * | 1/1991 | Applegate et al. |
| 5,128,037 A | * | 7/1992 | Pearl et al. |
| 5,156,739 A | * | 10/1992 | Dawson et al. |
| 5,192,437 A | * | 3/1993 | Chang et al. |
| 5,230,804 A | * | 7/1993 | Leupold et al. |
| 5,250,118 A | * | 10/1993 | Netwig et al. |
| 5,344,565 A | * | 9/1994 | Degen et al. |
| 5,690,829 A | * | 11/1997 | Lauer |
| 5,690,830 A | * | 11/1997 | Ohtani et al. |
| 5,759,283 A | * | 6/1998 | Ekern et al. |
| 5,766,431 A | * | 6/1998 | Tanaka et al. |
| 6,007,723 A | * | 12/1999 | Ikada et al. |
| 6,139,750 A | * | 10/2000 | Graham |
| 6,402,956 B1 | | 6/2002 | Andou et al. |
| 6,432,310 B1 | | 8/2002 | Andou et al. |

FOREIGN PATENT DOCUMENTS

| JP | 10-165780 | 6/1998 |
| JP | 10-230144 | 9/1998 |
| JP | 11-188245 | 7/1999 |

* cited by examiner

Primary Examiner—Ana Fortuna
(74) Attorney, Agent, or Firm—Akin, Gump, Strauss, Hauer & Feld, L.L.P.

(57) ABSTRACT

A spiral wound type membrane element is formed by covering a spiral membrane component prepared by winding a plurality of independent or continuous envelope-like membranes around the outer peripheral surface of a water collection pipe through raw water spacers with a separation membrane and further covering the same with an outer peripheral passage forming material. In filtration, raw water introduced from a raw water inlet of a spiral wound type membrane module permeates through the separation membrane from at least the outer peripheral side of the spiral wound type membrane element and infiltrates into the clearances between the envelope-like membranes along the raw water spacers. Part of the supplied raw water axially flows along the outer peripheral portion of the spiral wound type membrane element and is thereafter discharged from a raw water outlet of the spiral wound type membrane module, to be returned to a raw liquid tank again. Back wash reverse filtration is performed in washing of the spiral wound type membrane element. The permeate flow rate in filtration, the filtration time, the wash water flow rate in washing and the washing time are set to prescribed values so that the permeate volume in filtration to the permeate volume in back wash reverse filtration is not more than 600.

26 Claims, 27 Drawing Sheets

F I G. 1 1
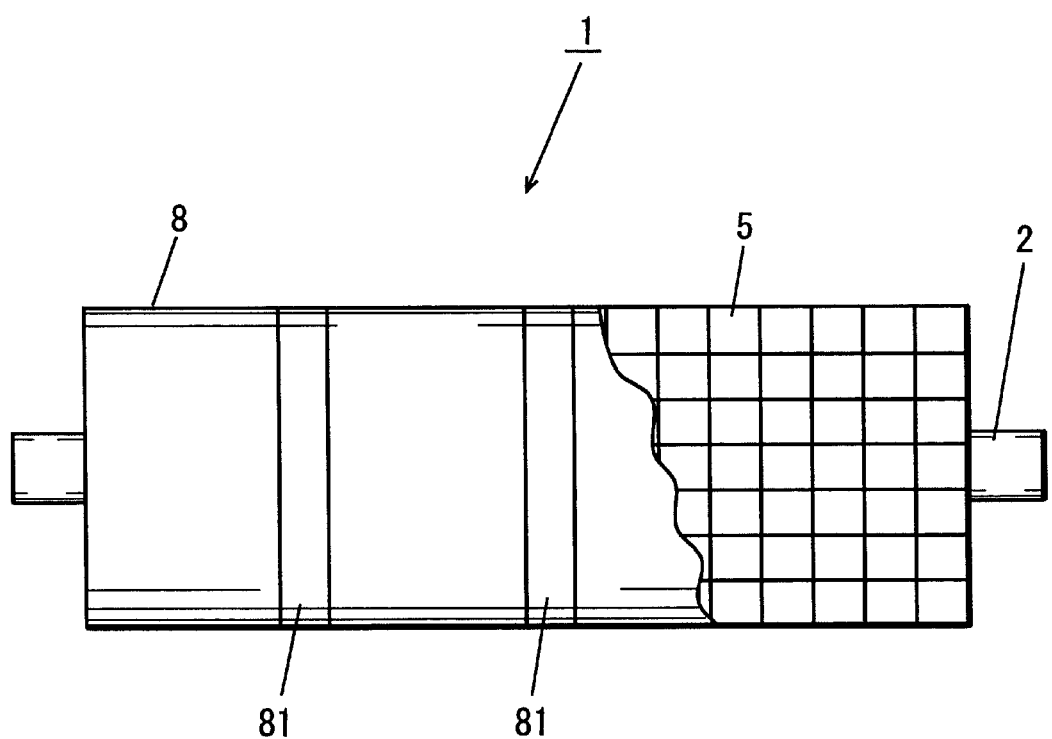

METHODS OF RUNNING AND WASHING SPIRAL WOUND MEMBRANE MODULES

BACKGROUND OF THE INVENTION

1. Field of the Invention

The present invention relates to a spiral wound type membrane element employed for a membrane separation device such as a low-pressure reverse osmosis membrane separation device, an ultrafiltration device or a microfiltration device and methods of running and washing a spiral wound type membrane module.

2. Description of the Background Art

With recent applications of the membrane separation technology to water purification, the membrane separation technology is now applied as pretreatment for reverse osmosis membrane separation systems used desalination of seawater, for example. While a microfiltration membrane and an ultrafiltration membrane attaining high permeate flow rates are generally used for such membrane separation, a reverse osmosis membrane attaining a high permeate flow rate under ultra-low pressures of not more than 10 kgf/cm$^2$ has recently been developed.

As a membrane element used for membrane separation, a hollow fiber membrane element is generally used in consideration of the membrane area (volumetric efficiency) per unit volume. However, the membranes of the hollow fiber membrane element are easy to break, and when the membranes are broken, raw water is mixed into the permeate to disadvantageously lower the separating performance.

On the other hand, a spiral wound type membrane element can provide a large, membrane area. The spiral wound type membrane element, which can maintain high separating performance, is superior in reliability to the hollow fiber membrane element.

FIG. 25 is a partially fragmented perspective view of a conventional spiral wound type membrane element 21, and FIG. 26 is a perspective view showing the appearance of the conventional spiral wound type membrane element 21.

As shown in FIG. 25, the spiral wound type membrane element 21 is formed by superposing separation membranes 26 on both surfaces of a permeate spacer (permeate passage forming member) 25 and bonding three sides thereby forming an envelope-like membrane (bag-like membrane) 23, mounting an opening of the envelope-like membrane 23 on a water collection pipe 22 formed by a perforated hollow pipe and spirally winding the envelope-like membrane 23 on the outer peripheral surface of the water collection pipe 22 with a netty raw water spacer (raw water passage forming member) 24.

The raw water spacer 24 is provided for forming a passage for the raw water along the envelope-like membrane 23. If the thickness of the raw water spacer 24 is small, the separation membranes 26 are clogged with suspended substances although the charging efficiency thereof is increased. In general, therefore, the thickness of the raw water spacer 24 is set to about 0.7 to 3.0 mm.

In relation to treatment of raw water such as river water containing a large quantity of suspended substances, a spiral wound type membrane element employing a zigzag corrugated sheet type raw water spacer (the so-called corrugated spacer) is already known in the art.

As shown in FIG. 26, the outer peripheral surface of the spiral wound type membrane element 21 is covered with a protective sheath 27 made of FRP (Fiber-Reinforced Plastics) or formed by a shrink tube, while packing holders 28 called anti-telescopes are mounted on both ends thereof respectively.

FIG. 27 is a sectional view showing an exemplary method of running the conventional spiral wound type membrane element 21. As shown in FIG. 27, a pressure vessel (pressure-resistant vessel) 30 is formed by a tubular case 31 and a pair of end plates 32a and 32b. The end plate 32a is provided with a raw water inlet 33, and the other plate 32b is provided with a concentrate outlet 35. The end plate 32b is provided on its center with a permeate outlet 34.

The spiral wound type membrane element 21 having a packing 37 mounted on a portion close to an end of the outer peripheral surface is introduced into the tubular case 31, and both opening ends of the tubular case 31 are sealed with the end plates 32a and 32b respectively. One opening end of the water collection pipe 22 is engaged with the permeate outlet 34 of the end plate 32b, while an end cap 36 is attached to the other opening end thereof.

In order to run the spiral wound type membrane element 21, raw water 51 is introduced into a first liquid chamber 38 from the raw water inlet 33 of the pressure vessel 30. As shown in FIG. 27, the raw water 51 is supplied from one end of the spiral wound type membrane element 21. The raw water 51 axially flows along the raw water spacer 24, and is discharged as concentrate 53 from the other end of the spiral wound type membrane element 21. The raw water 51 permeating through the separation membranes 26 along the raw water spacer 24 flows into the water collection pipe 22 as permeate 52 along the permeate spacer 25, and is discharged from the end of the water collection pipe 22.

The permeate 52 is taken out from the permeate outlet 34 of the pressure vessel 30 shown in FIG. 27. The concentrate 53 is taken out from a second liquid chamber 39 of the pressure vessel 30 through the concentrate outlet 35.

When the spiral wound type membrane element 21 is run, the membrane 23 is clogged with suspended substances contained in the raw water 51, to reduce the membrane flux. Therefore, chemical washing is performed for eliminating such clogging and recovering the membrane flux. However, such chemical washing requires much labor and a high cost. In order to prevent clogging, therefore, back wash reverse filtration is periodically performed with permeate or air in a hollow fiber membrane element, for example.

In the conventional spiral wound type membrane element 21, however, back wash reverse filtration results in the following problems:

FIG. 28 is a partially fragmented perspective view showing back wash reverse filtration in the conventional spiral wound type membrane element 21. As shown in FIG. 28, the permeate 52 is introduced from an end of the water collection pipe 22. Since the outer peripheral surface of the envelope-like membrane 23 wound around the water collection pipe 22 is covered with the protective sheath 27, the permeate 52 derived from the outer peripheral surface of the water collection pipe 22 permeates through the envelope-like membrane 23 and axially flows in the spiral wound type membrane element 21 along the raw water spacer 24, and is discharged from the end of the spiral wound type membrane element 21. Despite back wash reverse filtration, therefore, contaminants such as turbid substances causing clogging of the membrane 23 are readily captured by the raw water spacer 24 before discharged from the end of the spiral wound type membrane element 21 and insufficiently removed.

As shown in FIG. 27, further, the clearance between the inner peripheral surface of the tubular case 31 of the pressure vessel 30 and the spiral wound type membrane element 21 defines a dead space S, to cause residence of the fluid (fluid residue). When the spiral wound type membrane element 21 is used over a long period, the fluid residing in the dead space S is denatured. Particularly when the fluid contains organic matter, germs such as microorganisms may propagate to decompose the organic matter and give off a bad smell or decompose the separation membranes 26, leading to reduction of reliability.

In addition, the raw water 51 is supplied from one end of the conventional spiral wound type membrane element 21 and discharged from the other end, and hence the conventional spiral wound type membrane element 21 requires the packing holders 28 for prevent the envelope-like membrane 23 wound around the water collection pipe 22 from being deformed in the form of a bamboo shoot. Further, pressure loss caused by the raw water spacer 24 as well as by clogging results in pressure difference between thee raw water inlet side and the concentrate outlet side, to deform the spiral wound type membrane element 21. In order to prevent such deformation, the outer peripheral surface of the envelope-like membrane 23 wound around the water collection pipe 22 is covered with the protective sheath 27 made of FRP or formed by a shrink tube. Thus, the component cost and the manufacturing cost are increased.

In order to prevent formation of cake with contaminants contained in the raw water 51, further, it is necessary to attain a sufficient linear velocity on the membrane surface with a sufficient flow rate on the concentrate side. When the flow rate is increased on the concentrate side, however, recovery per spiral wound type membrane element is reduced while a large pump is required for supplying the raw water 51, to remarkably increase the system lost.

SUMMARY OF THE INVENTION

An object of the present invention is to provide a highly reliable spiral wound type membrane element which can reduce the cost and is easy to wash, and a method of running a spiral wound type membrane module.

Another object of the present invention is to provide a washing method capable of readily and reliably removing contaminants captured by a spiral wound type membrane element.

(1) First Invention

In a method of running a spiral wound type membrane element according to an aspect of the first invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element and taking out a permeated liquid from at least one opening end of the perforated hollow pipe in running, and introducing a washing liquid from at least one opening end of the perforated hollow pipe and discharging the washing liquid derived from the outer peripheral surface of the perforated hollow pipe from at least the outer peripheral portion of the spiral wound type membrane element in washing.

According to the method of running a spiral wound type membrane element, the raw liquid is supplied from at least the outer peripheral side of the spiral wound type membrane element in running. In this case, contaminants are captured on at least the outer peripheral portion of the spiral wound type membrane element.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element from the system in back wash reverse filtration. Therefore, the separated contaminants are discharged with the washing liquid. Thus, the contaminants captured on the membrane surface and at least the outer peripheral portion of the spiral wound type membrane element can be uniformly removed for regularly maintaining a stable permeate flow rate in running.

No dead space is defined in the clearance between the spiral wound type membrane element and the pressure vessel, to allow no residence of a fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

The running method may further comprise a step of discharging the washing liquid from at least the outer peripheral portion of the spiral wound type membrane element and thereafter axially feeding a raw liquid along the outer peripheral portion of the spiral wound type membrane element in washing. Thus, contaminants adhering to at least the outer peripheral portion of the spiral wound type membrane element can be readily separated while the contaminants separated from the spiral wound type membrane element can be readily and reliably discharged from the system.

Alternatively, the running method may further comprise a step of axially feeding a raw liquid along the outer peripheral portion of the spiral wound type membrane element before introducing the washing liquid from at least one opening end of the perforated hollow pipe. Also in this case, contaminants adhering to the outer peripheral portion of the spiral wound type membrane element can be readily separated and the contaminants separated from the spiral wound type membrane element can be readily and reliably discharged from the system.

Alternatively, the running method may further comprise a step of axially feeding a raw liquid along the outer peripheral portion of the spiral wound type membrane element in parallel with introduction of the washing liquid from at least one opening end of the perforated hollow pipe. Also in this case, contaminants adhering to the outer peripheral portion of the spiral wound type membrane element can be readily separated and the contaminants separated from the spiral wound type membrane element can be readily and reliably discharged from the system.

In the running method, the liquid-permeable material of the spiral wound type membrane element may be a separation membrane. In this case, the raw liquid is supplied from at least the outer peripheral side of the spiral wound type membrane element and the outer peripheral portion of the spiral membrane component is covered with the separation membrane, whereby contaminants are captured on the separation membrane covering at least the outer peripheral portion of the spiral wound type membrane element. Therefore, the contaminants can be uniformly removed, by back wash reverse filtration with permeate or the like, for example.

Further, only contaminants smaller than the pore size of the separation membrane covering the outer peripheral portion infiltrate into the clearances between the envelope-like membranes forming the spiral membrane component, whereby loads on the envelope-like membranes are reduced to enable stable running over a long period.

In addition, the separation membrane may be a microfiltration membrane. In this case, contaminants larger than the pore size of the microfiltration membrane are captured on the outer peripheral portion of the spiral membrane component, not to infiltrate into the spiral membrane component.

The separation membrane may be an ultrafiltration membrane. In this case, contaminants larger than the pore size of the ultrafiltration membrane are captured on the outer peripheral portion of the spiral membrane component, not to infiltrate into the spiral membrane component.

In the running method, the liquid-permeable material forming the spiral wound type membrane element may be a net. Even if contaminants captured on the outer peripheral portion of the spiral membrane component increase back pressure caused in back wash reverse filtration, the net covering the outer peripheral portion prevents the spiral membrane component from swelling, not to increase the spaces between the envelope like membranes in this case. Thus, the envelope-like membranes are prevented from breakage resulting from swelling, so that contaminants contained in the raw liquid do not leak into the permeated liquid.

The net may be made of synthetic resin or metal.

The net preferably has at least three meshes and not more than 200 meshes. Thus, the spiral membrane component can be reliably inhibited from swelling caused by back pressure in back wash reverse filtration, and the raw liquid can be sufficiently supplied to the clearances between the envelope-like membranes forming the spiral membrane component from the outer peripheral side in running.

In the running method, a prescribed portion of the net covering the outer peripheral portion of the spiral membrane component may be reinforced with resin along the circumferential direction. Thus, even if high back pressure is caused in back wash reverse filtration, the net covering the outer peripheral portion reliably prevents the spiral membrane component from swelling.

In the running method, the spiral wound type membrane component may further include a permeate passage forming member inserted between the envelope-like membranes and extended outward from the outer peripheral side of the envelope-like membranes so that the extended portion of the permeate passage forming member is wound around the outer peripheral surface of the spiral membrane component as a net.

In this case, the spiral membrane component can be prevented from swelling caused, by back pressure in back wash reverse filtration while suppressing an additional component cost.

In the running method, the thickness of the outer peripheral passage forming member of the spiral wound type membrane element may particularly be at least 0.6 mm and not more than 30 mm. Thus, contaminants adhering to at least the outer peripheral portion of the spiral wound type membrane element can be discharged from the system in back wash reverse filtration while maintaining high volumetric efficiency of the spiral wound type membrane element with respect to the pressure vessel.

In the running method, the outer peripheral passage forming member may be so arranged that a raw liquid substantially linearly flows substantially in parallel with the axial direction of the perforated hollow pipe. Thus, contaminants adhering to the outer peripheral portion of the spiral wound type membrane element can be substantially linearly washed away substantially in parallel with the axial direction of the perforated hollow pipe with the raw liquid with small pressure loss in back wash reverse filtration of the spiral wound type membrane element. Therefore, the contaminants adhering to the outer peripheral portion of the spiral wound type membrane element can be readily and reliably discharged from the system.

The outer peripheral passage forming member may be formed by a netty passage forming member. In this case, the netty passage forming member sufficiently protects the outer peripheral portion of the spiral wound type membrane element and prevents the spiral wound type membrane element from spreading between the envelope-like membranes on the outer peripheral portion thereof. Further, the raw liquid can readily infiltrate into the clearances between the envelope-like membranes through the netty passage forming member from the outer peripheral portion of the spiral wound type membrane element. Thus, handleability of the spiral wound type membrane element is further improved and it is possible to efficiently supply the raw liquid between the envelope-like membranes while reliably capturing contaminants on the outer peripheral portion of the spiral wound type membrane element.

In the running method, the discharging step may include using a permeated liquid as the washing liquid.

In a method of running a spiral wound type membrane element according to another aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element for performing dead end filtration and taking out a permeated liquid from at least one opening end of the perforated hollow pipe.

According to the method of running a spiral wound type membrane element, the raw liquid is supplied from at least the outer peripheral side of the spiral wound type membrane element, for performing dead end filtration. In this case, contaminants are captured on the membrane surface and at least the outer peripheral portion of the spiral wound type membrane element, and the supplied raw liquid can be recovered as the permeated liquid with recovery of 100% in theory.

Further, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid while the scale of the equipment can be reduced due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

The aforementioned method of running a spiral wound type membrane element is particularly effective for treating a raw liquid having low turbidity (content of contaminants).

The running method may further comprise a step of introducing a washing liquid from at least one opening end of the perforated hollow pipe and discharging the washing liquid derived from the outer peripheral surface of the perforated hollow pipe through at least the outer peripheral portion of the spiral wound type membrane element in washing.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element from the system in back wash reverse filtration. Thus, the separated contaminants are discharged with the washing liquid. Therefore, the contaminants captured on the membrane surface and at least the outer peripheral portion of the spiral wound type membrane element can be uniformly removed and a constant permeate flow rate can be regularly maintained in running.

In a method of running a spiral wound type membrane element according to still another aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element while regularly or periodically feeding a partial raw liquid axially along the outer peripheral portion of the spiral wound type membrane element and taking out a permeated liquid from at least one opening end of the perforated hollow pipe.

According to the method of running a spiral wound type membrane element, the raw liquid is supplied from at least the outer peripheral side of the spiral wound type membrane element for performing filtration. In this case, contaminants are captured on at least the outer peripheral portion of the spiral wound type membrane element. It is possible to inhibit contaminants contained in the raw liquid from adhering to at least the outer peripheral portion of the spiral wound type membrane element by regularly or periodically forming a flow of the raw liquid axially along the outer peripheral portion of the spiral wound type membrane element. Thus, the spiral wound type membrane element can be stably run over a long period.

A flow of the raw liquid is axially formed in the clearance between the spiral wound type membrane element and the pressure vessel, whereby no dead space is defined to allow no residence of a fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

The aforementioned method of running a spiral wound type membrane element is particularly effective for treating a raw liquid having high turbidity (content of contaminants).

In the running method, the supplying step may include a step of returning the partial raw liquid to the supply side again. In this case the partial raw liquid is regularly or periodically fed axially along the outer peripheral portion of the spiral wound type membrane element, whereby it is possible to inhibit contaminants contained in the raw liquid from adhering to at least the outer peripheral portion of the spiral wound type membrane element.

The discharged raw liquid is circulated, whereby the supplied raw liquid can be recovered as the permeated liquid with recovery of 100% in theory.

The aforementioned method of running a spiral wound type membrane element is particularly effective for obtaining a permeated liquid from a raw liquid having high turbidity with high recovery.

In a method of washing a spiral wound type membrane element according to a further aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of introducing a washing liquid from at least one opening end of the perforated hollow pipe and discharging the washing liquid derived from the outer peripheral surface of the perforated hollow pipe through at least the outer peripheral portion of the spiral wound type membrane element.

In the aforementioned spiral wound type membrane element, at least the outer peripheral portion is not covered with a protective sheath but brought into an open state, whereby a raw liquid can be supplied from at least the outer peripheral side of the spiral wound type membrane element for performing filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from the system with the washing liquid. Thus, the contaminants captured on the membrane surface and at least the outer peripheral portion of the spiral wound type membrane element can be uniformly removed.

The washing method may further comprise a step of axially feeding a raw liquid along the outer peripheral portion of the spiral wound type membrane element after discharging the washing liquid from at least the outer peripheral portion of the spiral wound type membrane element. Thus, contaminants adhering to the outer peripheral portion of the spiral wound type membrane element can be readily separated and the contaminants separated from the spiral wound type membrane element can be readily and reliably discharged from the system.

Alternatively, the washing method may further comprise a step of axially feeding a raw liquid along the outer peripheral portion of the spiral wound type membrane element before introducing the washing liquid from at least one opening end of the perforated hollow pipe. Also in this case, contaminants adhering to the outer peripheral portion of the spiral wound type membrane element can be readily separated and the contaminants separated from the spiral wound type membrane element can be readily and reliably discharged from the system.

Alternatively, the washing method may further comprise a step of axially feeding a raw liquid along the outer peripheral portion of the spiral wound type membrane element in parallel with introduction of the washing liquid from at least one opening end of the perforated hollow pipe. Also in this case, contaminants adhering to the outer peripheral portion of the spiral wound type membrane element can be readily separated and the contaminants separated from the spiral wound type membrane element cane be readily and reliably discharged from the system.

In a method of running a spiral wound type membrane module according to a further aspect of this invention, the spiral wound type membrane module comprises a pressure vessel having a raw liquid inlet and a raw liquid outlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element through the raw liquid inlet of the pressure vessel and taking out a permeated liquid from at least one opening end of the perforated hollow pipe in running, and introducing a washing liquid from at least one opening end of the perforated hollow pipe, discharging the washing liquid derived from the outer peripheral surface of the perforated hollow pipe from at least the outer peripheral portion of the spiral wound type membrane element and taking out the washing liquid from the pressure vessel through the raw liquid inlet or the raw liquid outlet in washing.

According to the method of running a spiral wound type membrane module, the raw liquid is supplied from at least the outer peripheral side of the spiral wound type membrane element in running. In this case, contaminants are captured on at least the outer peripheral portion of the spiral wound type membrane element.

When the washing liquid is introduced from at least one opening end of the perforated hollow pipe of the spiral wound type membrane element in the spiral wound type membrane module, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged from the spiral wound type membrane module with the washing liquid. Therefore, the contaminants captured on the membrane surface and at least the outer peripheral portion of the spiral wound type membrane element can be uniformly removed and a constant permeate flow rate can be regularly maintained in running.

No dead space is defined in the clearance between the spiral wound type membrane element and the pressure vessel, to allow no residence of a fluid in the clearance between the spiral wound type membrane element and the pressure vessel. Also when employing the spiral wound type membrane module for separating a fluid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions With no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

In a method of running a spiral wound type membrane module according to a further aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element through the raw liquid inlet of the pressure vessel for performing dead end filtration and taking out a permeated liquid from at least one opening end of the perforated hollow pipe.

According to the method of running a spiral wound type membrane module, the raw liquid is supplied from at least the outer peripheral side of the spiral wound type membrane element for performing dead end filtration. In this case, contaminants are captured on at least the outer peripheral portion of the spiral wound type membrane element, and the supplied raw liquid can be recovered as the permeated liquid with recovery of 100% in theory.

No dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid while the scale of the equipment can be reduced due to dead end filtration. Thus, the system cost is reduced.

Pressure is applied to the spiral wound type membrane element from all directions, whereby the spiral wound type membrane element is not deformed even if the raw liquid is supplied under high pressure. Thus, high pressure resistance is attained.

The aforementioned method of running a spiral wound type membrane module is particularly effective for treating a raw liquid having low turbidity (content of contaminants).

In a method of running a spiral wound type membrane module according to a further aspect of this invention, the spiral wound type membrane module comprises a pressure vessel having a raw liquid inlet and a raw liquid outlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element through the raw liquid inlet of the pressure vessel while regularly or periodically feeding a partial raw liquid axially along the outer peripheral portion of the spiral wound type membrane element for taking out the partial raw liquid from the pressure vessel through the raw liquid outlet and taking out a permeated liquid from at least one opening end of the perforated hollow pipe.

According to the method of running a spiral wound type membrane module, the raw liquid is supplied from at least the outer peripheral side of the spiral wound type membrane element for performing filtration. In this case, contaminants are captured on the membrane surface and at least the outer peripheral portion of the spiral wound type membrane element. It is possible to inhibit contaminants contained in the raw liquid from adhering to at least the outer peripheral portion of the spiral wound type membrane element by regularly or periodically forming a flow of the raw liquid axially along the outer peripheral portion of the spiral wound type membrane element. Thus, the spiral wound type membrane module can be stably run over a long period.

A flow of the raw liquid is axially formed in the clearance between the spiral wound type membrane element and the pressure vessel, whereby no dead space is defined to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

The aforementioned method of running a spiral wound type membrane module is particularly effective for treating a raw liquid having high turbidity.

In the running method, the supplying step may include a step of supplying the raw liquid taken out from the pressure vessel through the raw liquid inlet again. In this case, the partial raw liquid is regularly or periodically fed axially along the outer peripheral portion of the spiral wound type membrane element, whereby it is possible to inhibit contaminants contained in the raw liquid from adhering to at least the outer peripheral portion of the spiral wound type membrane element.

Further, the discharged raw liquid is circulated, whereby the supplied raw liquid can be recovered as the permeated liquid with recovery of 100% in theory.

The aforementioned method of running a spiral wound type membrane module is particularly effective for obtaining a permeated liquid from a raw liquid having high turbidity with high recovery.

In a method of washing a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of introducing a washing liquid from at least one opening end of the perforated hollow pipe and discharging the washing liquid derived from the outer peripheral surface of the perforated hollow pipe through at least the outer peripheral portion of the spiral wound type membrane element for taking out the washing liquid from the pressure vessel.

In the spiral wound type membrane element of the aforementioned spiral wound type membrane module, at least the outer peripheral portion is not covered with a protective sheath but brought into an open state, whereby a raw liquid can be supplied from at least the outer peripheral side of the spiral wound type membrane element for performing filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from the system with the washing liquid. Thus, the contaminants captured on the membrane surface and at least the outer peripheral portion of the spiral wound type membrane element can be uniformly removed.

(2) Second Invention

In a method of running a spiral wound type membrane element according to an aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying raw liquid from at least the outer peripheral side of the spiral wound type membrane element and taking out a permeated liquid from at least one opening end of the perforated hollow pipe in running, introducing a washing liquid from at least one opening end of the perforated hollow pipe and discharging the washing liquid derived from the outer peripheral surface of the perforated hollow pipe through at least the outer peripheral portion of the spiral wound type membrane element in washing, and setting the ratio of the volume of the permeated liquid permeating through the envelope-like membranes in the running period to the volume of the washing liquid permeating through the envelope-like membranes in the washing period to not more than 600.

According to the method of running a spiral wound type membrane element, the raw liquid is supplied from at least the outer peripheral side of the spiral wound type membrane element in running, for performing dead end filtration. In this case, contaminants are captured on at least the outer peripheral portion of the spiral wound type membrane element.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to at least the outer peripheral portion of the spiral wound type membrane element from the system in back wash reverse filtration. Therefore, the separated contaminants are discharged from the system with the washing liquid. Thus, contaminants captured on at least the outer peripheral portion of the spiral wound type membrane element can be uniformly removed for regularly maintaining a stable permeate flow rate in running.

Further, it is possible to prevent a separation membrane from application of an excessive load, remove contaminants adhering to the outer peripheral portion by performing sufficient washing, and stably run the spiral wound type membrane element over a long period with high filtration efficiency by setting the ratio of the volume of the permeated liquid permeating through the envelope-like membranes in the running period to the volume of the washing liquid permeating through the envelope like membranes in the washing period to not more than 600.

It is preferable to supply the raw liquid so that the permeate flow rate in filtration is at least $0.5 \text{ m}^3/\text{m}^2/\text{day}$ and not more than $2.0 \text{ m}^3/\text{m}^2/\text{day}$, and set the filtration time to at least 10 minutes and not more than 300 minutes. Further, it is preferable to introduce the washing liquid into the perforated hollow pipe so that the washing liquid flow rate in washing is at least $1.0 \text{ m}^3/\text{m}^2/\text{day}$ and not more than $4.0 \text{ m}^3/\text{m}^2/\text{day}$, and set the washing time to at least 10 seconds and not more than 300 seconds. In such ranges, the permeate flow rate in filtration, the filtration time, the washing liquid flow rate in washing land the washing time are so set that the ratio of the volume of the permeated liquid permeating through the envelope-like membranes in the running period to the volume of the washing liquid permeating through the envelope-like membranes in the washing period is not more than 600.

In particular, it is more preferable to supply the raw liquid so that the permeate flow rate in filtration is at least 0.5 $\text{m}^3/\text{m}^2/\text{day}$ and not more than $2.0 \text{ m}^3/\text{m}^2/\text{day}$, and set the filtration time to at least 10 minutes and not more than 30 minutes. Further, it is more preferable to introduce the washing liquid into the perforated hollow pipe so that the washing liquid flow rate in washing is at least $1.0 \text{ m}^3/\text{m}^2/\text{day}$ and not more than $3.0 \text{ m}^3/\text{m}^2/\text{day}$, and set the washing time to at least 30 seconds and not more than 60 seconds. In this case, the ratio of the volume of the permeated liquid permeating through the envelope like membranes in the running period to the volume of the washing liquid permeating through the envelope-like membranes in the washing period is not more than 120.

It is possible to prevent the separation membrane from application of an excessive load while the outer peripheral portion is prevented from sedimentation of contaminants so that the spiral wound type membrane element can be stably run over a long period by setting the permeate flow rate in filtration and the filtration time as described above. Further, it is possible to efficiently obtain a target permeate flow rate.

Further, it is possible to sufficiently separate contaminants adhering to the outer peripheral portion so that the spiral wound type membrane element can be stably run continuously over a long period while reduction of filtration efficiency can be suppressed by setting the washing liquid flow rate in washing and the washing time as described above.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions width no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

In the running method, the discharging step may include using a permeated liquid as the washing liquid.

In a method of washing a spiral wound type membrane element according to another aspect of this invention, the spiral wound type membrane element comprises a spiral membrane component including a perforate hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of taking out a permeated liquid by filtration and thereafter introducing a washing liquid from at least one opening end of the perforated hollow pipe for discharging the washing liquid derived from the outer peripheral surface of the perforated hollow pipe through at least the outer peripheral portion of, the spiral wound type membrane element, and setting the ratio of the volume of the permeated liquid permeating through the envelope-like membranes in filtration to the volume of the washing liquid permeating through the envelope-like membranes in washing to not more than 600.

In the aforementioned spiral wound type membrane element, at least the outer peripheral portion is not covered with a protective sheath but brought into an open state, whereby a raw liquid can be supplied from at least the outer peripheral side of the spiral wound type membrane element for performing dead end filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on at least the outer peripheral portion of the spiral wound type membrane element are separated from the spiral wound type membrane element and discharged from the system with the washing liquid. Thus, the contaminants captured on at least the outer peripheral portion of the spiral wound type membrane element can be uniformly removed.

Further, it is possible to prevent a separation membrane from application of excessive load, remove contaminants adhering to the outer peripheral portion by performing sufficient washing, and stably run the spiral wound type membrane element over a long period with high filtration efficiency by setting the ratio of the volume of the permeated liquid permeating through the envelope-like membranes in filtration to the volume of the washing liquid permeating through the envelope like membranes in washing to not more than 600.

It is preferable to introduce the washing liquid into the perforated hollow pipe so that the washing liquid flow rate in washing is at least $1.0$ $m^3/m^2/day$ and not more than $4.0$ $m^3/m^2/day$ and set the washing time to at least 10 seconds and not more than 300 seconds when supplying the raw liquid so that the permeate flow rate in filtration is at least $0.5$ $m^3/m^2/day$ and not more than $2.0$ $m^3/m^2/day$ while setting the filtration time to at least 10 minutes and not more than 300 minutes.

In particular, it is more preferable to introduce the washing liquid into the perforated hollow pipe so that the washing liquid flow rate in washing is at least $1.0$ $m^3/m^2/day$ and not more than $3.0$ $m^3/m^2/day$, set the washing time to at least 30 seconds and not more than 60 seconds and set the ratio of the volume of the permeated liquid permeating through the envelope-like membranes in filtration to the volume of the washing liquid permeating through the envelope-like membranes in washing to not more than 120 when supplying the raw liquid so that the permeate flow rate in filtration is at least $0.5$ $m^3/m^2/day$ and not more than $2.0$ $m^3/m^2/day$ and setting the filtration time to at least 10 minutes and not more than 30 minutes.

Thus, it is possible to sufficiently separate contaminants adhering to the outer peripheral portion so that the spiral wound type membrane element can be stably run continuously over a long period and reduction of filtration efficiency can be suppressed.

In a method of running a spiral wound type membrane module according to still another aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passages forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element through the raw liquid inlet of the pressure vessel and taking out a permeated liquid from at least one opening end of the perforated hollow pipe in running, introducing a washing liquid from at least one opening end of the perforated hollow pipe and discharging the washing liquid derived from the outer peripheral surface of the perforated hollow pipe through at least the outer peripheral portion of the spiral wound type membrane element for taking out the washing liquid from the pressure vessel through the raw liquid inlet in washing, and setting the ratio of the volume of the permeated liquid permeating through the envelope-like membranes in the running period to the volume of the washing liquid permeating through the envelope-like membranes in the washing period to not more than 600.

According to the method of running a spiral wound type membrane module, the raw liquid is supplied from at least the outer peripheral side of the spiral wound type membrane element for performing dead end filtration in running. In this case, contaminants are captured on at least the outer peripheral portion of the spiral wound type membrane element.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to at least the outer peripheral portion of the spiral wound type membrane element from the system in back wash reverse filtration. Therefore, the separated contaminants are discharged from the system with the washing liquid. Thus, the contaminants captured on at least the outer peripheral portion of the spiral wound type membrane element can be uniformly removed for regularly maintaining a stable permeate flow rate in running.

Further, it is possible to prevent a separation membrane from application of an excessive load, remove contaminants adhering to the outer peripheral portion by performing sufficient washing, and stably run the spiral wound type membrane module over a long period with high filtration efficiency by setting the ratio of the volume of the permeated liquid permeating through the envelope-like membranes in the running period to the volume of the washing liquid permeating through the envelope-like membranes in the washing period to not more than 600.

It is preferable to supply the raw liquid so that the permeate flow rate infiltration is at least 0.5 m$^3$/m$^2$/day and not more than 2.0 m$^3$/m$^2$/day, and set the filtration time to at least 10 minutes and not more than 300 minutes. Further, it is more preferable to introduce the washing liquid into the perforated hollow pipe so that the washing liquid flow rate in washing is at least 1.0 m$^3$/m$^2$/day and not more than 4.0 m$^3$/m$^2$/day, and set the washing time to at least 10 seconds and not more than 300 seconds. In such ranges, the permeate flow rate in filtration, the filtration time, the washing liquid flow rate in washing and the washing time are set so that the ratio of the volume of the permeated liquid permeating through the envelope-like membranes in the running period to the volume of the washing liquid permeating through the envelope-like membranes in the washing period is not more than 600.

In particular, it is more preferable to supply the raw liquid so that the permeate flow rate in filtration is at least 0.5 m$^3$/m$^2$/day and not more than 2.0 m$^3$/m$^2$/day, and set the filtration time to at least 10 minutes and not more than 30 minutes. Further, it is more preferable to introduce the washing liquid into the perforated hollow pipe so that the washing liquid flow rate in washing is at least 1.0 m$^3$/m$^2$/day and not more than 3.0 m$^3$/m$^2$/day and set the washing time to at least 30 seconds and not more than 60 seconds. In this case, the ratio of the volume of the permeated liquid permeating through the envelope-like membranes in the running period to the volume of the washing liquid permeating through the envelope-like membranes in the washing period is not more than 120.

It is possible to prevent the separation membrane from application of an excessive load, contaminants are inhibited from sedimentation on the outer peripheral portion, and the spiral wound type membrane module can be stably run continuously overlap long period by setting the permeate flow rate in filtration and the filtration time as described above.

Further, it is possible to sufficiently separate contaminants adhering to the outer peripheral portion so that the spiral wound type membrane module can be stably run continuously over long period and reduction of filtration efficiency can be suppressed by setting the washing liquid flow rate in washing and the washing time as described above.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

In a method of washing a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of taking out a permeated liquid by filtration, thereafter introducing a washing liquid from at least one opening end of the perforated hollow pipe and discharging the washing liquid derived from the outer peripheral surface of the perforated hollow pipe through at least the outer peripheral portion of the spiral wound type membrane element for taking out the washing liquid from the pressure vessel, and setting the ratio of the volume of the permeated liquid permeating through the envelope-like membranes in filtration to the volume of the washing liquid permeating through the envelope-like membranes in washing to not more than 600.

In the aforementioned spiral wound type membrane module, at least the outer peripheral portion of the spiral wound type membrane element is not covered with a protective sheath but brought into an open state, whereby a raw liquid can be supplied from at least the outer peripheral side of the spiral wound type membrane element for performing dead end filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on at least the outer peripheral portion of the spiral wound type membrane element are separated from the spiral wound type membrane element and discharged from the system with the washing liquid. Thus, the contaminants captured on at least the outer peripheral portion of the spiral wound type membrane element can be uniformly removed.

Further, it is possible to prevent a separation membrane from application of an excessive load in the spiral wound type membrane element, remove contaminants adhering to the outer peripheral portion by performing sufficient washing, and stably run the spiral wound type membrane module continuously over a long period with high filtration efficiency by setting the ratio of the volume of the permeated liquid permeating through the envelope-like membranes in filtration to the volume of the washing liquid permeating through the envelope-like membranes in washing to not more than 600.

It is preferable to introduce the washing liquid into the perforated hollow pipe so that the washing liquid flow rate in washing is at least 1.0 $m^3/m^2$/day and not more than 4.0 $m^3/m^2$/day and set the washing time to at least 10 seconds and not more than 300 seconds when supplying the raw liquid so that the permeate flow rate in filtration is at least 0.5 $m^3/m^2$/day and not more than 2.0 $m^3/m^2$/day and setting the filtration time to at least 10 minutes and not more than 300 minutes.

In particular, it is more preferable to introduce the washing liquid into the perforated hollow pipe so that the washing liquid flow rate in washing is at least 1.0 $m^3/m^2$/day and not more than 3.0 $m^3/m^2$/day, set the washing time to at least 30 seconds and not more than 60 seconds and set the ratio of the volume of the permeated liquid permeating through the envelope-like membranes in filtration to the volume of the washing liquid permeating through the envelope-like membranes in washing to not more than 120 when supply the raw liquid so that the permeate flow rate in filtration is at least 0.5 $m^3/m^2$/day and not more than 2.0 $m^3/m^2$/day and setting the filtration time to at least 10 minutes and not more than 30 minutes.

Thus, it is possible to sufficiently separate contaminants adhering to the outer peripheral portion so that the spiral wound type membrane module can be stably run continuously over a long period and reduction of filtration efficiency can be suppressed.

(3) Third Invention

In a method of running a spiral wound type membrane module according to an aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element at a constant flow rate through the raw liquid inlet of the pressure vessel and taking out a permeated liquid from at least one opening end of the perforated hollow pipe.

According to the method of running a spiral wound type membrane module, the raw liquid is supplied from at least the outer peripheral side of the spiral wound type membrane element for performing dead end filtration. In this case, contaminants are captured on at least the outer peripheral portion of the spiral wound type membrane element. Thus, loads on the envelope-like membranes of the spiral wound type membrane element are reduced.

Further, the raw liquid is supplied to the spiral wound type membrane element at a constant flow rate, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

In the running method, the supplying step may include a step of controlling the supply pressure for the raw liquid thereby controlling the flow rate of the raw liquid constant. Alternatively, a pressure pump may be provided on the raw liquid supply side of the spiral wound type membrane module, and the supplying step may include a step of controlling the flow rate of the raw liquid constant by controlling the output of the pressure pump. Thus the raw liquid is supplied to the spiral wound type membrane element at a constant flow rate, whereby the spiral wound type membrane module can be stably run.

In the running method, the pressure vessel may further have a raw liquid outlet and the supplying step may include a step of regularly or intermittently taking out part of the raw liquid from the pressure vessel through the raw liquid outlet and returning at least part of the taken-out raw liquid to the supply side again.

In this case, a flow of the raw liquid is regularly or periodically formed axially along the outer peripheral portion of the spiral wound type membrane element and it is possible to inhibit contaminants contained in the raw liquid from adhering to the membrane surface and at least the outer peripheral portion of the spiral wound type membrane element. Thus, the spiral wound type membrane module can be more stably run over a long period.

Further, at least part of the taken-out raw liquid is returned to the supply side again, whereby the permeated liquid can be obtained with high recovery.

In a method of running a spiral wound type membrane module according to another aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid from at least the outer peripheral side of the spiral wound type membrane element through the raw liquid inlet of the pressure vessel and taking out a permeated liquid from at least one opening end of the perforated hollow pipe at a constant flow rate.

According to the method of running a spiral wound type membrane module, the raw liquid is supplied from at least the outer peripheral side of the spiral wound type membrane element for performing dead end filtration. In this case, contaminants are captured on at least the outer peripheral portion of the spiral wound type membrane element. Thus, loads on the envelope-like membranes of the spiral wound type membrane element are reduced.

The permeated liquid is taken out at a constant flow rate, whereby the spiral wound type membrane module can be stably run.

Further, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore high reliability can be attained with no problems such as propagation of germs such as microorganisms, occurrence of a bad smell resulting from decomposition of organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained. In the running method, the supplying step may include a step of controlling the flow rate of the permeated liquid constant by controlling the supply pressure or the supply flow rate of the raw liquid. Alternatively, a pressure pump may be provided on the raw liquid supply side of the spiral wound type membrane module, and the supplying step may include a step of controlling the flow rate of the permeated liquid constant by controlling the output of the pressure pump. Thus, the permeated liquid is taken out at a constant flow rate, whereby the spiral wound type membrane module can be stably run.

In a method of running a spiral wound type membrane module according to still another aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element at a constant flow rate through the raw liquid inlet of the pressure vessel and taking out a permeated liquid from at least one opening end of the perforated hollow pipe in filtration, introducing a washing liquid from at least one opening end of the perforated hollow pipe and discharging the washing liquid derived from the outer peripheral surface of the perforated hollow pipe through at least the outer peripheral side of the spiral wound type membrane element for taking out the washing liquid from the pressure vessel in washing, and changing a washing condition in washing in response to change of the pressure on the raw liquid supply side of the spiral wound type membrane module or change of the pressure difference between the raw liquid supply side and the permeated liquid takeout side in filtration.

According to the method of running a spiral wound type membrane module, the raw liquid is supplied from at least the outer peripheral side of the spiral wound type membrane element infiltration for performing dead end filtration. In this case, contaminants are captured on at least the outer peripheral portion of the spiral wound type membrane element. Thus, loads on the envelope-like membranes of the spiral wound type membrane element are reduced.

Further, the raw liquid is supplied to the spiral wound type membrane element at a constant flow rate, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced. Further, pressures is applied to the spiral wound type membrane element from all directions, whereby the spiral wound type membrane element is not deformed even if the raw liquid is supplied under high pressure. Thus, high pressure resistance is attained.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Therefore, the separated contaminants are discharged from the system with the washing liquid. Thus, the contaminants captured on the membrane surface and at least the outer peripheral portion of the spiral wound type membrane element can be uniformly removed and the spiral wound type membrane module can be stably run with high reliability.

When contaminants adhere to the membrane surface and at least the outer peripheral portion of the spiral wound type membrane element in filtration, pressure on the raw liquid supply side exceeds that on the permeated liquid takeout side. Therefore, it is possible to effectively wash the spiral wound type membrane module with high efficiency in response to the degree of contamination of the spiral wound type membrane element by changing the washing condition in washing in response to change of the pressure on the raw liquid supply side or change of the pressure difference between the raw liquid supply side and the permeated liquid takeout side in filtration. Thus, the spiral wound type membrane module can be stably run with high efficiency.

In the running method, the washing condition in the changing step is at least one of the supply flow rate of the washing liquid introduced into the perforated hollow pipe, the supply pressure for the washing liquid introduced into the perforated hollow pipe, the time interval for washing and the time of washing. It is possible to effectively wash the spiral wound type membrane module with high efficiency by changing at least one of these washing conditions in response to the degree of contamination of the spiral wound type membrane element.

In a method of running a spiral wound type membrane module according to a further aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element through the raw liquid inlet of the pressure vessel and taking out a permeated liquid from at least one opening end of the perforated hollow pipe at a constant flow rate in filtration, introducing a washing liquid from at least one opening end of the perforated hollow pipe and discharging the washing liquid derived from the outer peripheral surface of the perforated hollow pipe through at least the outer peripheral side of the spiral wound type membrane element for taking out the washing liquid from the pressure vessel in washing, and changing a washing condition in washing in response to change of the pressure on the raw liquid supply side of the spiral wound type membrane module or change of the pressure difference between the raw liquid supply side and the permeated liquid takeout side in filtration.

According to the method of running a spiral wound type membrane module, the raw liquid is supplied from at least the outer peripheral side of the spiral wound type membrane element in filtration for performing dead end filtration. In this case, contaminants are captured on at least the outer peripheral portion of the spiral wound type membrane element. Thus, loads on the envelope-like membranes of the spiral wound type membrane element are reduced.

Further, the permeated liquid is taken out at a constant flow rate, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration, whereby the system cost is reduced.

Further, pressure is applied to the spiral wound type membrane element from all directions, whereby the spiral wound type membrane element is not deformed even if the raw liquid is supplied under high pressure. Thus, high pressure resistance is attained.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Therefore, the separated contaminants are discharged with the washing liquid. Thus, the contaminants captured on the membrane surface and at least the outer peripheral portion of the spiral wound type membrane element can be uniformly discharged and the spiral wound type membrane module can be stably run with high reliability.

When contaminants adhere to the membrane surface and at least the outer peripheral portion of the spiral wound type membrane element in filtration, pressure on the raw liquid supply side exceeds that on the permeated liquid takeout side. Therefore, it is possible to effectively wash the spiral wound type membrane module with high efficiency in response to the degree of contamination of the spiral wound type membrane element by changing the washing condition in washing in response to change of the pressure on the raw liquid supply side or change of the pressure difference between the raw liquid supply side and the permeated liquid takeout side in filtration. Thus, the spiral wound type membrane module can be stably run with high efficiency.

In a method of running a spiral wound type membrane module according to a further aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element with constant pressure through the raw liquid inlet of the pressure vessel and taking out a permeated liquid from at least one opening end of the perforated hollow pipe in filtration, introducing a washing liquid from at least one opening end of the perforated hollow pipe and discharging the washing liquid derived from the outer peripheral surface of the perforated hollow pipe for taking out the washing liquid from the pressure vessel through at least the outer peripheral side of the spiral wound type membrane element in washing, and changing a washing condition in washing in response to change of the flow rate of the permeated liquid in filtration.

According to the method of running a spiral wound type membrane module, the raw liquid is supplied from at least the outer peripheral side of the spiral wound type membrane element in filtration, for performing dead end filtration. In this case, contaminants are captured on at least the outer peripheral portion of the spiral wound type membrane element. Thus, loads on the envelope-like membranes of the spiral wound type membrane element are reduced.

The raw liquid is supplied with constant pressure, whereby the spiral wound type membrane module can be stably run.

Further, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore high reliability can be attained with no problems such as propagation of germs such as microorganisms, occurrence of a bad smell resulting from decomposition of organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is obtained.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, contaminants captured on the membrane surface and at least the outer peripheral portion of the spiral wound type membrane element can be uniformly removed, and the spiral wound type membrane module can be stably run with high reliability.

When contaminants adhere to the membrane surface and at least the outer peripheral portion of the spiral wound type membrane element in filtration, the flow rate of the obtained permeated liquid is reduced. Therefore, it is possible to effectively wash the spiral wound type membrane module with high efficiency in response to the degree of contamination of the spiral wound type Membrane element by changing the washing condition in washing in response to change of the flow rate in filtration. Thus, the spiral wound type membrane module can be stably run with high efficiency.

In a method of running a spiral wound type membrane module according to a further aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises steps of supplying a raw liquid from at least the outer peripheral side of the spiral wound type membrane element through the raw liquid inlet of the pressure vessel and taking out a permeated liquid from at least one opening end of the perforated hollow pipe in filtration, introducing a washing liquid from at least one opening end of the perforated hollow pipe and discharging the washing liquid derived from the outer peripheral surface of the perforated hollow pipe through at least the outer peripheral side of the spiral wound type membrane element for taking out the washing liquid from the pressure vessel in washing, and changing a washing condition in washing in response to change of the flow rate of the washing liquid taken out from the pressure vessel.

According to the method of running a spiral wound type membrane module, the raw liquid is supplied from at least the outer peripheral side of the spiral wound type membrane element in filtration, for performing dead end filtration. In this case, contaminants tare captured on at least the outer peripheral portion of the spiral wound type membrane element. Thus, loads on the en elope-like membranes of the spiral wound type membrane element are reduced.

Further, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under thigh pressure. Thus, high pressure resistance is obtained.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, contaminants captured on the membrane surface and at least the outer peripheral portion of the spiral wound type membrane element can be uniformly removed, and the spiral wound type membrane module can be stably run with high reliability.

When contaminants adhere to the membrane surface and at least the outer peripheral portion of the spiral wound type membrane element in filtration, the flow rate of the washing liquid taken out from the pressure vessel is reduced in washing. Therefore, it is possible to effectively wash the spiral wound type membrane module with high efficiency in response to the degree of contamination of the spiral wound type membrane element by changing the washing condition in washing in response to change of the flow rate of the washing liquid in washing. Thus, the spiral wound type membrane module can be stably run with high efficiency.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises a raw liquid supply system supplying a raw liquid from at least the outer peripheral side of the spiral wound type membrane element through the raw liquid inlet of the pressure vessel, a permeated liquid takeout system taking out a permeated liquid from at least one opening end of the perforated hollow pipe, and a control system controlling the flow rate of the raw liquid supplied through the raw liquid inlet of the pressure vessel by the supply system constant.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelope-like membranes of the spiral wound type membrane element are reduced.

Further, the control system controls the flow rate of the raw liquid constant, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is obtained.

In the spiral wound type membrane module, the pressure vessel may further have a raw liquid outlet, and the spiral wound type membrane module may further comprise a circulation system regularly or intermittently taking out part of the raw liquid from the pressure vessel through the raw liquid outlet and returning at least part of the taken-out raw liquid to the supply side again.

In this case, it is possible to regularly or intermittently take out part of the raw liquid from the pressure vessel through the raw liquid outlet and form a flow of the raw liquid axially along the outer peripheral portion of the spiral wound type membrane element. Thus, it is possible to inhibit contaminants contained in the raw liquid from adhering to the membrane surface and at least the outer peripheral portion of the spiral wound type membrane element and the spiral wound type membrane module can be more stably run over a long period. Further, the circulation system can return at least part of the taken-out raw liquid to the supply side again, whereby the permeated liquid can be obtained with high recovery.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises a raw liquid supply system supplying a raw liquid from at least the outer peripheral side of the spiral wound type membrane element through the raw liquid inlet of the pressure vessel, a permeated liquid takeout system taking out a permeated liquid from at least one opening end of the perforated hollow pipe, and a control system controlling the flow rate of the permeated liquid taken out from at least one opening end of the perforated hollow pipe by the permeated liquid takeout system constant.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelope-like membranes of the spiral wound type membrane element are reduced.

Further, the control system controls the flow rate of the permeated liquid constant, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under thigh pressure. Thus, high pressure resistance is obtained.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises a raw liquid supply system supplying a raw liquid from at least the outer peripheral side of the spiral wound type membrane element through the raw liquid inlet of the pressure vessel in filtration, a permeated liquid takeout system taking out a permeated liquid from at least one opening end of the perforated hollow pipe in filtration, a washing liquid introduction system introducing a washing liquid from at least one opening end of the perforated hollow pipe in washing, a washing liquid takeout system taking out the washing liquid discharged through at least the outer peripheral side of the spiral wound type membrane element from the pressure vessel in washing, and a control system controlling the flow rate of the raw liquid supplied to the raw liquid inlet of the pressure vessel by the raw liquid supply system in filtration constant while controlling a washing condition in washing in response to change of the pressure on the raw liquid supply side of the spiral wound type membrane module or change of the pressure difference between the raw liquid supply side and the permeated liquid takeout side in filtration.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelope-like membranes of the spiral wound type membrane element are reduced.

Further, the control system controls the flow rate of the raw liquid constant, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is obtained.

In the spiral wound type membrane module, the washing liquid introduction system introduces the washing liquid from at least one opening end of the perforated hollow pipe in washing. The washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration.

Therefore, the separated contaminants are discharged with the washing liquid. Thus, contaminants captured on the membrane surface and at least the outer peripheral portion of the spiral wound type membrane element can be uniformly removed and the spiral wound type membrane module can be stably run with high reliability.

When contaminants adhere to the membrane surface and at least the outer peripheral portion of the spiral wound type membrane element in filtration, pressure on the raw liquid supply side exceeds that on the permeated liquid takeout side. In the aforementioned spiral wound type membrane module, the control system controls the washing condition in washing in response to change of the pressure on the raw liquid supply side or change of the pressure difference between the raw liquid supply side and the permeated liquid takeout side. Thus, it is possible to effectively wash the spiral wound type membrane module with high efficiency in response to the degree of contamination of the spiral wound type membrane element, and the spiral wound type membrane module can be effectively washed with high efficiency.

In the spiral wound type membrane module, the control system may control at least one of the supply flow rate of the washing liquid introduced into the perforated hollow pipe by the washing liquid introduction system, the supply pressure for the washing liquid introduced into the perforated hollow pipe by the washing liquid introduction system, the time interval for washing and the time for washing. The control system controls at least one of these washing conditions in response to the degree of contamination of the spiral wound type membrane element, whereby the spiral wound type membrane module can be effectively washed with high efficiency.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises a raw liquid supply system supplying a raw liquid from at least the outer peripheral side of the spiral wound type membrane element through the raw liquid inlet of the pressure vessel in filtration, a permeated liquid takeout system taking out a permeated liquid from at least one opening end of the perforated hollow pipe in filtration, a washing liquid introduction system introducing a washing liquid from at least one opening end of the perforated hollow pipe in washing, a washing liquid takeout system taking out the washing liquid discharged through at least the outer peripheral side of the spiral wound type membrane element from the pressure vessel in washing, and a control system controlling the flow rate of the permeated liquid taken out by the permeated liquid takeout system constant in filtration and controlling a washing condition in washing in response to change of the pressure on the raw liquid supply side of the spiral wound type membrane module or change of the pressure difference between the raw liquid supply side and the permeated liquid takeout side in filtration.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelope-like membranes of the spiral wound type membrane element are reduced.

Further, the control system controls the flow rate of the permeated liquid constant, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is obtained.

In the spiral wound type membrane module, the washing liquid introduction system introduces the washing liquid from at least one opening end of the perforated hollow pipe in washing. The washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, contaminants captured on the membrane surface and at least the outer peripheral portion of the spiral wound type membrane element can be uniformly removed and the spiral wound type membrane module can be stably run with high reliability.

When contaminants adhere to the membrane surface and at least the outer peripheral portion of the spiral wound type membrane element infiltration, pressure on the raw liquid supply side exceeds that on the permeated liquid takeout side. In the aforementioned spiral wound type membrane module, the control system controls the washing condition in washing in response to change of the pressure on the raw liquid supply side or change of the pressure difference between the raw liquid supply side and the permeated liquid takeout side. Thus, it is possible to effectively wash the spiral wound type membrane module with high efficiency in response to the degree of contamination of the spiral wound type membrane element, and the spiral wound type membrane module can be stably run with high efficiency.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the spiral wound type membrane module further comprises a raw liquid supply system supplying a raw liquid from at least the outer peripheral side of the spiral wound type membrane element through the raw liquid inlet of the pressure vessel in filtration, a permeated liquid takeout system taking out a permeated liquid from at least one opening end of the perforated hollow pipe in filtration, a washing liquid introduction system introducing a washing liquid from at least one opening end of the perforated hollow pipe in washing, a washing liquid takeout system taking out the washing liquid discharged through at least the outer peripheral side of the spiral wound type membrane element from the pressure vessel in washing, and a control system controlling the pressure of the raw liquid supplied to the raw liquid inlet of the pressure vessel by the raw liquid supply system in filtration while controlling a washing condition in washing in response to change of the flow rate of the permeated liquid in filtration.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelope-like membranes of the spiral wound type membrane element are reduced.

Further, the control system controls the pressure of the raw liquid constant, whereby the spiral wound type membrane module can be stably run.

In addition, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, where t y the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is obtained.

In the spiral wound type membrane module, the washing liquid introduction system introduces the washing liquid from at least one opening end of the perforated hollow pipe. The washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, contaminants captured on the membrane surface and at least the outer peripheral portion of the spiral wound type membrane element can be uniformly removed and the spiral wound type membrane module can be stably run with high reliability.

When contaminants adhere to the membrane surface and at least the outer peripheral portion of the spiral wound type membrane element in filtration, the flow rate of the obtained permeated liquid is reduced. In the aforementioned spiral wound type membrane module, the control system controls the washing condition in washing in response to change of the flow rate of the permeated liquid in filtration. Thus, the spiral wound type membrane module can be efficiently washed in response to the degree of contamination of the spiral wound type membrane element, and can be stably run with high efficiency.

A spiral wound type membrane module according to a further aspect of this invention comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises a raw liquid supply system supplying a raw liquid from at least the outer peripheral side of the spiral wound type membrane element through the raw liquid inlet of the pressure vessel in filtration, a permeated liquid takeout system taking out a permeated liquid from at least one opening end of the perforated hollow pipe in filtration, a washing liquid introduction system introducing a washing liquid from at least one opening end of the perforated hollow pipe in washing, a washing liquid takeout system taking out the washing liquid discharged through at least the outer peripheral side of the spiral wound type membrane element from the pressure vessel in washing, and a control system controlling a washing condition in washing in response to change of the flow rate of the washing liquid taken out from the pressure vessel by the washing liquid takeout system in the washing.

In the spiral wound type membrane module, the raw liquid supply system supplies the raw liquid from at least the outer peripheral side of the spiral wound type membrane element in filtration, for performing dead end filtration. In this case, contaminants are captured on at least the outer peripheral portion of the spiral wound type membrane element, whereby loads on the envelop e-like membranes of the spiral wound type membrane element are reduced.

Further, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability can be attained with no problems such as propagation of germs such as microorganisms, occurrence of a bad smell resulting from decomposition of organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

In the spiral wound type membrane module, the washing liquid introduction system introduces the washing liquid from at least one opening end of the perforated hollow pipe in washing. The washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, contaminants captured on the membrane surface and at least the outer peripheral portion of the spiral wound type membrane element can be uniformly removed and the spiral wound type membrane module can be stably run with high reliability.

When contaminants adhere to the membrane surface and at least the outer peripheral portion of the spiral wound type membrane element in filtration, the flow rate of the washing liquid taken out by the washing liquid takeout system in washing is reduced. In the aforementioned spiral wound type membrane module, the control system controls the washing condition in response to change of the flow rate of the washing liquid in washing. Thus, the spiral wound type membrane module can be effectively washed with high efficiency in response to the degree of contamination of the spiral wound type membrane element, and can be stably run with high efficiency.

(4) Fourth Invention

In a method of running a spiral wound type membrane module according to an aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has one or a plurality of liquid ports, and the method comprises a step of supplying a raw liquid from at least the outer peripheral side of the spiral wound type membrane element through any one of the one or a plurality of liquid ports and taking out a permeated liquid from at least one opening end of the perforated hollow pipe.

According to the method of running a spiral wound type membrane module, the raw liquid is supplied from at least the outer peripheral side of the spiral wound type membrane element, for performing dead end filtration. In this case, contaminants are captured on at least the outer peripheral portion of the spiral wound type membrane element. Thus, loads on the envelope-like membranes are reduced.

No dead space is defined in the clearance between the spiral wound type membrane element and the pressure vessel, to allow no residence of the liquid in the clearance between the spiral wound type membrane element and the pressure vessel. Also when employing the spiral wound type membrane module for separating a liquid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under thigh pressure. Thus, high pressure resistance is attained.

In a method of running a spiral wound type membrane module according to another aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has a plurality of liquid ports, and the method comprises a step of supplying a raw liquid from at least the outer peripheral side of the spiral wound type membrane element through any one of the plurality of liquid ports of the pressure vessel, taking out a permeated liquid from at least one opening end of the perforated hollow pipe, and regularly or intermittently taking out part of the raw liquid from the pressure vessel through another one of the plurality of liquid ports.

According to the method of running a spiral wound type membrane module, the raw liquid is supplied from at least the outer peripheral side of the spiral wound type membrane element for performing filtration. In this case, contaminants are captured on at least the outer peripheral portion of the spiral wound type membrane element, whereby loads on the envelope-like membranes are reduced.

Further, it is possible to regularly or intermittently form a flow of the raw liquid axially along the outer peripheral portion of the spiral wound type membrane element by taking out part of the supplied raw liquid from the pressure vessel. It is possible to inhibit contaminants contained in the raw liquid from adhering to at least the outer peripheral portion of the spiral wound type membrane element due to such a flow of the raw liquid, whereby the spiral wound type membrane module can be stably run over a long period.

No dead space is defined in the clearance between the spiral wound type membrane element and the pressure vessel, to allow no residence of the liquid in the clearance between the spiral wound type membrane element and the pressure vessel. Also when employing the spiral wound type membrane module for separating a liquid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

In addition, pressure is applied to the spiral wound type membrane element from all directions, whereby the spiral wound type membrane element is not deformed even if the raw liquid is supplied under thigh pressure. Thus, high pressure resistance is attained.

In the running method, the supplying step may include a step of returning at least part of the raw liquid taken out from the pressure vessel to the supply side again. In this case, at least part of the taken-out raw liquid can be circulated, whereby the permeated liquid can be obtained with high recovery.

In a method of washing a spiral wound type membrane module according to still another aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has one or a plurality of liquid ports, and the method comprises a step of introducing a washing liquid from at least one opening end of the perforated hollow pipe and discharging the washing liquid derived from the outer peripheral surface of the perforated hollow pipe through at least the outer peripheral portion of the spiral wound type membrane element for taking out the washing liquid from the one or a plurality of liquid ports of the pressure vessel.

In the spiral wound type membrane element of the aforementioned spiral wound type membrane module, at least the outer peripheral portion is not covered with a protective sheath but brought into an open state, whereby a raw liquid can be supplied from at least the outer peripheral side of the spiral wound type membrane element for performing filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from at least one liquid port of the pressure vessel with the washing liquid. Thus, the contaminants captured on the membrane surface and at least the outer peripheral portion of the spiral wound type membrane element can be uniformly removed.

In the washing method, the washing liquid may be a permeated liquid, and the discharging step may include a step of returning at least part of the permeated liquid taken out from the pressure vessel to the raw liquid supply side again. In this case, at least part of the taken-out permeated liquid can be circulated, whereby the permeated liquid can be obtained with high recovery.

In a method of washing a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has a plurality of liquid ports, and the method comprises steps of introducing a washing liquid from at least one opening end of the perforated hollow pipe and discharging the washing liquid derived from the outer peripheral surface of the perforated hollow pipe through at least the outer peripheral portion of the spiral wound type membrane element for taking out the washing liquid from any one or a plurality of ones of the plurality of liquid ports of the pressure vessel, and supplying a raw liquid into the pressure vessel through another one of the plurality of liquid ports and taking out the raw liquid from the pressure vessel through the aforementioned any one liquid port or still another liquid port.

In the spiral wound type membrane element of the aforementioned spiral wound type membrane module, at least the outer peripheral portion is not covered with a protective sheath but brought into an open state, whereby the raw liquid can be supplied from at least the outer peripheral side of the spiral wound type membrane element for performing filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from one or a plurality of liquid ports of the pressure vessel with the washing liquid. Thus, the contaminants captured on the membrane surface and at least the outer peripheral portion of the spiral wound type membrane element can be uniformly removed.

Further, a flow of the raw liquid is formed axially along the outer peripheral portion of the spiral wound type membrane element by introducing the raw liquid into the pressure vessel and taking out the raw liquid. Thus, contaminants adhering to the membrane surface and at least the outer peripheral portion of the spiral wound type membrane element can be readily and reliably separated and the contaminants separated from the spiral wound type membrane element can be readily and reliably discharged, so that the spiral wound type membrane module can be more stably run.

The raw liquid may be fed axially along the outer peripheral portion of the spiral wound type membrane element before or after introducing the washing liquid from at least one opening end of the perforated hollow pipe for performing back wash reverse filtration. Alternatively, the raw liquid may be fed simultaneously with back wash reverse filtration.

In the washing method, the washing liquid may be a permeated liquid, the discharging step may include a step of returning at least part of the permeated liquid taken out from the pressure vessel to the raw liquid supply side, and the supplying step may include a step of returning at least part of the raw liquid taken out from the pressure vessel to the raw liquid supply side. In this case, at least part of the permeated liquid and the raw liquid taken out from the pressure vessel can be circulated, whereby the permeated liquid can be obtained with higher recovery.

A spiral wound type membrane module according to a further aspect of this invention comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has one or a plurality of liquid ports, and the spiral wound type membrane module further comprises a supply system supplying a raw liquid from at least the outer peripheral side of the spiral wound type membrane element through any one of the one or a plurality of liquid ports of the pressure vessel, and a takeout system taking out a permeated liquid from at least one opening end of the perforated hollow pipe.

In the spiral wound type membrane module, the supply system supplies the raw liquid from at least the outer peripheral side of the spiral wound type membrane element, for performing dead end filtration. In this case, contaminants are captured on at least the outer peripheral portion of the spiral wound type membrane element, whereby loads on the envelope-like membranes are reduced.

Further, no dead space is defined in the clearance between the spiral wound type membrane element and the pressure vessel, to allow no residence of the liquid in the clearance between the spiral wound type membrane element and the pressure vessel. Also when employing the spiral wound type membrane module for separating a liquid containing organic matter, therefore, high reliability is attained with no problems such as propagation of germs such as microorganisms, occurrence of a bad smell resulting from de composition of the organic matter, decomposition of separation membranes and the like.

In addition, the raw liquid is supplied from at least the outer peripheral side of the spiral wound type membrane element and pressure is applied to the spiral wound type membrane element from all directions with no pressure causing axial displacement, whereby, the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

A spiral wound type membrane module according to a further aspect of this invention comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has a plurality of liquid ports, and the spiral wound type membrane module further comprises a supply system supplying a raw liquid from at least the outer peripheral side of the spiral wound type membrane element through any one of the plurality of liquid ports of the pressure vessel, a first takeout system taking out a permeated liquid from at least one opening end of the perforated hollow pipe, and a second takeout system regularly or intermittently taking out part of the raw liquid from the pressure vessel through another one of the plurality of liquid ports.

In the spiral wound type membrane module, the supply system supplies the raw liquid from at least the outer peripheral side of the spiral wound type membrane element, for performing filtration. In this case, contaminants are captured on at least the outer peripheral portion of the spiral wound type membrane element, whereby loads on the envelope-like membranes are reduced.

The second takeout system takes out part of the raw liquid supplied by the supply system from the pressure vessel, whereby a flow of the raw liquid can be regularly or intermittently formed axially along the outer peripheral portion of the spiral wound type membrane element. It is possible to inhibit contaminants contained in the raw liquid from adhering to at least the outer peripheral portion of the spiral wound type membrane element by such a flow of the raw liquid. Thus, the spiral wound type membrane module can be stably run over a long period.

No dead space is defined in the clearance between the spiral wound type membrane element and the pressure vessel, to allow no residence of the liquid in the clearance between the spiral wound type membrane element and the pressure vessel. Also when employing the spiral wound type membrane module for separating a liquid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

The spiral wound type membrane module may further comprise a circulation system returning at least part of the raw liquid taken out from the pressure vessel to the supply side again. In this case, the circulation system can circulate at least part of the taken-out raw liquid, whereby the permeated liquid can be obtained with high recovery.

A spiral wound type membrane module according to a further aspect of this invention comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has one or a plurality of liquid ports, and the spiral wound type membrane module further comprises an introduction system introducing a washing liquid from at least one opening end of the perforated hollow pipe, and a takeout system discharging the washing liquid derived from the outer peripheral surface of the perforated hollow pipe through at least the outer peripheral portion of the spiral wound type membrane element and taking out the washing liquid through one or a plurality of liquid ports of the pressure vessel.

In the spiral wound type membrane element of the aforementioned spiral wound type membrane module, at least the outer peripheral portion is not covered with a protective sheath but brought into an open state, whereby a raw liquid can be supplied from at least the outer peripheral side of the spiral wound type membrane element for performing filtration. In this case, contaminants are captured on at least the outer peripheral portion of the spiral wound type membrane element.

In the spiral wound type membrane module, the introduction system introduces the washing liquid from at least one opening end of the perforated hollow pipe in washing. The washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from the liquid port of the pressure vessel through the takeout system with the washing liquid. Thus, the contaminants captured on the membrane surface and at least the outer peripheral portion of the spiral wound type membrane element can be uniformly removed.

In the spiral wound type membrane module, the washing liquid may be a permeated liquid, and the spiral wound type membrane module may further comprise a circulation system returning at least part of the permeated liquid taken out from the pressure vessel to the raw liquid supply side. In this case, the circulation system can circulate at least part of the taken-out permeated liquid, whereby the permeated liquid can be obtained with high recovery.

A spiral wound type membrane module according to a further aspect of this invention comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, the pressure vessel has a plurality of liquid ports, and the spiral wound type membrane module further comprises an introduction system introducing a washing liquid from at least one opening end of the perforated hollow pipe, a first takeout system discharging the washing liquid derived from the outer peripheral surface of the perforated hollow pipe through at least the outer peripheral portion of the spiral wound type membrane element and taking out the washing liquid from any one or a plurality of ones of the plurality of liquid ports of the pressure vessel, a supply system supplying a raw liquid into the pressure vessel through another one of the plurality of liquid ports, and a second takeout system taking out the raw liquid from the pressure vessel through the aforementioned any one liquid port or another liquid port.

In the spiral wound type membrane element of the aforementioned spiral wound type membrane module, at least the outer peripheral portion is not covered with a protective sheath but brought into an open state, whereby the raw liquid can be supplied from at least the outer peripheral side of the spiral wound type membrane element for performing filtration. In this case, contaminants are captured on at least the outer peripheral portion of the spiral wound type membrane element.

In the spiral wound type membrane module, the introduction system introduces the washing liquid from at least one opening end of the perforated hollow pipe in washing. The washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element and discharged from the one or a plurality of liquid ports through the first takeout system with the washing liquid. Thus, the contaminants captured on the membrane surface and at least the outer peripheral portion of the spiral wound type membrane element can be uniformly removed.

Further, the spiral wound type membrane module is provided with the supply system supplying the raw liquid and the second takeout system taking out the raw liquid, whereby a flow of the raw liquid can be formed axially along the outer peripheral portion of the spiral wound type membrane element. Thus, contaminants adhering to the membrane surface and at least the outer peripheral potion of the spiral wound type membrane element can be readily and reliably separated while the contaminants separated from the spiral wound type membrane element can be readily and reliably discharged, whereby the spiral wound type membrane module can be more stably run. The raw liquid may be axially fed along the outer peripheral portion of the spiral wound type membrane element before or after introducing the washing liquid from at least one opening end of the perforated hollow pipe for performing back wash reverse filtration. Alternatively, the raw liquid may be fed simultaneously with back wash reverse filtration.

In the spiral wound type membrane module, the washing liquid may be a permeated liquid, and the spiral wound type membrane module may further comprise a circulation system returning at least part of the permeated liquid taken out from the pressure vessel and at least part of the raw liquid taken out from the pressure vessel to the raw liquid supply side. In this case, the circulation system can circulate at least part of the permeated liquid and the raw liquid taken out from the pressure vessel, whereby the permeated liquid can be obtained with higher recovery.

These and other objects, features, aspects and advantages of the present invention will become apparent from the following detailed description of the present invention when taken in conjunction with the accompanying drawings.

BRIEF DESCRIPTION OF THE DRAWINGS

FIG. 11 is a partially fragmented front elevational view of the spiral wound type membrane element shown in FIG. 8;

DESCRIPTION OF THE PREFERRED EMBODIMENTS (1) First Invention

Figure 1:
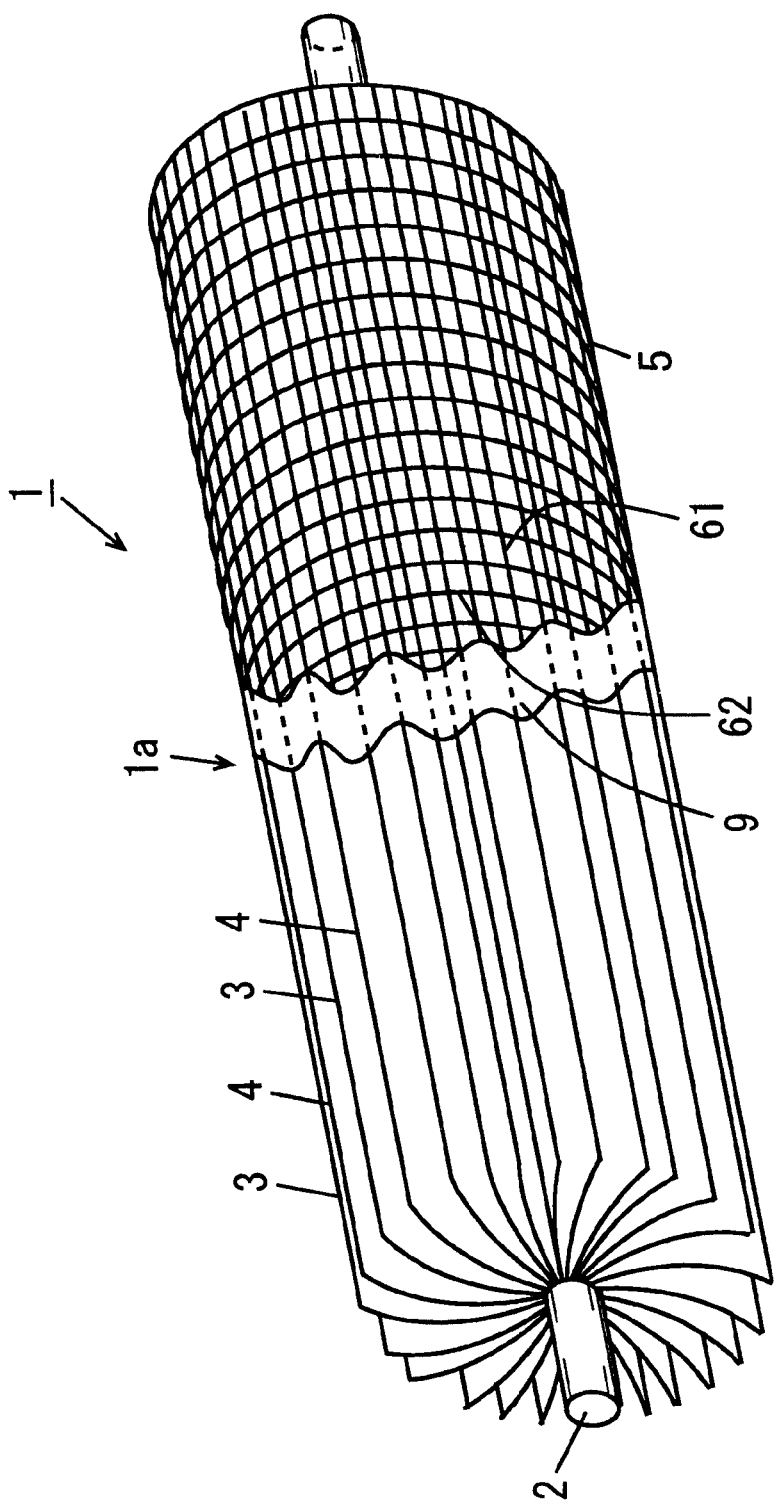
FIG. 1 is a partially fragmented perspective view showing a spiral wound type membrane element according to an embodiment of the first to fourth inventions.
Figure 2:
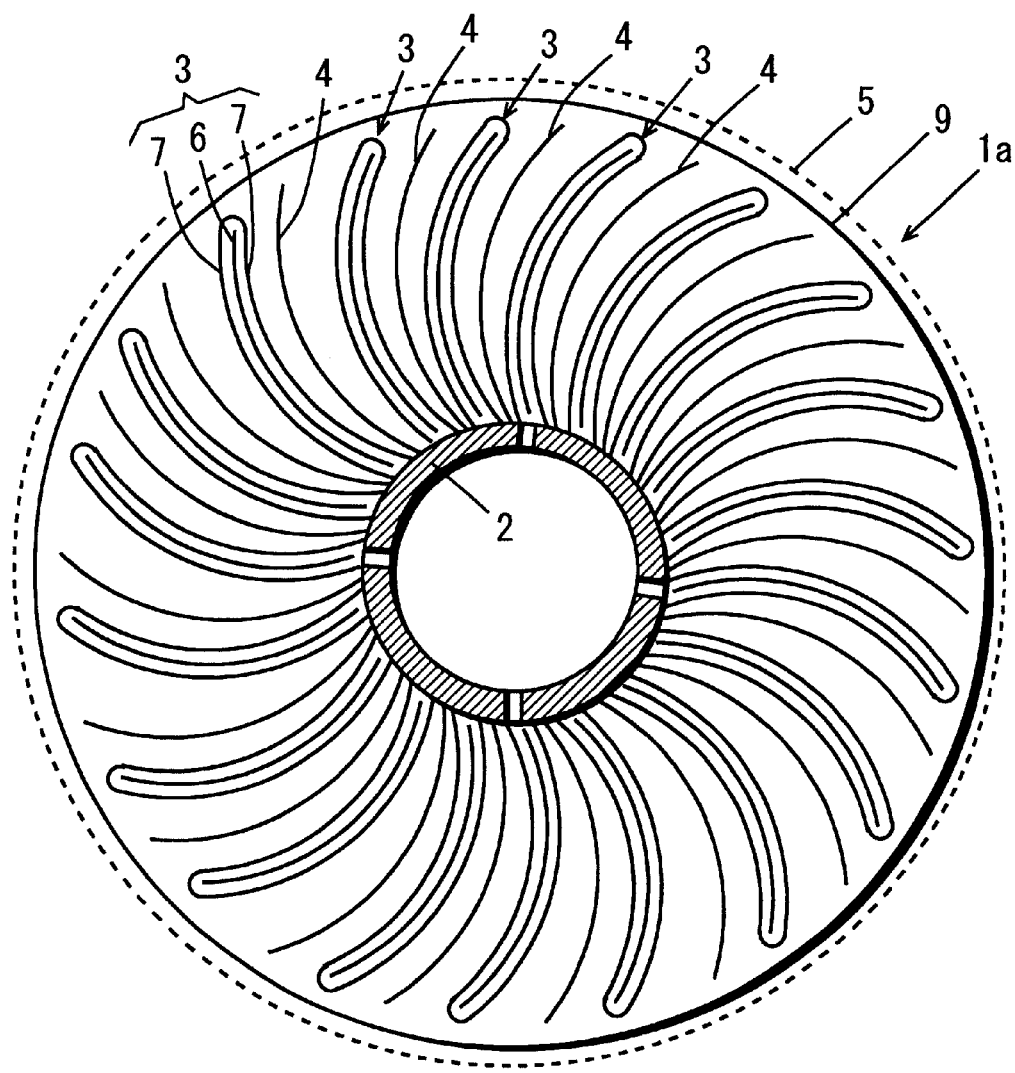
FIG. 2 is a cross-sectional view showing exemplary envelope-like membranes of the spiral wound type membrane element shown in FIG. 1.
Figure 3:
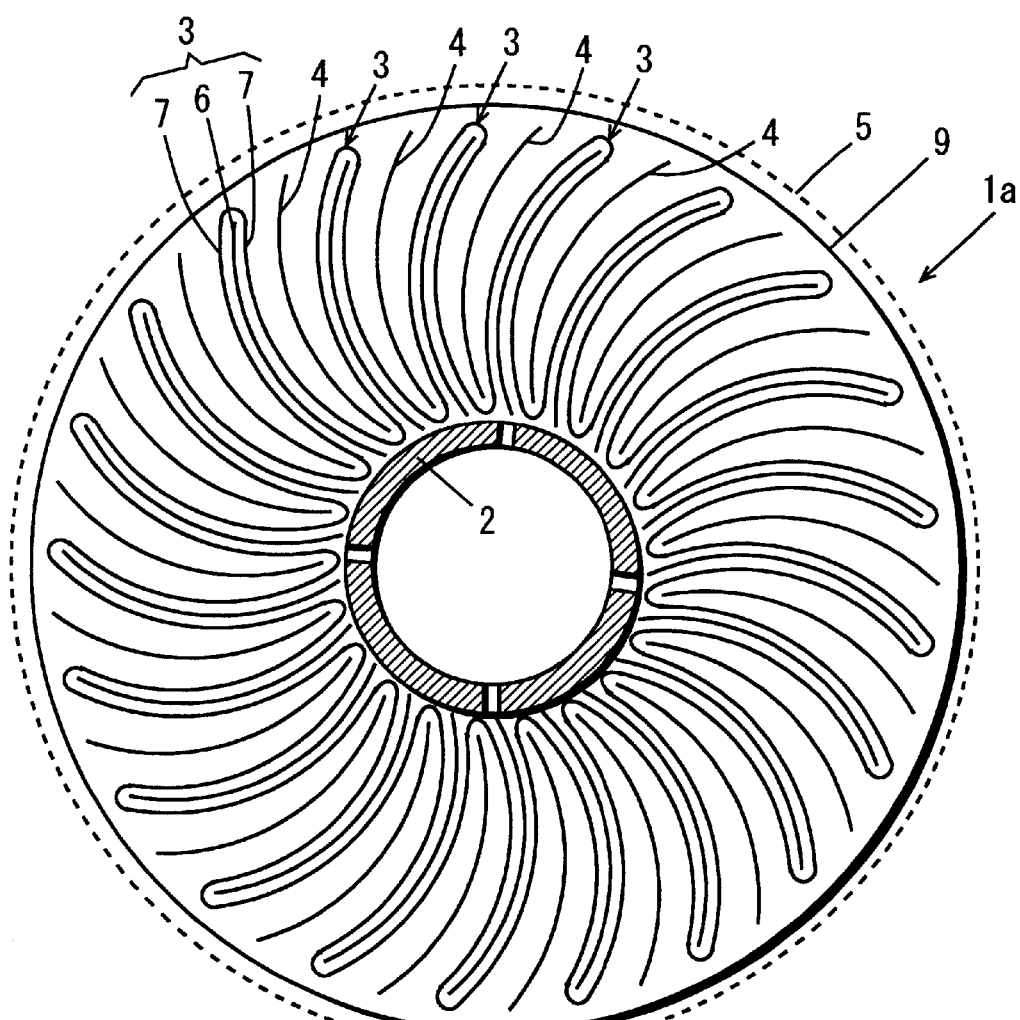
FIG. 3 is a cross-sectional view showing other exemplary envelope-like membranes of the spiral wound type membrane element shown in FIG. 1.

FIG. 1 is a partially fragmented perspective view showing a spiral wound type membrane element 1 according to an embodiment of the first invention. FIG. 2 is a cross-sectional view showing exemplary envelope-like membranes of the spiral wound type membrane element 1 shown in FIG. 1, and FIG. 3 is a cross-sectional view showing other exemplary envelope-like membranes of the spiral wound type membrane element 1 shown in FIG. 1.

The spiral wound type membrane element 1 shown in FIG. 1 includes a spiral membrane component 1a formed by winding a plurality of independent envelope-like membranes 3 or a plurality of continuous envelope-like membranes 3 around the outer peripheral surface of a water collection pipe 2 formed by a perforated hollow pipe. Raw water spacers (raw water passage forming members) 4 are inserted between the envelope-like membranes 3 for preventing the envelope-like membranes 3 from coming into close contact with each other and reducing the membrane area and for forming a passage for raw water.

The outer peripheral surface of the spiral membrane component 1a is covered with a separation membrane 9 made of a liquid-permeable material. This separation membrane 9 is formed by a microfiltration membrane or an ultrafiltration membrane.

The microfiltration membrane can be prepared from a polymer organic membrane of polyolefine, polysulfone, polypropylene, polyethylene, polystyrene, polyacrylonitrile or cellulose acetate. The ultrafiltration membrane can be prepared from a polymer organic membrane of polysulfone, polypropylene, polystyrene, poly acrylonitrile, cellulose acetate or polyethylene.

The outer peripheral surface of the separation membrane 9 is covered with an outer peripheral passage forming member formed by a net. The net can be prepared from a polymer material such as polyolefine, polysulfone, polypropylene, polyethylene, polystyrene, polyacrylonitrile or cellulose acetate, an inorganic material such as ceramic, metal, synthetic rubber or fiber.

The pore size of the microfiltration membrane is preferably at least 0.01 $\mu$m and not more than 10 $\mu$m. As to the pore size of the ultrafiltration membrane, the molecular cutoff is preferably at least 20000 and the pore size is preferably not more than 0.01 $\mu$m. Further, the net employed as the outer peripheral passage forming member 5 preferably has at least four meshes and not more than 100 meshes.

The pore size of the microfiltration membrane or the ultrafiltration membrane employed as the separation membrane 9 and the number of the meshes forming the net employed as the outer peripheral passage forming member 5 are selected in response to the quality of raw water.

In the spiral wound type membrane element 1 shown in FIG. 1, the separation membrane 9 is formed by a microfiltration membrane of 0.4 $\mu$m in pore size made of polyolefine such as ethylene vinyl alcohol. Alternatively, the separation membrane 9 may be formed by an ultrafiltration membrane made of polysulfone. The outer peripheral passage forming member is formed by a net of 50 meshes made of PET (polyethylene terephthalate).

The separation film 9 may also cover the end surfaces of the spiral membrane component 1a, in addition to the outer peripheral surface.

As shown in FIGS. 2 and 3, each envelope-like membrane 3 is formed by superposing two separation membranes 7 on both sides of a permeate spacer (permeate passage forming member) 6 and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm$^2$, ultrafiltration membranes or microfiltration membranes.

In the example shown in FIG. 2, the plurality of envelope-like membranes 3 are formed by independent separation membranes 7 respectively. In the example shown in FIG. 3, the plurality of envelope-like membranes 3 are formed by folding a continuous separation membrane 7.

If the thickness of the raw water spacers 4 is larger than 0.5 mm, it is difficult to capture contaminants contained in raw water on at least the outer peripheral portion of the spiral wound type membrane element 1. If the thickness of the raw water spacers 4 is smaller than 0.1 mm, the envelope-like membranes 3 readily come into contact with each other, to reduce the membrane area. Therefore, the thickness of the raw water spacers 4 is preferably at least 0.1 mm and not more than 0.5 mm.

As shown in FIG. 1, the outer peripheral passage forming member 5 is in the form of a lattice defined by a plurality of wires 61 and 62 perpendicularly intersecting with each other. The thickness of the wires 61 is set larger than that of the wires 62. Thus, raw water readily flows substantially linearly between the wires 61 in parallel with the wires 61.

As shown in FIG. 1, the outer peripheral passage forming member 5 is so arranged that the wires 61 are in parallel with the axial direction of the water collection pipe 2. Therefore, the raw water readily axially flows on the outer peripheral portion of the spiral membrane component 1a.

If the thickness of the outer peripheral passage forming member 5 is larger than 30 mm, the volumetric efficiency of the spiral wound type membrane element 1 is reduced with respect to a pressure vessel storing the spiral wound type membrane element 1. If the thickness of the outer peripheral passage forming member 5 is smaller than 0.6 mm, the flow velocity of the raw water for discharging contaminants adhering to at least the outer peripheral portion of the spiral wound type membrane element 1 from the system is reduced in back wash reverse filtration with permeate. Therefore, the thickness of peripheral passage forming member 5 is preferably at least 0.6 mm and not more than 30 mm.

The porosity of the outer peripheral passage forming member 5 along the thickness thereof is set to at least 20% and not more than 60%, for example. Thus, sufficient strength of the outer peripheral passage forming member 5 can be ensured while reducing the resistance of the raw water axially moving contaminants in back wash filtration. Further, the vertical and transverse pitches of the meshes forming the outer peripheral passage forming member 5 are set to at least 3 mm and not more than 30 mm, for example. Thus, the raw water can be sufficiently supplied between the envelope-like membranes 3 while preventing the outer peripheral surface of the spiral membrane component 1a from coming into contact with the pressure vessel and narrowing the passage for the raw water.

The separation membrane 9 covering the outer peripheral portion may be entirely or partially covered with the outer peripheral passage forming member 5.

Figure 4:
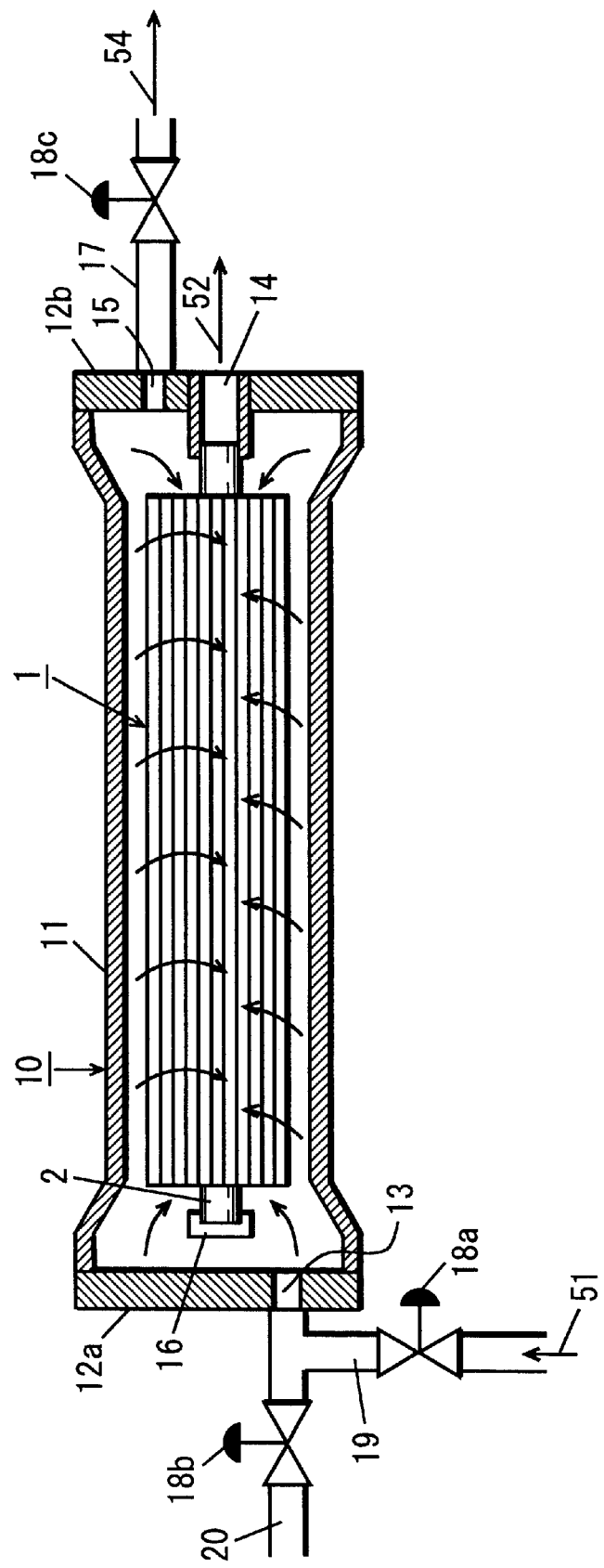
FIG. 4 is a sectional view showing an exemplary method a running the spiral wound type membrane element and a spiral wound type membrane module according to the first and second inventions.

FIG. 4 is a sectional view showing an exemplary method of running a spiral wound type membrane element 1 according to this invention. As shown in FIG. 4, a pressure vessel (pressure-resistant vessel) 10 is formed by a tubular case 11 and a pair of end plates 12a and 12b. A raw water inlet 13 is formed on the en id plate 12a, and a raw water outlet 15 is formed on the other end plate 12b. A permeate outlet 14 is provided on the center of the end plate 12b.

The tubular case 11 stores the spiral wound type membrane element 1 shown in FIG. 1, and both opening ends of the tubular case 11 are sealed with the end plates 12a and 12b respectively. One end of the water collection pipe 2 is engaged with the permeate outlet 14 of the end plate 12b, and an end cap 16 is attached to the other end. Thus, a spiral wound type membrane module is formed by charging the pressure vessel 10 with the single spiral wound type membrane element 1.

The raw water inlet 13 of the end plate 12a is connected with a pipe 19, which in turn is connected with another pipe 20. The pipes 19 and 20 are provided with valves 18a and 18b respectively. The raw water outlet 15 of the end plate 12b is connected with a pipe 17, which is provided with a valve 18c.

In running of the spiral wound type membrane element 1, the valve 18a of the pipe 19 is opened and the valves 18b and 18c of the pipes 20 and 17 are closed. Raw water 51 is introduced into the pressure vessel 10 from the raw water inlet 13 thereof through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 4, the raw water 51 infiltrates into the clearances between the envelope-like membranes 3 from the outer peripheral side and both ends of the spiral wound type membrane element 1. Permeate passing through the separation membranes 7 flows into the water collection pipe 2 along the permeate spacers 6. Thus, permeate 52 is taken out from the permeate outlet 14 of the pressure vessel 10. Thus, dead end filtration is performed, and the permeate 52 can be recovered from the supplied raw water 51 with recovery of 100% in theory.

The outer peripheral surface of the spiral membrane component 1a is covered with the separation membrane 9 as shown in FIG. 1, whereby contaminants such as turbid substances larger than the pore size of the separation membrane 9 are captured on at least the outer peripheral portion of the spiral wound type membrane element 1. In other words, only contaminants smaller than the pore size of the separation film 9 infiltrate into the clearances between the envelope-like membranes 3. Thus, loads on the separation membranes 7 forming the envelope-like membranes 3 are reduced.

Figure 5:
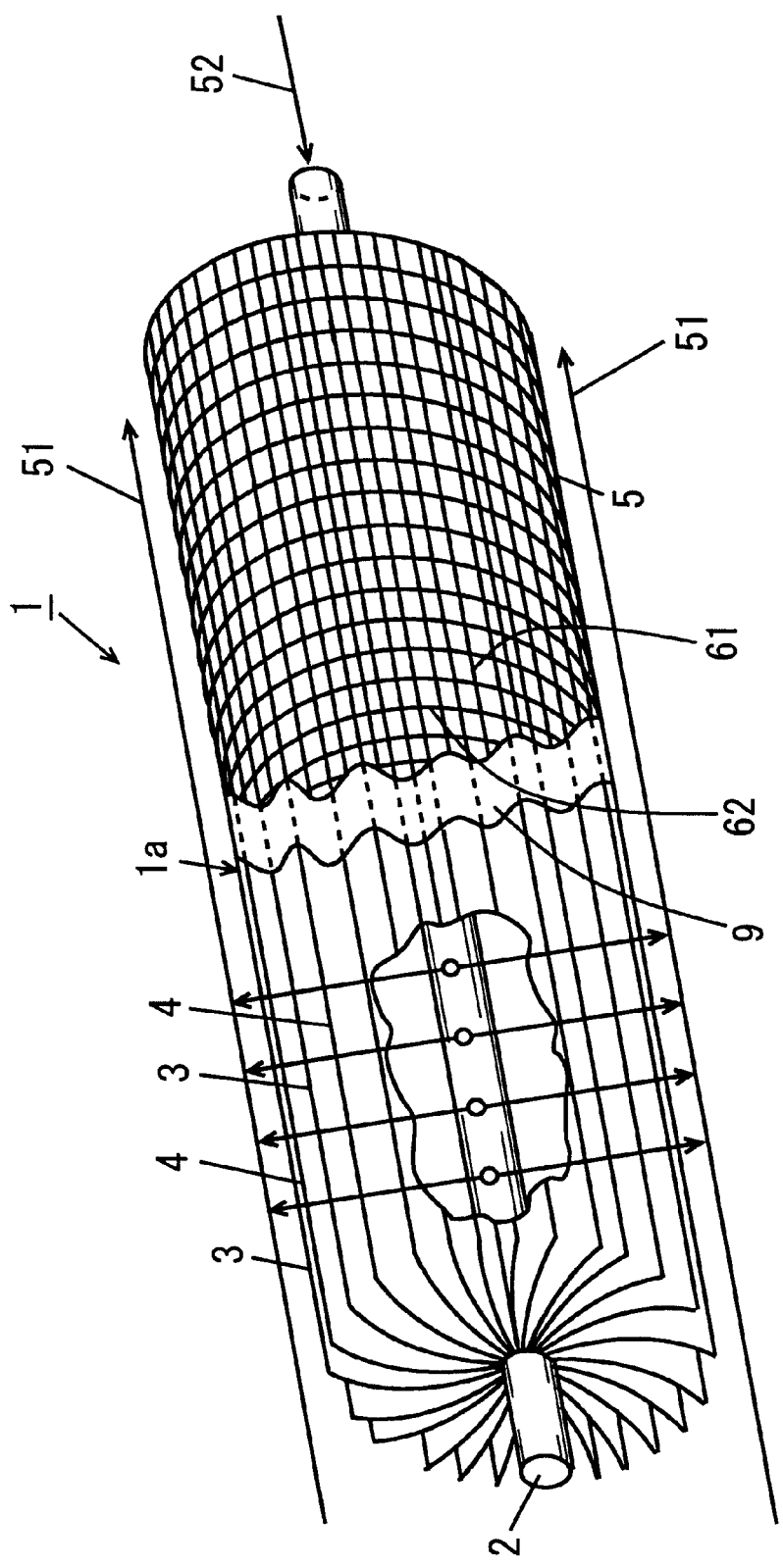
FIG. 5 is a partially fragmented perspective view showing back wash reverse filtration in the spiral wound type membrane element of FIG. 1.

After performing filtration for a certain period, back wash reverse filtration s performed from the permeation side with the permeate 52. FIG. 5 is a partially fragmented perspective view showing back wash reverse filtration in the spiral wound type membrane element 1 shown in FIG. 1. In back wash reverse filtration, the valves 18a and 18c of the pipes 19 and 17 are closed and the valve 18b of the pipe 20 is opened for introducing the permeate 52 into the water collection pipe 2 from the permeate outlet 14 shown in FIG. 4. At this time, the permeate 52 permeates through the envelope-like membranes 3 from the water collection pipe 2, separates contaminants adhering to the membrane surface the raw water spacers 4 etc. and flows toward at least the outer peripheral portion along the raw water spacers 4. The permeate 52 readily separates contaminants captured on at least the outer peripheral portion of the spiral wound type membrane element 1. Thereafter flushing is performed with the raw water 51. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water 51 linearly flows axially along the outer peripheral passage forming member 5 for discharging the separated contaminants from the system through the raw water outlet 15 and the pipe 17 shown in FIG. 4 while separating contaminants remaining on the outer peripheral portion, the raw water spacers 4, the membrane surface etc. of the spiral wound type membrane element 1. Consequently, the membrane flux is remarkably recovered as compared with that before the back wash reverse filtration. Raw water 54 containing contaminants discharged from the system by flushing may be returned to a raw water tank storing the raw water 51.

According to the aforementioned washing method, contaminants adhering to the outer peripheral portion of the spiral wound type membrane element 1, particularly those adhering to the separation membrane 9 can be readily and reliably discharged from the system, whereby increase of the resistance of the separation membrane 9 can be suppressed. Thus, a stable permeate flow rate can be regularly maintained. Further, handleability is improved since the outer peripheral portion of the spiral wound type membrane element 1 is covered with the outer peripheral passage forming member 5.

Figure 27:
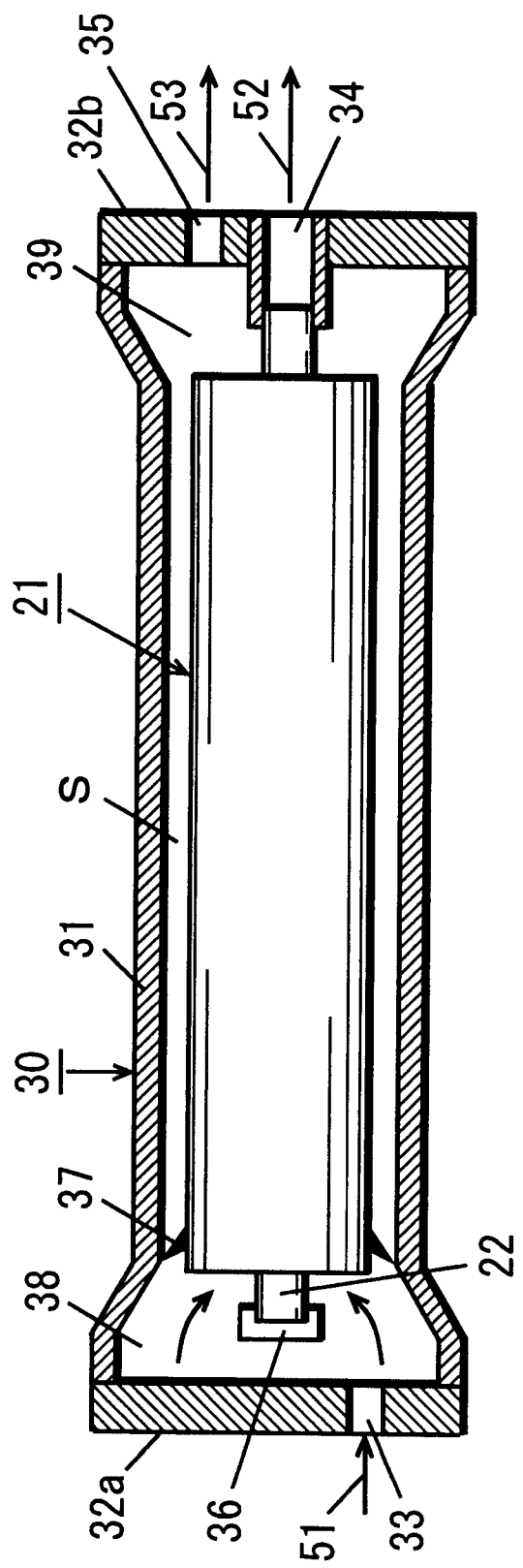
FIG. 27 is a sectional view showing an exemplary method of running the conventional spiral wound type membrane element.
Figure 28:
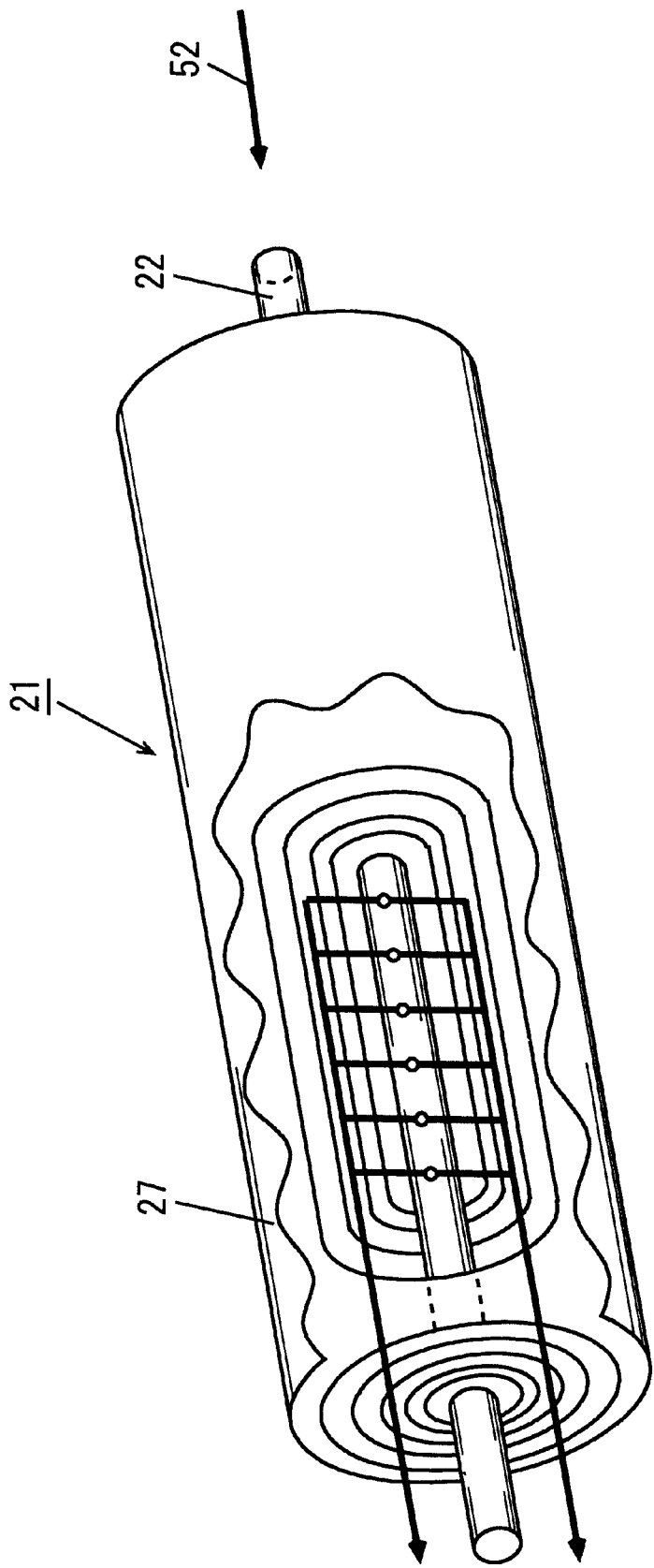
FIG. 28 is a partially fragmented perspective view showing back wash reverse filtration in the conventional spiral wound type membrane element.

Further, no dead space such as the dead space S shown in FIG. 27 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to use a large pump for supplying the raw water 51 and the scale of the system can be reduced due to dead end filtration. Thus, the system cost is reduced.

While the permeate 52 is first introduced into the water collection pipe 2 for separating the contaminants captured on the outer peripheral portion, the membrane surface, the raw water spacers 4 etc. of the spiral wound type membrane element 1 with the permeate 52 derived from the outer peripheral surface of the water collection pipe 2 and then performing flushing with the raw water 51 in the aforementioned back wash reverse filtration, flushing may alternatively be performed first for thereafter introducing the permeate 52 into the water collection pipe 2. In this case, most of the contaminants captured on the outer peripheral portion of the spiral wound type membrane element 1 are removed by flushing and those remaining on the outer peripheral portion, the membrane surface, the raw water spacers 4 etc. of the spiral wound type membrane element 1 can be removed by introducing the permeate 52. Also in this case, therefore, effects similar to those in the aforementioned back wash reverse filtration can be attained. Alternatively, flushing may be performed with the raw water 51 in parallel with introduction of the permeate 52 into the water collection tube 2. Also in this case, effects similar to those in the aforementioned back wash reverse filtration can be attained.

In running, partial raw water may be taken out from the raw water outlet 15 by opening the valve 18c of the pipe 17. In this case, a flow of the raw water can be formed on the outer peripheral portion of the spiral wound type membrane element 1. Thus, part of contaminants contained in the raw water can be discharged from the pressure vessel 10 while suppressing sedimentation of the contaminants. Such a method of running a spiral wound type membrane element is now described.

Figure 6:
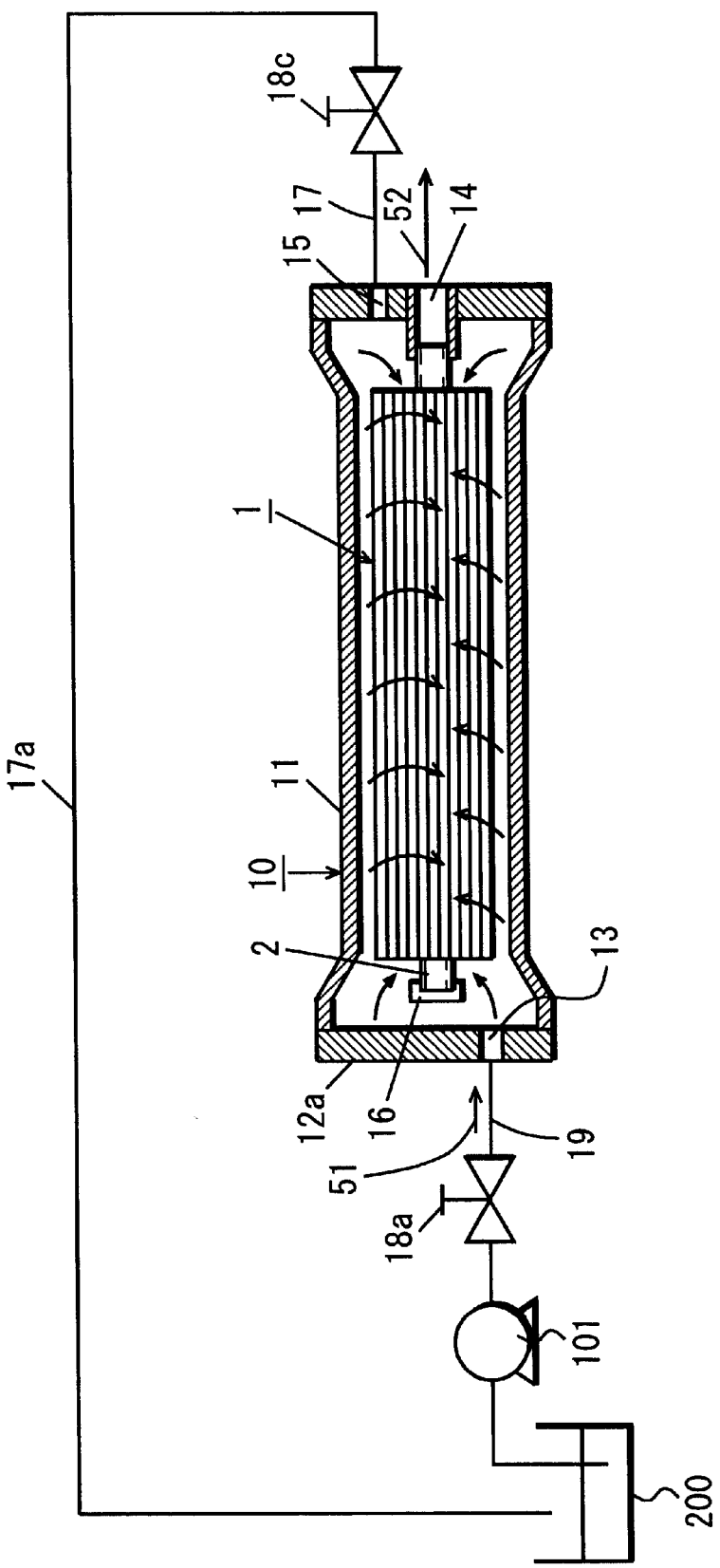
FIG. 6 a sectional view showing another exemplary method of running a spiral wound type membrane element and a spiral wound type membrane module according to the first and second inventions.

FIG. 6 is a sectional view showing another exemplary method of running a spiral wound type membrane element according to this invention.

This method of running a spiral wound type membrane element is similar to that shown in FIG. 4 except the following points:

In this example, valves 18a and 18c of pipes 19 and 17 are opened when running a spiral wound type membrane element 1, as shown in FIG. 6. Raw water 51 collected from a raw water tank 200 is pressurized by a pressure pump 101 and thereafter introduced into a pressure vessel 10 from a raw water inlet 13 of the pressure vessel 10. The raw water 51 supplied into the pressure vessel 10 permeates through a separation membrane 9 from at least the outer peripheral side of the spiral wound type membrane element 1 and infiltrates into the clearances between envelope-like membranes 3 along raw water spacers 4. In the example shown in FIG. 6, the raw water 51 infiltrates into the clearances between the envelope-like membranes 3 from the outer peripheral side and both ends of the spiral wound type membrane element 1. Permeate permeating through separation membranes 7 flows into a water collection pipe 2 along permeate spacers 6. Thus, permeate 52 is taken out from a permeate outlet 1 of the pressure vessel 10.

Part of the raw water 51 supplied into the pressure vessel 10 axially flows along the outer peripheral portion of the spiral wound type membrane element 1. The partial raw water is discharged from the raw water outlet 15 of the pressure vessel 10 and thereafter returned to the raw water tank 200 through a pipe 17a.

In this case, the discharged raw water is circulated, whereby the permeate 52 can be recovered from the raw water 51 with recovery of 100% in theory.

A flow of the raw water is axially formed along the outer peripheral portion of the spiral wound type membrane element 1, whereby part of contaminants contained in the raw water can be discharged from the pressure vessel 10 with the raw water while suppressing sedimentation of the contaminants. Further, the outer peripheral surface of a spiral membrane component 1a is covered with the separation membrane 9, whereby contaminants such as turbid substances larger than the pore size of the separation membrane 9 are captured on at least the outer peripheral portion of the spiral wound type membrane element 1. In other words, only contaminants smaller than the pore size of the separation film 9 infiltrate into the clearances between the envelope-like membranes 3. Thus, loads on the separation membranes 7 forming the envelope-like membranes 3 are reduced.

After performing filtration for a constant period, back wash reverse filtration is performed on the spiral wound type membrane element 1 by a method similar to that shown in FIG. 4. Thus, contaminants adhering to the membrane surface, the raw water spacers, the outer peripheral portion etc. of the spiral wound type membrane element 1, particularly those adhering to the separation membrane 9 can be readily and reliably discharged from the system along the outer peripheral passage forming member 5, whereby increase of the resistance of the separation membrane 9 can be suppressed and a stable permeate flow rate can be regularly maintained. Further, handleability is imp roved since the outer peripheral portion of the spiral wound type membrane element 1 is covered with the outer peripheral passage forming member 5.

Further, a flow of the raw water is axially formed in the clearance between the spiral wound type membrane element 1 and the pressure vessel 10, whereby no dead space is formed with no residence of the raw water. Thus, high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In this example, the raw water may be regularly taken out by opening the valve 18c for regularly forming the flow of the raw water. Alternatively, the raw water may be taken out by periodically opening the valve 18c for periodically forming the flow of the raw water. In either case, it is possible to inhibit contaminants from adhering to the outer peripheral portion of the spiral wound type membrane element 1 by regularly or periodically forming the flow of the raw water.

The method of running a spiral wound type membrane element according to this example is particularly effective for treating raw water 51 having high turbidity (content of contaminants).

FIGS. 7(a) and 7(b) are front elevational views showing spiral wound type membrane elements 1 according to another embodiment of this invention. Referring to FIGS. 7(a) and 7(b), outer peripheral passage forming members are not shown.

In the spiral wound type membrane element 1 shown in FIG. 7(a), both ends of a spiral membrane component 1a are sealed with resin layers 40. In the spiral wound type membrane element 1 shown in FIG. 7(b), an end of a spiral membrane component 1a is sealed with a resin layer 40.

Figure 7:
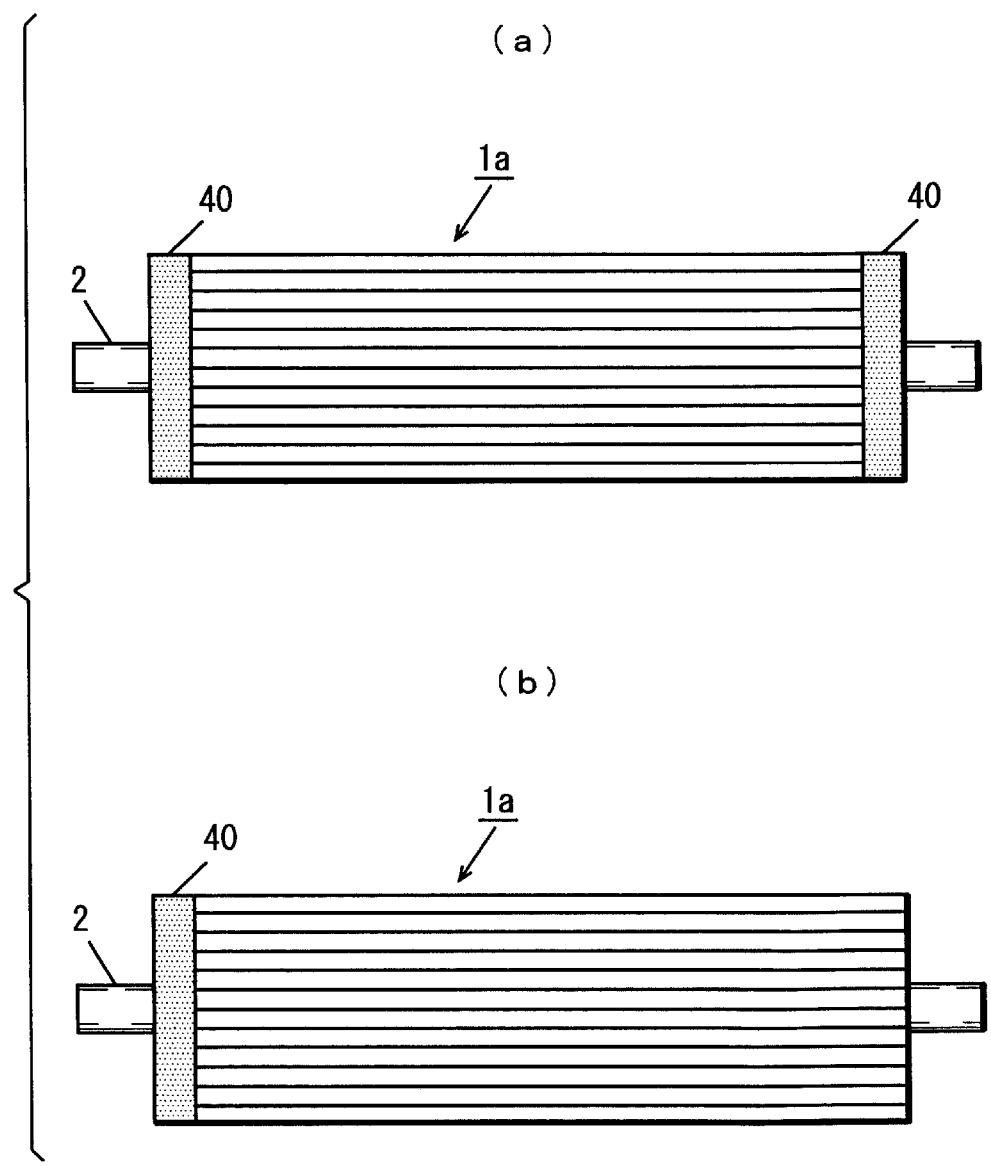
FIGS. 7(a) and 7(b) are front elevational views showing spiral wound type membrane elements according to another embodiment of the first to fourth inventions.

Each of the spiral wound type membrane elements 1 shown in FIGS. 7(a) and 7 (b) requires no space for supplying raw water to both ends or one end of the spiral wound type membrane element 1, although the number of working steps in manufacturing is increased. Therefore, a pressure vessel can be miniaturized, thereby miniaturizing a spiral wound type membrane module formed by storing the spiral wound type membrane element 1 in the pressure vessel.

Further, it is possible to prevent the end surface of the spiral wound type Membrane element 1 from contamination resulting from dynamic pressure of raw water when the raw water is introduced by arranging the end of the spiral wound type membrane element 1 sealed with the resin layer 40 on the side of a raw water inlet of the pressure vessel.

The spiral wound type membrane elements 1 shown in FIGS. 7(a) and 7(b) are run by a method similar to that shown in FIG. 4 or 5. Thus, effects similar to those in the case of employing the spiral wound type membrane element 1 are attained.

Figure 8:
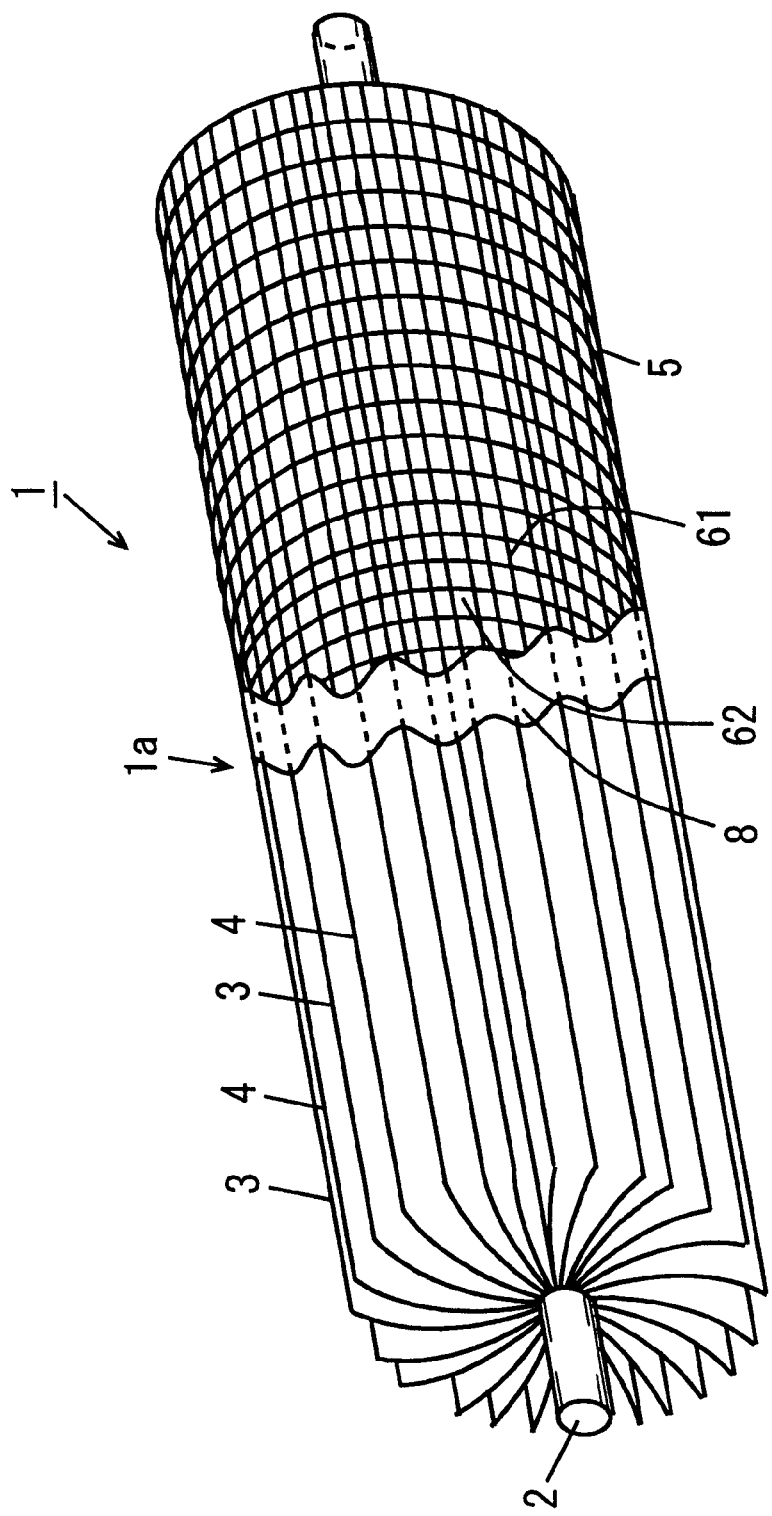
FIG. 8 is a partially fragmented perspective view showing a spiral wound type membrane element according to still another embodiment of the first to fourth inventions.
Figure 9:
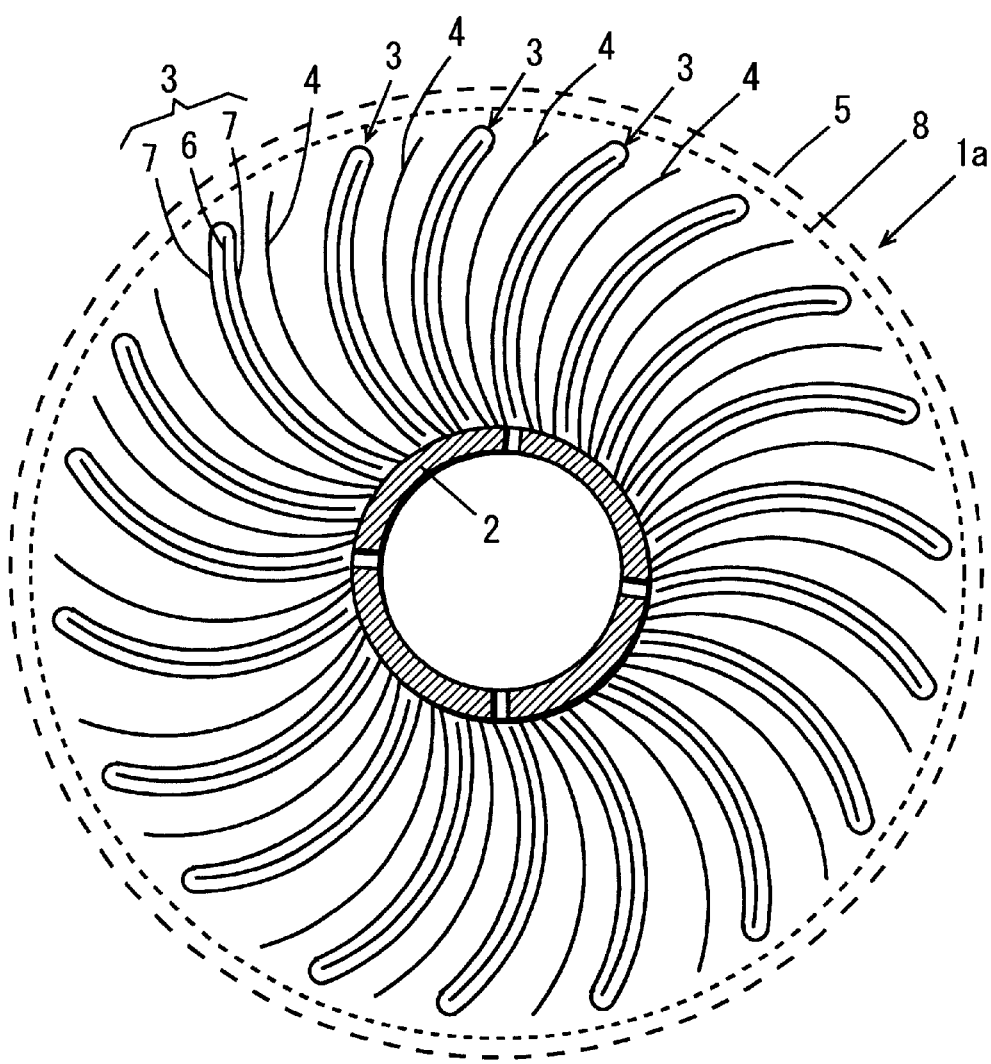
FIG. 9 is a cross-sectional view showing exemplary envelope-like membranes of the spiral wound type membrane element shown in FIG. 8.
Figure 10:
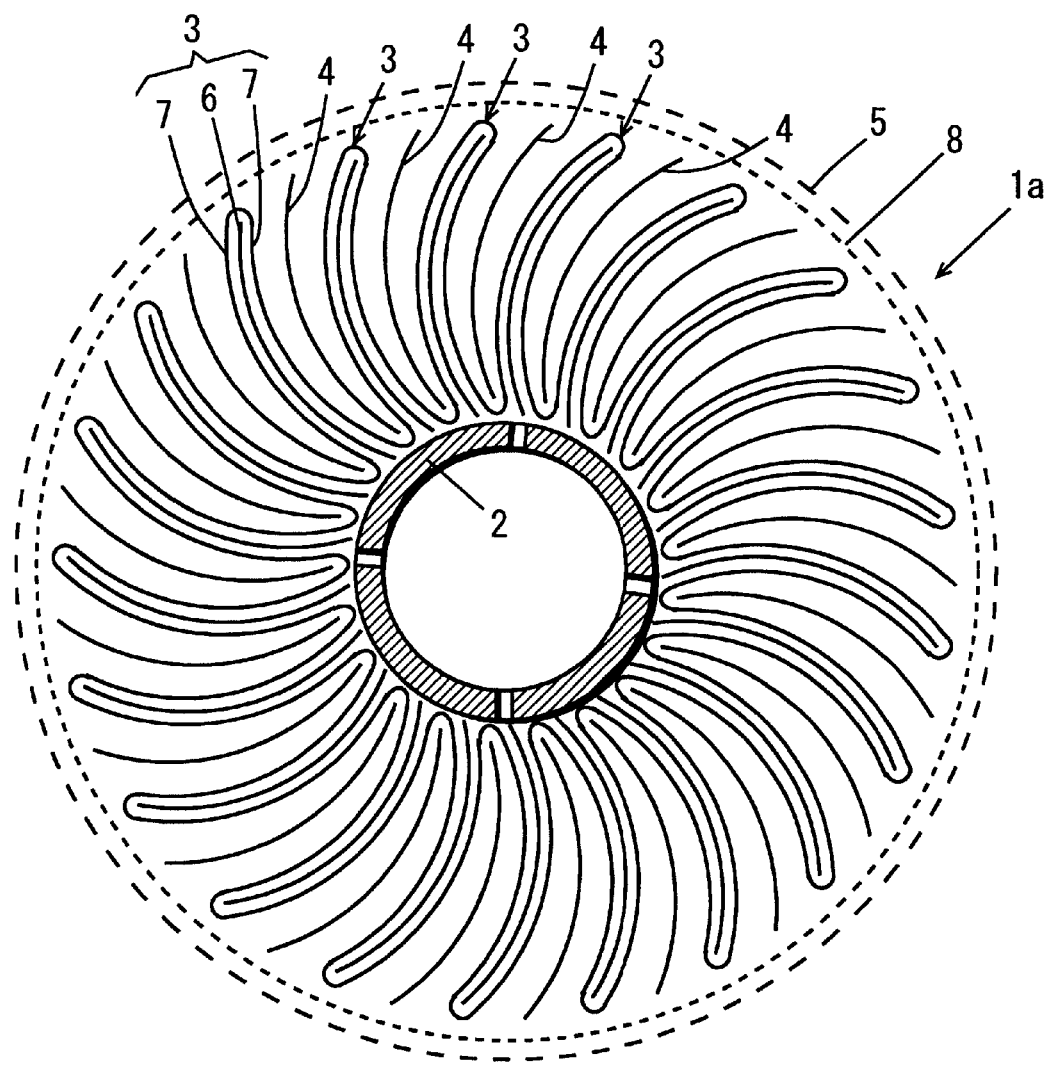
FIG. 10 is a cross-sectional view showing other exemplary envelope-like membranes of the spiral wound type membrane element shown in FIG. 8.

FIG. 8 is a partially fragmented perspective view showing a spiral wound type membrane element 1 according to still another embodiment of this invention. FIG. 9 is a cross-sectional view showing exemplary envelope-like membranes of the spiral wound type membrane element 1 shown in FIG. 8, and FIG. 10 is a cross-sectional view showing other exemplary envelope-like membranes of the spiral wound type membrane element 1 shown in FIG. 8. FIG. 11 is a partially fragmented front elevational view of the spiral wound type membrane element 1 shown in FIG. 8.

The spiral wound type membrane element 1 shown in FIG. 8 includes a spiral membrane component la formed by winding a plurality of independent envelope-like membranes 3 or a plurality of continuous envelope-like membranes 3 around the outer peripheral surface of a water collection pipe 2 formed by a perforated hollow pipe. Raw water spacers (raw liquid passage forming members) 4 are inserted between the envelope-like membranes 3 for preventing the envelope-like membranes 3 from coming into close contact with each other and reducing the membrane area and for forming a passage for raw water.

As shown in each of FIGS. 9 and 10, each envelope-like membrane 3 is formed by superposing two separation membranes 7 on both surfaces of a permeate spacer (permeate passage forming member) 6 and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm$^2$, ultrafiltration membranes or microfiltration membranes.

Referring to FIG. 9, the plurality of envelope-like membranes 3 are formed by independent separation membranes 7 respectively. Referring to FIG. 10, the plurality of envelope-like membranes 3 are formed by folding a continuous separation membrane 7.

The outer peripheral surface of the spiral membrane component 1a is covered with a net 8 made of a liquid-permeable material. The material for the net 8 can be prepared from synthetic resin such as polyolefine, polysulfone, polypropylene, polyester, polyethylene, polystyrene, polyacrylonitrile or polyamide, or metal such as stainless steel or iron.

The net 8 preferably has at least three meshes and not more than 200 meshes. Thus, the spiral membrane component 1a can be reliably inhibited from swelling resulting from back pressure in back wash reverse filtration, and raw water can be sufficiently supplied into the spiral membrane component 1a from the outer peripheral side in running.

In the spiral wound type membrane element 1 shown in FIG. 8, the material for the net 8 is prepared by impregnating tricot cloth with epoxy resin. This net 8 has 50 meshes, pitches of the warps and the wefts are 0.5 mm, and the diameters of the warps and the wefts are 0.15 mm.

The end surfaces of the spiral membrane component 1a may also be covered with the net 8, in addition to the outer peripheral surface.

As shown in FIG. 11, resin 81 is circumferentially applied to three portions of the net 8 covering the outer peripheral surface of the spiral membrane component 1a at regular intervals, thereby fixing the net 8 to the outer peripheral surface of the spiral membrane component 1a on the three portions. While the number of the portions for applying the resin 81 dependent on the back pressure caused in back wash reverse filtration is not particularly restricted, contaminants are hardly removed from the outer peripheral portion of the spiral membrane component 1a in back wash reverse filtration if the resin 81 is applied to four or more portions. Therefore, if the length of the spiral membrane component 1a is 944 cm, for example, it is preferable to fix the net 8 with the resin 81 on about three portions.

The outer peripheral surface of the net 8 is covered with an outer peripheral passage forming member 5. The material for and the size of the outer peripheral passage forming member 5 are similar to those of the outer peripheral passage forming member 5 shown in FIG. 1.

The net 8 covering the outer peripheral portion may be entirely or partially covered with the outer peripheral passage forming member 5.

The spiral wound type membrane element 1 shown in FIG. 8 is run by a method similar to that shown in FIG. 4. In running of the spiral wound type membrane element 1, a valve 18a of a pipe 19 is opened and valves 18b and 18c of pipes 20 and 17 are closed, similarly to the example shown in FIG. 4. Raw water 51 is introduced into a pressure vessel 10 from a raw water inlet 13 thereof through the pipe 19. The raw water 51 flows along the outer peripheral passage forming member 5, and infiltrates into the clearances between the envelope-like membranes 3 from the outer peripheral side and both ends of the spiral wound type membrane element 1. Permeate permeating through the separation membranes 7 flows into a water collection pipe 2 along the permeate spacers 6. Thus, permeate 52 is taken out from a permeate outlet 14 of the pressure vessel 10. Dead end filtration is performed in such a manner.

In this case, the outer peripheral surface of the spiral membrane component a is covered with the net 8 as shown in FIG. 8, whereby contaminants such as turbid substances larger than the pore size of the net 8 are captured on at least the outer peripheral portion of the spiral wound type membrane element 1. In other words, only contaminants smaller than the pore size of the net 8 infiltrate into the clearances between the envelope-like membranes 3. Thus, loads on the separation membranes 7 forming the envelope-like membranes 3 are reduced.

Figure 12:
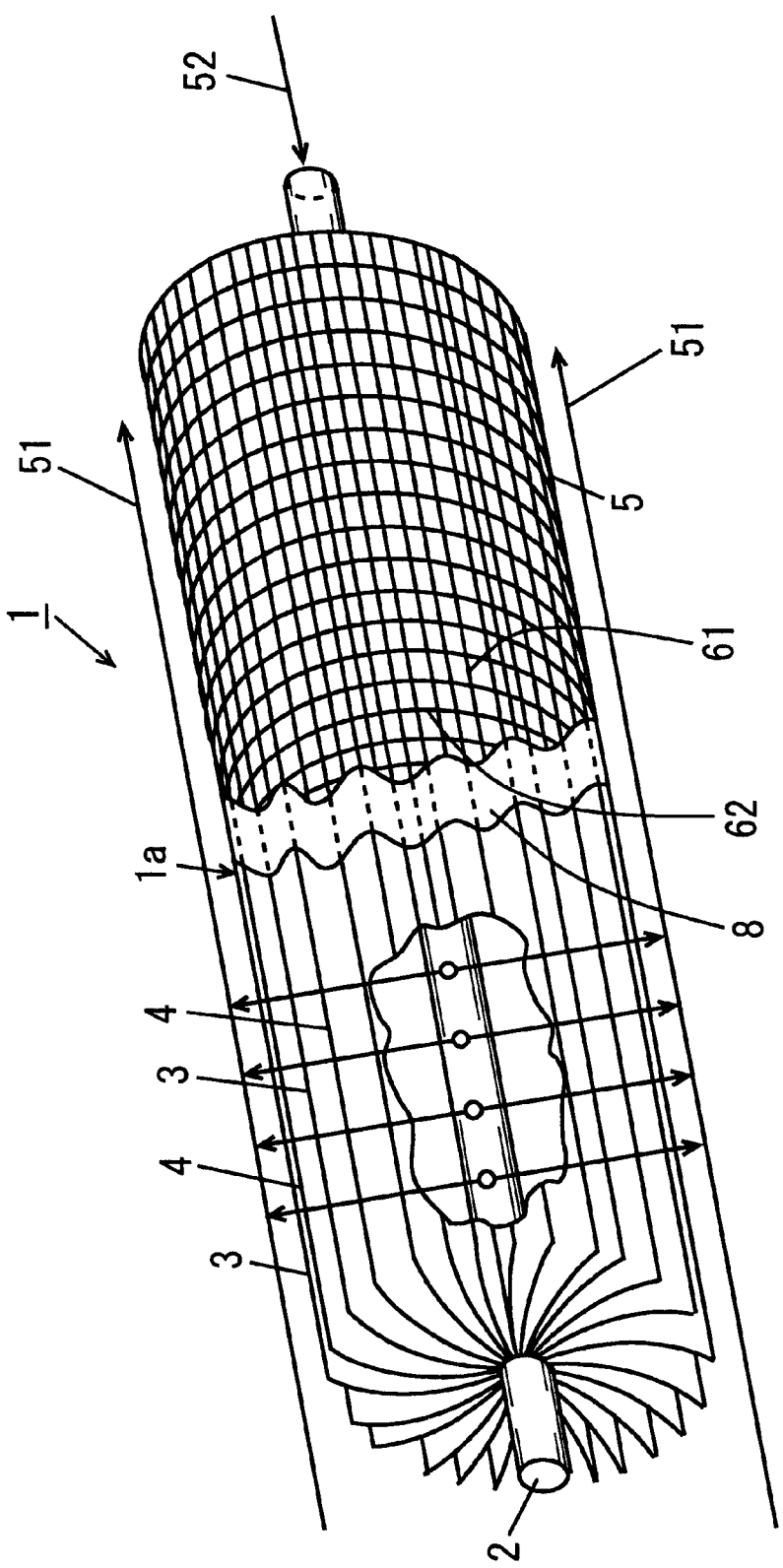
FIG. 12 is a partially fragmented perspective view showing back wash reverse filtration in the spiral wound type membrane element shown in FIG. 8.

After performing filtration for a constant time, back wash reverse filtration shown in FIG. 12 is performed. In the back wash reverse filtration, the valves 18a and 18c of the pipes 19 and 17 are closed and the valve 18b of the pipe 20 is opened for introducing the permeate 52 into the water collection pipe 2 from the permeate outlet 14, similarly to the example shown in FIG. 4. In this back wash reverse filtration, the permeate 52 permeates through the envelope-like membranes 3 from the water collection pipe 2, separates contaminants adhering to the membrane surface, the raw water spacers 4 etc. and flows toward at least the outer peripheral portion along the raw water spacers 4. The permeate 52 readily separates contaminants captured on at least the outer peripheral portion of the spiral wound type membrane element 1. Thereafter flushing is performed with the raw water. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water 51 linearly flows axially along the outer peripheral passage forming member 5 so that the separated contaminants are discharged from the system through the raw water outlet 15 and the pipe 17 and contaminants remaining on the outer peripheral portion, the membrane surface, the raw water spacers 4 etc. of the spiral wound type membrane element 1 are separated from the spiral wound type membrane element 1. Consequently, the membrane flux is remarkably recovered as compared with that before the back wash reverse filtration. Raw water 54 containing the contaminants discharged from the system by the flushing may be returned to a raw liquid tank storing the raw water 51.

According to the aforementioned washing method, contaminants adhering to the outer peripheral portion of the spiral wound type membrane element 1, particularly to the net 8 can be readily and reliably discharged from the system along the outer peripheral passage forming member 5, whereby increase of the resistance of the net 8 can be suppressed. Thus, a stable permeate flow rate can be regularly maintained. Further, handleability is improved since the outer peripheral portion of the spiral wound type membrane element 1 is covered with the outer peripheral passage forming member 5.

In the spiral wound type membrane element 1 shown in FIG. 8, the outer peripheral surface of the spiral membrane component 1a is covered with the net 8, whereby the spiral membrane component 1a is prevented from swelling by the net 8 covering the outer peripheral portion so that the clearances between the envelope-like membranes 3 are not enlarged even if back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

In addition, no dead space is defined in the clearance between the spirals wound type membrane element 1 and the pressure vessel 10, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 and the scale of the system can be reduced due to dead end filtration. Thus, the system cost is reduced.

While the permeate 52 is first introduced into the water collection pipe 2 for separating contaminants captured on the membrane surface, the raw water spacer 4, the outer peripheral portion etc. of the spiral wound type membrane element 1 with the permeate 52 derived from the outer peripheral surface of the water collection pipe 2 for thereafter performing flushing with the raw water in the aforementioned back wash reverse filtration, flushing may alternatively be first performed with the raw water for thereafter introducing the permeate 52 into the water collection pipe 2. According to this washing method, most of the contaminants captured on the outer peripheral portion of the spiral wound type membrane element 1 are removed by the flushing and contaminants remaining on the membrane surface, the raw water spacers 4, the outer peripheral portion etc. of the spiral wound type membrane element 1 can be removed by further introducing the permeate. Also in this case, therefore, effects similar to those of the aforementioned back wash reverse filtration can be attained. Alternatively, flushing with the raw water may be performed in parallel with introduction of the permeate 52 into the water collection pipe 2. Also in this case, effects similar to those of the aforementioned back wash reverse filtration can be attained.

The spiral wound type membrane element 1 shown in FIG. 8 can be run by a method similar to that shown in FIG. 6, in addition to the method shown in FIG. 4. Similarly to the example shown in FIG. 6, partial raw water may be taken out from the raw water outlet 15 by regularly or periodically opening the valve 18c of the pipe 17 in running for circulating the raw water, similarly to the example shown in FIG. 6. In this case, a flow of the raw water can be formed on the outer peripheral portion of the spiral wound type membrane element 1. Thus, part of contaminants contained in the raw water can be discharged from the pressure vessel 10 with the raw water while suppressing sedimentation of the contaminants.

Figure 13:
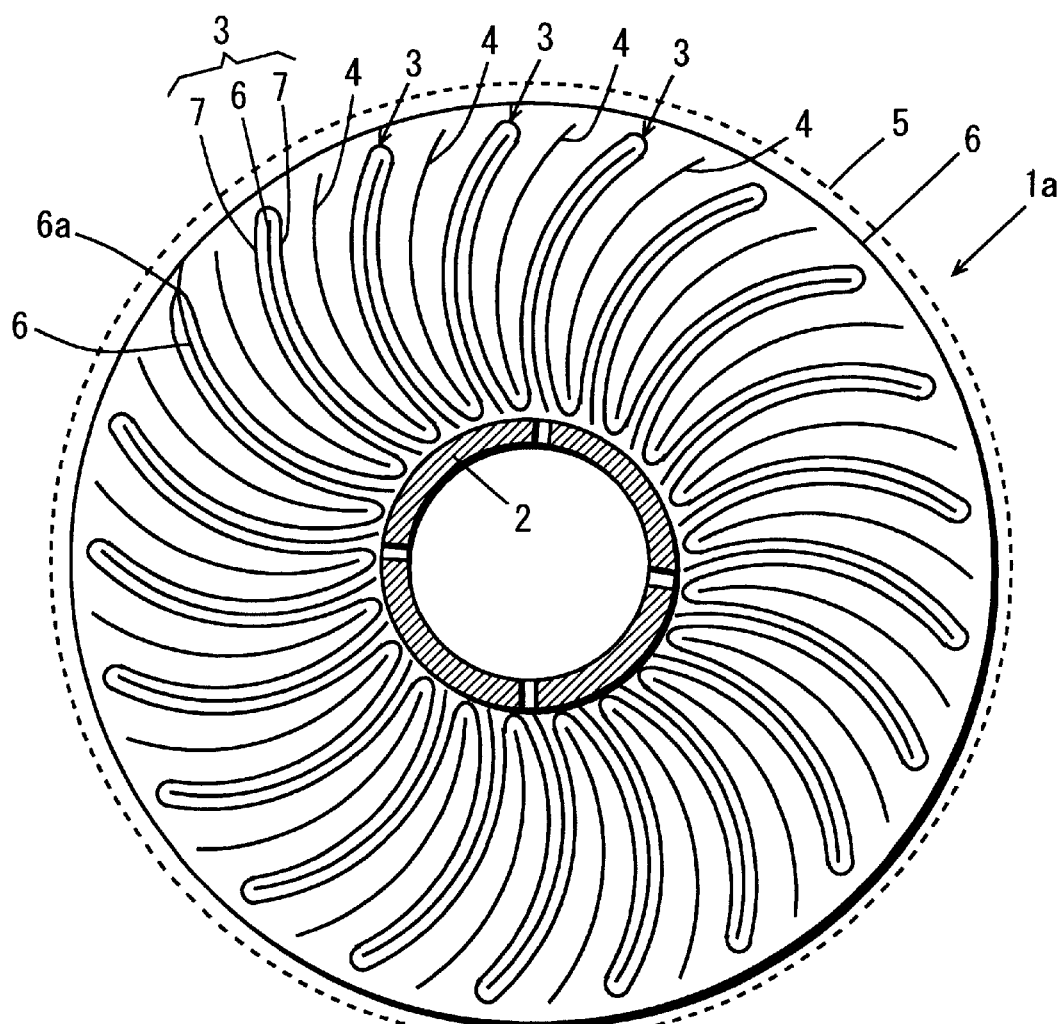
FIG. 13 is a cross-sectional view showing a permeate spacer employed as a net.

The method of running a spiral wound type membrane element according to this invention may also be applied to a spiral wound type membrane element 1 employing part of permeate spacers 6 as a net 8 as shown in FIG. 13, in addition to the spiral wound type similar elements shown in FIGS. 1, 7(a), 7(b) and 8. In such a spiral wound type membrane element 1, the permeate spacer 6 inserted in on e envelope-like membrane 3 is extended to project outward from a side portion of the envelope-like membrane 3 closer to the outer peripheral portion and the extended part of the permeate spacer 6 is wound around the outer peripheral surface of a spiral membrane component 1a as the net 8. The clearance between the permeate spacer 6 projecting outward from the side portion of the envelope-like membrane 3 closer to the outer peripheral portion and the envelope-like membrane 3 is sealed with resin 6a.

In this case, the extended permeate spacer 6 can prevent the spiral membrane component 1a from swelling resulting from back pressure in back wash reverse filtration while suppressing an additional component cost for the net 8. Also when running such a spiral wound type membrane element by the method shown in FIG. 4 or 6, effects similar to those in the case of employing the spiral wound type membrane element 1 shown in FIG. 1 can be attained.

While the above description has been made with reference to the spiral wound type membrane module formed by charging the pressure vessel 10 with the single spiral wound type membrane element 1 as shown in each of FIGS. 4 and 6, the method of running a spiral wound type membrane element and a spiral wound type membrane module according to this invention is also applicable to a spiral wound type membrane module formed by charging a pressure vessel with a plurality of spiral wound type membrane elements.

Figure 14:
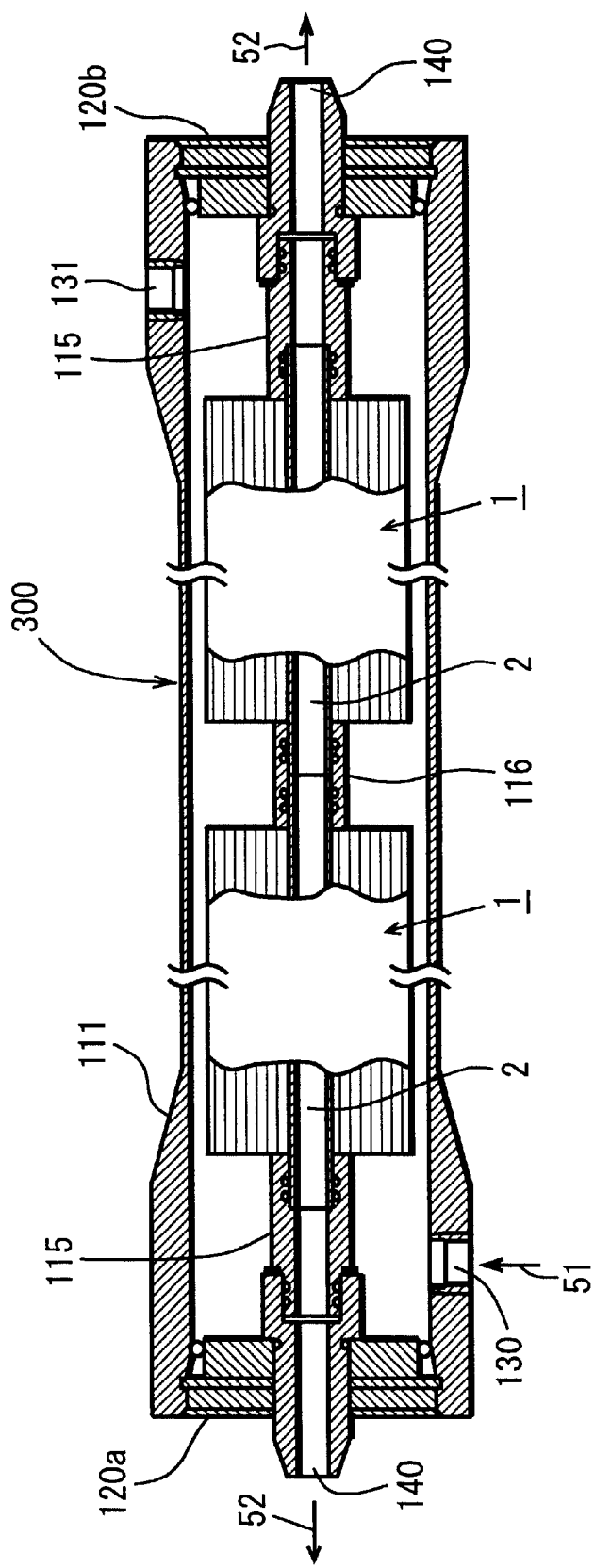
FIG. 14 is a typical sectional view showing still another exemplary method of running a spiral wound type membrane element and a spiral wound type membrane module according to the first and second inventions.

FIG. 14 is a typical sectional view showing still another exemplary method of running a spiral wound type membrane element and a spiral wound type membrane module according to this invention.

As shown in FIG. 14, a pressure vessel 300 is formed by a tubular case 111 and a pair of end plates 120a and 120b. A raw water inlet 130 is formed on the bottom portion of the tubular case 111, and a raw water outlet 131 is formed on the upper portion. The raw water outlet 131 is employed also for deairing. Permeate outlets 140 are provided on the central portions of the end plates 120a and 120b.

The tubular case 111 stores a plurality of spiral wound type membrane elements 1 having water collection pipes 2 serially coupled with each other by an interconnector 116, and both opening ends of the tubular case 111 are sealed with the end plates 120a and 120b respectively. Single end portions of the water collection pipes 2 of the spiral wound type membrane elements 1 located on both end portions are engaged with the permeate outlets 140 of the end plates 120a and 120b through adapters 115 respectively. Thus, a spiral wound type membrane module is formed by charging the pressure vessel 300 with the plurality of spiral wound type membrane elements 1. Each spiral wound type membrane element 1 can be prepared from that shown in FIG. 1, 7(a), 7(b), 8 or 13. In this example, the spiral wound type membrane element 1 shown in FIG. 1 is employed.

In running of the spiral wound type membrane module, the raw water outlet 131 is closed for introducing raw water 51 into the pressure vessel 300 from the raw water inlet 130 of the pressure vessel 300. The raw water 51 flows along the outer peripheral passage forming member 5 of each spiral wound type membrane element 1. In each spiral wound type membrane element 1, the raw water 51 permeates through the separation membrane 9 from at least the outer peripheral side and infiltrates into the clearances between the envelope-like membranes 3 along the raw water spacers 4. Permeate permeating through the separation membranes 7 flows into the water collection pipe 2 along the permeate spacers 6, and permeate 52 is taken out from the permeate outlets 14 provided on both ends of the pressure vessel 300. Thus, dead end filtration is performed.

After performing filtration for a constant time, back wash reverse filtration is performed from the permeation side with the permeate 52. In the back wash reverse filtration, the permeate 52 is introduced into the water collection pipe 2 of each spiral wound type membrane element 1 from the permeate outlets 140 provided on both ends of the pressure vessel 300. In each spiral wound type membrane element 1, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of each spiral wound type membrane element 1. Thereafter the raw water outlet 131 is opened and the raw water 51 is supplied from the raw water inlet 130 for performing flushing and discharging the separated contaminants from the spiral wound type membrane module through the raw water outlet 131 with the raw water. Also in this case, flushing may be performed before or in parallel with back wash reverse filtration, similarly to the example shown in FIG. 4.

According to the aforementioned method of running a spiral wound type membrane element and a spiral wound type membrane module, the raw water is supplied from at least the outer peripheral side of each spiral wound type membrane element 1 in running for performing dead end filtration in each spiral wound type membrane element 1, similarly to the example shown in FIG. 4. In this case, contaminants are captured on at least the outer peripheral portion in each spiral wound type membrane element 1. Therefore, loads on the separation membranes 7 forming the envelope-like membranes 3 are reduced.

Further, contaminants adhering to the membrane surface, the raw water spacers 4, the outer peripheral portion etc. of each spiral wound Type membrane element 1 can be readily discharged from the system along the outer peripheral passage forming member 5 in washing, whereby a stable permeate flow rate can be maintained. In addition, the spiral wound type membrane module is charged with the plurality of spiral wound type membrane elements 1, whereby the spiral wound type membrane module has a large capacity of treatment and the permeate 52 can be efficiently obtained.

No dead space is defined in the clearance between each spiral wound type membrane element 1 and the pressure vessel 300 due to the aforementioned filtration mode, whereby high reliability is attained with no problems such as propagation of germs such as microorganisms, occurrence of a bad smell resulting from decomposition of organic matter and decomposition of the separation membranes 7.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

Also in the spiral wound type membrane module shown in FIG. 14 formed by charging the pressure vessel 300 with the plurality of spiral wound type membrane elements 1, partial raw water may be taken out from the raw outer outlet 131 for axially forming a flow of the raw water on the outer peripheral portion of each spiral wound type membrane element 1, similarly to the running method in the example shown in FIG. 6. In this case, part of contaminants contained in the raw water can be discharged from the pressure vessel 300 while suppressing sedimentation of the contaminants, whereby a more stable permeate flow rate can be maintained.

INVENTIVE EXAMPLES

Inventive Example 1

In Inventive Example 1, the spiral wound type membrane element 1 (RS30-S4 by Nitto Denko Corporation) shown in FIG. 8 was run.

The raw water 51 was prepared from industrial water (pH 6 to 8 under water temperature of 10 to 30° C.) having turbidity of 20 NTU. The supply pressure was adjusted to obtain a permeate flow rate of 5 L/min., and filtration was performed for 30 minutes while closing the valve 18c of the pipe 17 by a running method similar to that shown in FIG. 4. Thereafter the back wash reverse filtration shown in FIG. 12 was performed. In Inventive Example 1, the permeate 52 was introduced into the water collection pipe 2 and thereafter flushing was performed with the raw water 51 for 20 seconds. In this case, the time for the back wash reverse filtration was set to 30 seconds, and the flow rate of the permeate 52 employed for the back wash reverse filtration was set to 10 L/min.

The spiral wound type membrane element 1 was continuously run for 40 days while repeating the aforementioned filtration and back wash reverse filtration.

In Inventive Example 1, the transmembrane pressure difference of the spiral wound type membrane element 1 measured after a lapse of 40 days from start of running was 0.8 kgf /cm$^2$.

Inventive Example 2

In Inventive Example 2, a spiral wound type membrane element 1 was run by a running method similar to that in Inventive Example 1, except that industrial water (pH 6 to 8 under water temperature of 10 to 30° C.) having turbidity of 50 NTU was employed as raw water.

The transmembrane pressure difference of the spiral wound type membrane element 1 measured after a lapse of 40 days from start of running was 1.3 kgf/cm$^2$.

Inventive Example 3

In Inventive Example 1, the spiral wound type membrane element 1 (RS30-S4 by Nitto Denko Corporation) shown in FIG. 8 was run.

Raw water (pH 6 to 8 under water temperature of 10 to 30° C.) having turbidity of 50 NTU was employed. The supply pressure was adjusted to obtain a permeate flow rate of 5 L/min., and filtration was performed for 30 minutes by a running method similar to that shown in FIG. 6. Thereafter the back wash reverse filtration shown in FIG. 12 was performed similarly to Inventive Example 1.

In Inventive Example 3, partial raw water was taken out by regularly opening the valve 18c, and this raw water was circulated and supplied to the spiral wound type membrane element 1 as the raw water 51 again.

The spiral wound type membrane element 1 was run continuously for 40 days while repeating the aforementioned filtration and back wash reverse filtration.

The transmembrane pressure difference of the spiral wound type membrane element 1 measured after a lapse of 40 days from start of running was 1.0 kgf/cm$^2$.

Inventive Example 4

In Inventive Example 4, a spiral wound type membrane element 1 was run by a running method similar to that in Inventive Example 3, except that filtration was performed by closing the valve 18c for 10 minutes and thereafter filtration was performed by opening the valve 18 for 20 minutes.

The transmembrane pressure difference of the spiral wound type membrane element 1 measured after a lapse of 40 days from start of running was 1.0 kgf/cm$^2$.

Comparative Example

In comparative example, the spiral wound type membrane element 1 (RS30-S4 by Nitto Denko Corporation) shown in FIG. 8 was run similarly to Inventive Examples 1 to 4.

The raw water 51 was prepared from industrial water (pH 6 to 8 under water temperature of 10 to 30° C.) having turbidity of 20 NTU, similarly to Inventive Example 1. The supply pressure was adjusted to obtain a permeate flow rate of 5 L/min., and filtration was performed by opening the valve 18c of the pipe 17 for 30 minutes by a running method similar to that shown in FIG. 4. Thereafter back wash reverse filtration was performed by a method similar to that shown in FIG. 12, similarly to Inventive Example 1. In comparative example, however, no flushing was performed with the raw water 51 but only back wash reverse filtration was performed with the permeate.

The spiral wound type membrane element 1 was run continuously for 40 days while repeating the aforementioned filtration and back wash reverse filtration.

The transmembrane pressure difference of the spiral wound type membrane element 1 measured after a lapse of 40 days from start of running was 2.0 kgf/cm$^2$.

Figure 15:
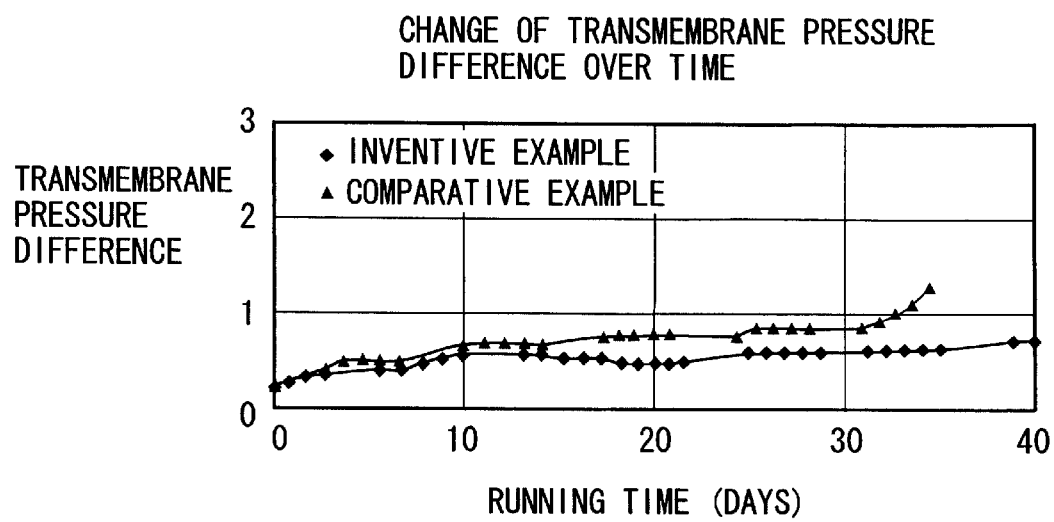
FIG. 15 illustrates changes of transmembrane pressure differences in Inventive Example of the first invention and comparative example over time.

FIG. 15 shows changes of the transmembrane pressure differences of the spiral wound type membrane elements 1 in Inventive Example 1 and comparative example over time. As shown in FIG. 15, contaminants adhering to the net 8 can be reliably removed in Inventive Example 1 since flushing is performed with the raw water 51 while introducing the permeate 52 into the spiral wound type membrane element 1. Thus, the change of the transmembrane pressure difference in the spiral wound type membrane element 1 was small and it was possible to stably run the spiral wound type membrane element 1 continuously over a long period. In comparative example, no flushing is performed with the raw water 51 and hence contaminants adhere to the net 8 to increase the resistance thereof if the spiral wound type membrane element 1 is run over a long period. Thus, the transmembrane pressure difference in the spiral wound type membrane element 1 is increased.

When treating raw water 51 having high turbidity as shown in Inventive Examples 2 to 4, it was possible to stably run the spiral wound type membrane element 1 continuously over a long period in each of Inventive Examples 3 and 4 axially forming a flow of the raw water along the outer peripheral portion of the spiral wound type membrane element 1 in running with a smaller change of the transmembrane pressure difference as compared with Inventive Example 2 performing dead end filtration without forming a flow of the raw water. While contaminants (turbid components) contained in the raw water in large quantities gradually sediment on the net 8 in Inventive Example 2 when treating the raw water 51 having high turbidity, such contaminants (turbid components) contained in the raw water 51 hardly adhere to the net 8 and sedimentation of the contaminants is suppressed in each of Inventive Examples 3 and 4 forming a flow of the raw water.

(2) Second Invention

The spiral wound type membrane module shown in FIG. 4 is employed also in a running method according to this invention. In this case, the spiral wound type membrane element 1 shown in FIG. 1 is employed.

In this example, the valve 18a of the pipe 19 is opened and the valves 18b and 18c of the pipes 20 and 17 are closed when running the spiral wound type membrane element 1, as shown in FIG. 4. The raw water 51 is introduced into the pressure vessel 10 from the raw water inlet 13 of the pressure vessel 10 through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 4, the raw water 51 infiltrates into the clearances between the envelope-like membranes 3 from the outer peripheral side and both ends of the spiral wound type membrane element 1. Permeate permeating through the separation membranes 7 flows into the water collection pipe 2 through the permeate spacers 6. Thus, permeate 52 is taken out from the permeate outlet 14 of the pressure vessel 10. Dead end filtration is performed in the above manner.

In this case, the outer peripheral surface of the spiral membrane component 1a is covered with the separation membrane 9 as shown in FIG. 1, whereby contaminants such as turbid substances larger than the pore size of the separation membrane 9 are captured on at least the outer peripheral portion of the spiral wound type membrane element 1. In other words, only contaminants smaller than the pore size of the separation membrane 9 infiltrate into the clearances between the envelope-like membranes 3. Thus, loads on the separation membranes 7 forming the envelope-like membranes 3 are reduced.

If the permeate flow rate exceeds 2.0 m$^3$/m$^2$/day or the filtration time exceeds 300 minutes, loads on the separation membrane 9 covering the outer peripheral portion of the spiral wound type membrane element 1 and the separation membranes 7 forming the envelope-like membranes 3 are increased while contaminants, contained in the raw water 51, captured on the separation membrane 9 are increased in quantity to sediment on the separation membrane 9. Thus, it is difficult to stably run the spiral wound type membrane module continuously over a long period.

If the permeate flow rate is less than 0.5 m$^3$/m$^2$/day or the filtration time is less than 10 minutes, loads on the separation membranes 7 and 9 of the spiral wound type membrane element 1 are reduced. In this case, however, filtration efficiency is so low that the obtained permeate flow rate is reduced, and hence large-scale equipment is necessary for obtaining the target permeate flow rate.

Thus, the raw water 51 is preferably supplied to the spiral wound type membrane element 1 so that the permeate flow rate is 0.5 to 2.0 m$^3$/m$^2$/day, and the filtration time is preferably set to 10 to 300 minutes. Thus, it is possible to prevent the separation membranes 7 and 9 from application of excess loads while contaminants are inhibited from sedimenting on the separation membrane 9, and the spiral wound type membrane module can be stably run continuously over a long period. Further, the target permeate flow rate can be efficiently obtained.

When running the aforementioned spiral wound type membrane element 1, partial raw water 54 may be taken out from the raw water outlet 15 by opening the valve 18c of the pipe 17. In this case, a flow of the raw water can be formed on the outer peripheral portion of the spiral wound type membrane element 1. Thus, part of contaminants contained in the raw water can be discharged from the pressure vessel 10 while suppressing sedimentation of the contaminants.

After performing filtration for a constant time, back wash reverse filtration is performed from the permeation side with the permeate 52. In this case, the back wash reverse filtration is performed as shown in FIG. 5. In the back wash reverse filtration, the valves 18a and 18c of the pipes 19 and 17 are closed and the valve 18b of the pipe 20 is opened for introducing the permeate 52 into the water collection pipe 2 from the permeate outlet 14 shown in FIG. 4. As shown in FIG. 5, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of the spiral wound type membrane element 1. Thereafter flushing is performed with the raw water 51. The valve 18a of the pipe 19 is opened and the valve 18b of the pipe 20 is closed for opening the valve 18c of the pipe 17 while supplying the raw water 51 from the raw water inlet 13 through the pipe 1 Thus, the raw water 51 linearly flows axially along the outer peripheral passage forming member 5 for discharging the separated contaminants from the system through the raw water outlet 15 and the pipe 17 shown in FIG. 4 while separating contaminants remaining on the outer peripheral portion of the spiral wound type membrane element 1 from the spiral wound type membrane element 1. Consequently, the membrane flux is remarkably recovered as compared with that before the back wash reverse filtration. The raw water 54 containing the contaminants discharged from the system by flushing may be returned to a raw water tank storing the raw water 51.

As hereinabove described, the above filtration running and back wash reverse filtration are alternately repeated in the method of running a spiral wound type membrane element according to this example.

According to the aforementioned washing method, contaminants adhering to the outer peripheral portion, particularly to the separation membrane 9 of the spiral wound type membrane element 1 can be readily and reliably discharged from the system along the outer peripheral passage forming member 5, whereby increase of the resistance of the separation membrane 9 can be suppressed. Thus, a stable permeate flow rate can be regularly maintained.

If the time for back wash reverse filtration is less than 10 seconds or the permeate flow rate in back wash reverse filtration is less than 1 m³/m²/day, it is so difficult to sufficiently separate contaminants adhering to the membrane surface and the outer peripheral portion of the spiral wound type membrane element 1 that contaminants sediment on the membrane surface and the outer peripheral portion. Thus, it is difficult to stably run the spiral wound type membrane module continuously over a long period.

If the time for back wash reverse filtration exceeds 300 seconds or the permeate flow rate in back wash reverse filtration exceeds 4 m³/m²/day, the obtained permeate flow rate is reduced as a whole to reduce filtration efficiency since the permeate 52 obtained by filtration is employed in a large quantity as wash water, although contaminants adhering to the membrane surface and the outer peripheral portion of the spiral wound type membrane element 1 can be sufficiently separated.

Therefore, the time for back wash reverse filtration is preferably set to 10 to 300 seconds, and the permeate flow rate in back wash reverse filtration is preferably set to 1 to 4 m³/m²/day. Thus, it is possible to sufficiently separate contaminants adhering to the membrane surface and the outer peripheral portion of the spiral wound type membrane element 1, the spiral wound type membrane module can be stably run continuously over a long period, and reduction of the filtration efficiency can be suppressed.

In the method of running the aforementioned spiral wound type membrane element shown in FIG. 4, the permeate flow rate in filtration, the filtration time, the permeate flow rate in back wash reverse filtration and the time for back wash reverse filtration are set in the aforementioned ranges so that the ratio $V_1/V_2$ of the permeate volume $V_1$ (the volume of the permeate 52 permeating through the envelope-like membranes 3 in the running period) in filtration to the permeate volume $V_2$ (the volume of the permeate 52 permeating through the envelope-like membranes 3 in the washing period) in back wash reverse filtration is not more than 600. Thus, it is possible to prevent the separation membranes 7 and 9 from application of excess loads, sufficiently wash the spiral wound type membrane module for removing contaminants adhering to the membrane surface and the outer peripheral portion, and stably run the spiral wound type membrane module continuously over a long period with high filtration efficiency.

In particular, it is more preferable to supply the raw water 51 so that the permeate flow rate in filtration is 0.5 to 2.0 m³/m²/day, and to set the filtration time to 10 to 30 minutes. Further, it is more preferable to introduce the permeate 52 into the water collection pipe 2 so that the permeate flow rate in back wash reverse filtration is 1.0 to 3.0 m³/m²/day, and to set the time for back wash reverse filtration to 30 to 60 seconds. In this case, the ratio $V_1/V_2$ of the permeate volume $V_1$ in filtration to the permeate volume $V_2$ in back wash reverse filtration is not more than 120. If the ratio $V_1/V_2$ of the permeate volume $V_1$ in filtration to the permeate volume $V_2$ in back wash reverse filtration is not more than 120, the spiral wound type membrane module can preferably be more stably run continuously over a long period with higher filtration efficiency.

In the aforementioned method of running a spiral wound type membrane element, for example, filtration is performed for 30 minutes by adjusting the supply pressure for the raw water 51 so that the permeate flow rate obtained in filtration is 2.0 m³/m²/day, and thereafter back wash reverse filtration is performed for 30 seconds by adjusting the supply pressure for the permeate 52 so that the permeate flow rate in back wash reverse filtration is 1 m³/m²/day. In this case, the ratio $V_1/V_2$ of the permeate volume $V_1$ in filtration to the permeate volume $V_2$ in back wash reverse filtration is 120. In this case, the recovery of the permeate 52 is 99.2% with high filtration efficiency. Further, it is possible to reduce loads on the separation membranes 7 and 9 and sufficiently remove contaminants adhering to the membrane surface and the outer peripheral portion, whereby the spiral wound type membrane module can be stably run continuously over a long period.

In this case, handleability is improved since the outer peripheral portion of the spiral wound type membrane element 1 shown in FIG. 1 is covered with the outer peripheral passage forming member 5.

As shown in FIG. 4, further, no dead space such as the dead space S shown in FIG. 27 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to use a large pump for supplying the raw water 51 due to dead end filtration. Thus, the system cost is reduced.

While the permeate 52 is first introduced into the water collection pipe 2 in back wash reverse filtration of the spiral wound type membrane element 1 for separating the contaminants captured on the membrane surface and the outer peripheral portion of the spiral wound type membrane element 1 with the permeate 52 derived from the outer peripheral surface of the water collection pipe 2 and then performing flushing with the raw water in the aforementioned example, flushing may alternatively be performed first for thereafter introducing the permeate 52 into the water collection pipe 2. In this case, most of the contaminants captured on the outer peripheral portion of the spiral wound type membrane element 1 are removed by flushing and those remaining on the membrane surface and the outer peripheral portion of the spiral wound type membrane element 1 can be removed by further introducing the permeate 52. Also in this case, therefore, effects similar to those in the aforementioned back wash reverse filtration can be attained.

Alternatively, flushing may be regularly or periodically performed with the raw water in parallel with introduction of the permeate 52 into the water collection pipe 2. Also in this case, effects similar to those in the aforementioned back wash reverse filtration can be attained.

While the method of running a spiral wound type membrane element and a spiral wound type membrane module according to this invention is applied to the spiral wound type membrane element 1 of FIG. 1 in the above description, the method of running a spiral wound type membrane element and a spiral wound type membrane module according to this invention is also applicable to a spiral wound type membrane element other than that shown in FIG. 1, such as that shown in FIG. 7(*a*), 7(*b*), 8 or 13 described witch reference to the first invention, for example. Also when running the spiral wound type membrane element shown in FIG. 7(*a*), 7(*b*), 8 or 13 by a running method similar to the example shown in FIG. 4, effects similar to those in the case of employing the spiral wound type membrane element 1 of FIG. 1 can be attained.

Another exemplary method of running a spiral wound type membrane element and a spiral wound type membrane module according to this invention is now described with reference to the spiral wound type membrane element 1 shown in FIG. 8. When running the spiral wound type membrane element 1 of FIG. 8 by a method similar to that shown in FIG. 4, the valve 18*a* of the pipe 19 is opened and the valves 18*b* and 18*c* of the pipes 20 and 17 are closed, similarly to the example shown in FIG. 4. The raw water 51 is introduced into the pressure vessel 10 from the raw water inlet 13 of the pressure vessel 10 through the pipe 19. The raw water 51 flows along the outer peripheral passage forming member 5 and permeates through the separation membrane 9 from the outer peripheral side and both ends of the spiral wound type membrane element 1. Permeate permeating through the separation membranes 7 flows into the water collection pipe 2 along the permeate spacers 6. Thus, permeate 52 is taken out from, the permeate outlet 14 of the pressure vessel 10. Dead end filtration is performed in the aforementioned manner.

In this case, the outer peripheral surface of the spiral membrane component 1*a* is covered with the net 8 as shown in FIG. 8, whereby contaminants such as turbid substances larger than the pore size of the net 8 are captured on at least the outer peripheral portion of the spiral wound type membrane element 1. In other words, only contaminants smaller than the pore size of the net 8 infiltrate into the clearances between the envelope-like membranes 3. Thus, loads on the separation membranes 7 forming the envelope-like membranes 3 are reduced.

If the permeate flow rate exceeds 2.0 $m^3/m^2$/day or the filtration time exceeds 300 minutes, loads on the net 8 covering the outer peripheral portion of the spiral wound type membrane element 1 and the separation membranes 7 forming the envelope-like membranes 3 are increased while contaminants, contained in the raw water 51, captured on the net 8 are increased in quantity to sediment on the net 8. Thus, it is difficult to stably run the spiral wound type membrane element 1 continuously over a long period.

If the permeate flow rate is less than 0.5 $m^3/m^2$/day or the filtration time is less than 10 minutes, loads on the separation membrane 7 of the spiral wound type membrane element 1 and the net 8 are reduced. In this case, however, filtration efficiency is so low that the obtained permeate flow rate is reduced, and hence large-scale equipment is necessary for obtaining the target permeate flow rate.

Therefore, the raw water 51 is preferably supplied to the spiral wound type membrane element 1 so that the permeate flow rate is 0.5 to 2.0 $m^3/m^2$/day, and the filtration time is preferably set to 10 to 300 minutes. Thus, it is possible to prevent the separation membranes 7 and the net 8 from application of excess loads while contaminants are inhibited from sedimenting on the net 8, and the spiral wound type membrane element 1 can be stably run continuously over a long period. Further, the target permeate flow rate can be efficiently obtained.

When running the aforementioned spiral wound type membrane element 1, partial raw water 54 may be taken out from the raw water outlet 15 by opening the valve 18*c* of the pipe 17, similarly to the example shown in FIG. 4. In this case, a flow of the raw water can be formed on the outer peripheral portion of the spiral wound type membrane element 1. Thus, part of contaminants contained in the raw water can be discharged from the pressure vessel 10 while suppressing sedimentation of the contaminants.

After performing filtration for a constant time, back wash reverse filtration is performed by the method shown in FIG. 12. Similarly to the example shown in FIG. 4, the valves 18*a* and 18*c* of the pipes 19 and 17 are closed and the valve 18*b* of the pipe 20 is opened for introducing the permeate 52 into the water collection pipe 2 from the permeate outlet 14. As shown in FIG. 12, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of the spiral wound type membrane element 1. Thereafter flushing is performed with the raw water. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water 51 linearly flows axially along the outer peripheral passage forming member 5 for discharging the separated contaminants from the system through the raw water outlet 15 and the pipe 17 while separating contaminants remaining on the outer peripheral portion of the spiral wound type membrane element 1 from the spiral wound type membrane element 1. Consequently, the membrane flux is remarkably recovered as compared with that before the back wash reverse filtration. The raw water 54 containing the contaminants discharged from the system by flushing may be returned to a raw water tank storing the raw water 51.

As hereinabove described, the above filtration running and back wash reverse filtration are alternately repeated in this example.

According to the aforementioned washing method, contaminants adhering to the outer peripheral portion, particularly to the net 8 of the spiral wound type membrane element 1 shown in FIG. 8 can be readily and reliably discharged from the system along the outer peripheral passage forming member 5, whereby increase of the resistance of the net 8 can be suppressed. Thus, a stable permeate flow rate can be regularly maintained.

If the time for back wash reverse filtration is less than 10 seconds or the permeate flow rate in back wash reverse filtration is less than 1 $m^3/m^2$/day, it is so difficult to sufficiently separate contaminants adhering to the membrane surface and the outer peripheral portion of the spiral wound type membrane element 1 that contaminants sediment on the membrane surface and the outer peripheral portion. Thus, it is difficult to stably run the spiral wound type membrane element 1 continuously over a long period.

If the time for back wash reverse filtration exceeds 300 seconds or the permeate flow rate in back wash reverse filtration exceeds 4 $m^3/m^2$/day, the obtained permeate flow rate is reduced as a whole to reduce filtration efficiency since the permeate 52 obtained by filtration is employed in a large quantity as wash water, although contaminants adhering to the membrane surface and the outer peripheral portion of the spiral wound type membrane element 1 can be sufficiently separated.

Therefore, the time for back wash reverse filtration is preferably set to 10 to 300 seconds, and the permeate flow rate in back wash reverse filtration is preferably set to 1 to 4 $m^3/m^2$/day. Thus, it is possible to sufficiently separate contaminants adhering to the membrane surface and the outer peripheral portion of the spiral wound type membrane element 1, the spiral wound type membrane element 1 can be stably run continuously over a long period, and reduction of the filtration efficiency can be suppressed.

Also in this example employing the spiral wound type membrane element 1 shown in FIG. 8, the permeate flow rate in filtration, the filtration time, the permeate flow rate in back wash reverse filtration and the time for back wash reverse filtration are set in the aforementioned ranges so that the ratio $V_1/V_2$ of the permeate volume $V_1$ in filtration to the permeate volume $V_2$ in back wash reverse filtration is not more than 600, similarly to the case of employing the spiral wound type membrane element 1 shown in FIG. 1. Thus, it is possible to prevent the separation membranes 7 and the net 8 from application of excess loads, sufficiently wash the spiral wound type membrane module for removing contaminants adhering to the membrane surface and the outer peripheral portion, and stably run the spiral wound type membrane element 1 continuously over a long period with high filtration efficiency.

In particular, it is more preferable to supply the raw water 51 so that the permeate flow rate in filtration is 0.5 to 2.0 $m^3/m^2$/day, and to set the filtration time to 10 to 30 minutes. Further, it is more preferable to introduce the permeate 52 into the water collection pipe 2 so that the permeate flow rate in back wash reverse filtration is 1.0 to 3.0 $m^3/m^2$/day, and to set the time for back wash reverse filtration to 30 to 60 seconds. In this case, the ratio $V_1/V_2$ of the permeate volume $V_1$ in filtration to the permeate volume $V_2$ in back wash reverse filtration is not more than 120. If the ratio $V_1/V_2$ of the permeate volume $V_1$ in filtration to the permeate volume $V_2$ in back wash reverse filtration is not more than 120, the spiral wound type membrane element 1 can preferably be more stably run continuously over a long period with higher filtration efficiency.

In this example, for example, filtration is performed for 30 minutes by adjusting the supply pressure for the raw water 51 so that the permeate flow rate obtained in filtration is 2.0 $m^3/m^2$/day, and thereafter back wash reverse filtration is performed for 30 seconds by adjusting the supply pressure for the permeate 52 so that the permeate flow rate in back wash reverse filtration is 1 $m^3/m^2$/day. In this case, the ratio $V_1/V_2$ of the permeate volume $V_1$ in filtration to the permeate volume $V_2$ in back wash reverse filtration is 120. In this case, the recovery of the permeate 52 is 99.2% with high filtration efficiency. Further, it is possible to reduce loads on the separation membranes 7 and the net 8 and sufficiently remove contaminants adhering to the membrane surface and the outer peripheral portion, whereby the spiral wound type membrane element 1 can be stably run continuously over a long period.

The outer peripheral portion of the spiral wound type membrane element 1 shown in FIG. 8 is covered with the outer peripheral passage forming member 5, whereby handleability is improved.

In the spiral wound type membrane element 1 shown in FIG. 8, the outer peripheral surface of the spiral membrane component 1a is covered with the net 8, whereby the spiral membrane component 1a is prevented from swelling by the net 8 covering the outer peripheral portion so that the clearances between the envelope-like membranes 3 are not enlarged even if back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

In addition, no dead space is defined in the clearance between the spiral wound type membrane element 1 and the pressure vessel 10, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

While the permeate 52 is first introduced into the water collection pipe 2 for separating contaminants captured on the membrane surface and the outer peripheral portion of the spiral wound type membrane element 1 with the permeate 52 derived from the outer peripheral surface of the water collection pipe 2 for thereafter performing flushing with the raw water 51 in the aforementioned back wash reverse filtration of the spiral wound type membrane element 1 shown in FIG. 8, flushing may alternatively be first performed with the raw water 51 for thereafter introducing the permeate 52 into the water collection pipe 2. According to this washing method, most of the contaminants captured on the outer peripheral portion and the membrane surface of the spiral wound type membrane element 1 are removed by the flushing and contaminants remaining on the membrane surface and the outer peripheral portion of the spiral wound type membrane element 1 can be removed by further introducing the permeate 52. Also in this case, therefore, effects similar to those of the aforementioned back wash reverse filtration can be attained.

Alternatively, flushing with the raw water may be regularly or periodically performed in parallel with introduction of the permeate 52 into the water collection pipe 2. Also in this case, effects similar to those of the aforementioned back wash reverse filtration can be attained.

While the above description has been made with reference to the spiral wound type membrane module formed by charging the pressure vessel 10 with the single spiral wound type membrane element 1, the method of running a spiral wound type membrane element and a spiral wound type membrane module according to this invention is also applicable to a spiral wound type membrane module formed by charging a pressure vessel with a plurality of spiral wound type membrane elements. This is now described.

Also in the running method according to this invention, the spiral wound type membrane module shown in FIG. 14 is employed. In this case, each spiral wound type membrane element can be formed by that shown in FIG. 1, 7(*a*), 7(*b*), 8 or 13. It is assumed that the spiral wound type membrane element 1 shown in FIG. 1 is employed.

In this example, the raw water outlet 131 is closed for introducing raw water 51 into the pressure vessel 300 from the raw water inlet 130 of the pressure vessel 300 when running the spiral wound type membrane module, as shown in FIG. 14. The raw water 51 flows along the outer peripheral passage forming member 5 of each spiral wound type membrane element 1. In each spiral wound type membrane element 1, the raw water 51 permeates through the separation membrane 9 from at least the outer peripheral side and infiltrates into the clearances between the envelope-like membranes 3 along the raw water spacers 4. Permeate permeating through the separation membranes 7 flows into the water collection pipe 2 along the permeate spacers 6, so that permeate 52 is taken out from the permeate outlets 14 provided on both ends of the pressure vessel 300. Thus, dead end filtration is performed. Also in this case, partial raw water may be taken out from the raw water outlet 131, similarly to the example shown in FIG. 4.

After performing filtration for a constant time, back wash reverse filtration is performed from the permeation side with the permeate 52. In the back wash reverse filtration, the permeate 52 is introduced into the water collection pipe 2 of each spiral wound type membrane element 1 from the permeate outlets 140 provided on both ends of the pressure vessel 300. In each spiral wound type membrane element 1, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of each spiral wound type membrane element 1. Thereafter the raw water outlet 131 is opened and the raw water 51 is supplied from the raw water inlet 130 for performing flushing and discharging the separated contaminants from the spiral wound type membrane module through the raw water outlet 131 with the raw water. Also in this case, flushing with the raw water may be performed before or in parallel with back wash reverse filtration, similarly to the example shown in FIG. 4.

In this example, as described above, the raw water 51 is supplied from at least the outer peripheral side of each spiral wound type membrane element 1 in running for performing dead end filtration in each spiral wound type membrane element 1, similarly to the example shown in FIG. 4. In this case, contaminants are captured on at least the outer peripheral portion in each spiral wound type membrane element 1. Therefore, loads on the separation membranes 7 forming the envelope-like membranes 3 are reduced.

Further, contaminants adhering to the separation membranes 7 and the outer peripheral portion of each spiral wound type membrane element 1 can be readily discharged from the system along the outer peripheral passage forming member 5 in washing, whereby a stable permeate flow rate can be maintained. In addition, the spiral wound type membrane module is charged with the plurality of spiral wound type membrane elements 1, whereby the spiral wound type membrane module has a large capacity of treatment and the permeate 52 can be efficiently obtained.

As shown in FIG. 14, no dead space is defined in the clearance between each spiral wound type membrane element 1 and the pressure vessel 300 due to the aforementioned filtration mode, whereby high reliability is attained with no problems such as propagation of germs such as microorganisms, occurrence of a bad smell resulting from decomposition of organic matter and decomposition of the separation membranes 7.

Further, pressure is applied to each spiral wound type membrane element 1 from all directions, whereby the spiral wound type membranes element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

Also in this example, the raw water 51 is preferably supplied to each spiral wound type membrane element 1 so that the permeate flow rate is 0.5 to 2.0 $m^3/m^2/day$, and the filtration time is preferably set to 10 to 300 minutes similarly to the example shown in FIG. 4. Thus, it is possible to prevent the separation membranes 7 and 9 from application of excess loads while contaminants are inhibited from sedimenting on the separation membrane 9, and the spiral wound type membrane module can be stably run continuously over a long period. Further, the target permeate flow rate can be efficiently obtained.

Further, the time for back wash reverse filtration is preferably set to 10 to 300 seconds, and the permeate flow rate in each spiral wound type membrane element 1 in back wash reverse filtration is preferably set to 1 to 4 m³/m²/day. Thus, it is possible to sufficiently separate contaminants adhering to the membrane surface and the outer peripheral portion of each spiral wound type membrane element 1, the spiral wound type membrane module can be stably run continuously over a long period, and reduction of the filtration efficiency can be suppressed.

In this example, the ratio $V_1/V_2$ of the permeate volume $V_1$, in filtration to thee permeate volume $V_2$ in back wash reverse filtration is preferably not more than 600, similarly to the example shown in FIG. 4. Thus, it is possible to prevent the separation membranes 7 and 9 from application of excess loads, sufficiently wash the spiral wound type membrane module for removing contaminants adhering to the membrane surface and the outer peripheral portion, and stably run the spiral wound type membrane module continuously over a long period with high filtration efficiency.

In particular, it is more preferable to supply the raw water 51 so that the permeate flow rate in filtration is 0.5 to 2.0 m³/m²/day, and to set the filtration time to 10 to 30 minutes. Further, it is more preferable to introduce the permeate 52 into the water collection pipe 2 so that the permeate flow rate in back wash reverse filtration is 1.0 to 3.0 m³/m²/day, and to set the time for back wash reverse filtration to 30 to 60 seconds. In this case, the ratio $V_1/V_2$ of the permeate volume $V_1$ in filtration to the permeate volume $V_2$ in back wash reverse filtration is not more than 120. If the ratio $V_1/V_2$ of the permeate volume $V_1$ in filtration to the permeate volume $V_2$ in back wash reverse filtration is not more than 120, the spiral wound type membrane module can preferably be more stably run continuously over a long period with higher filtration efficiency.

INVENTIVE EXAMPLES

Inventive Example A

In Inventive Example A, the spiral wound type membrane element 1 (RS30-S4 by Nitto Denko Corporation) shown in FIG. 8 was run.

The raw water 51 was prepared from industrial water (pH 6 to 8 under water temperature of 10 to 30° C.).

In washing, the supply pressure was adjusted to obtain a permeate flow rate of 2.0 m³/m²/day, and filtration was performed for 30 minutes by a running method similar to that shown in FIG. 4. Thereafter the back wash reverse filtration shown in FIG. 12 was performed. In Inventive Example A, the time for back wash reverse filtration was set to 30 seconds, and the supply pressure was adjusted to obtain a permeate flow rate of 1.0 m³/m²/day in back wash reverse filtration. The permeate 52 was introduced into the water collection pipe 2 and thereafter flushing was performed with the raw water 51 for 20 seconds.

The spiral wound type membrane element 1 was continuously run for 40 days while repeating the aforementioned filtration and back wash reverse filtration. The transmembrane pressure difference of the spiral wound type membrane element 1 was measured after a lapse of 40 days from start of running.

Inventive Example B

In Inventive Example B, filtration and back wash reverse filtration were performed by a running method similar to that in Inventive Example 1 except the following points, for measuring the transmembrane pressure difference of a spiral wound type membrane element 1 after a lapse of 40 days.

In Inventive Example B, the time for back wash reverse filtration was set to 30 seconds, and the supply pressure was adjusted to obtain a permeate flow rate of 2.0 m³/m²/day in back wash reverse filtration.

Inventive Example C

In Inventive Example C, filtration and back wash reverse filtration were performed by a running method similar to that in Inventive Example 1 except the following points, for measuring the transmembrane pressure difference of a spiral wound type membrane element 1 after a lapse of 40 days.

In Inventive Example C, filtration was performed for 20 minutes while adjusting the supply pressure to obtain a permeate flow rate of 1.0 m³/m²/day in filtration. Further, the time for back wash reverse filtration was set to 30 seconds, and the supply pressure was adjusted to obtain a permeate flow rate of 2.0 m³/m²/day in back wash reverse filtration.

Comparative Example A

In comparative example A, filtration and back wash reverse filtration were performed by a running method similar to that in Inventive Example A except the following points, for measuring the transmembrane pressure difference of a spiral wound type membrane element 1 after a lapse of 40 days.

In comparative example A, filtration was performed for 300 minutes while adjusting the supply pressure to obtain a permeate flow rate of 3.0 m³/m²/day in filtration. Further, the time for back wash reverse filtration was set to 60 seconds, and the supply pressure was adjusted to obtain a permeate flow rate of 1.0 m³/m²/day in back wash reverse filtration.

Comparative Example B

In comparative example B, filtration and back wash reverse filtration were performed by a running method similar to that in Inventive Example A except the following points, for measuring the transmembrane pressure difference of a spiral wound type membrane element 1 after a lapse of 40 days.

In comparative example B, the time for back wash reverse filtration was set to 5 seconds, and the supply pressure was adjusted to obtain a permeate flow rate of 1.0 m³/m²/day in back wash reverse filtration.

Table 1 shows the results of measurement in Inventive Examples A to C and comparative examples A and B.

TABLE 1

|  | Inventive Example 1 | Inventive Example 2 | Inventive Example 3 | Comparative Example 1 | Comparative Example 2 |
|---|---|---|---|---|---|
| Permeate Flow Rate in Filtration (m³/m²/min.) | 2.0 | 2.0 | 1.0 | 3.0 | 2.0 |
| Filtration Time (min.) | 30 | 30 | 20 | 300 | 30 |

TABLE 1-continued

|  | Inventive Example 1 | Inventive Example 2 | Inventive Example 3 | Comparative Example 1 | Comparative Example 2 |
|---|---|---|---|---|---|
| Permeate Flow Rate in Back Wash Reverse Filtration (m³/m²/min.) | 1.0 | 2.0 | 2.0 | 1.0 | 1.0 |
| Washing Time (sec.) | 30 | 30 | 30 | 60 | 5 |
| Ratio of Permeate Volume $V_1$ in Filtration to Permeate Volume $V_2$ in Back Wash Reverse Filtration | 120 | 60 | 20 | 900 | 720 |
| Transmembrane Pressure Difference after Lapse of 40 Days (kgf/cm²) | 1.2 | 0.8 | 0.7 | 2.8 | 2.8 |

As shown in Inventive Examples A to C, loads on the separation membranes 7 and the net 8 are reduced and contaminants adhering to the membrane surface and the net 8 can be reliably removed and hence the change of the transmembrane pressure difference is small when the ratio $V_1/V_2$ of the permeate volume $V_1$ in filtration to the permeate volume $V_2$ in back wash reverse filtration is not more than 600. Thus, the spiral wound type membrane element 1 can be stably run continuously over a long period with high filtration efficiency. Particularly when the ratio $V_1/V_2$ is not more than 120 as shown in Inventive Examples A to C, the spiral wound type membrane element 1 can be more stably run continuously over a long period.

When the ratio $V_1/V_2$ exceeds 600 as shown in comparative examples A and B, contaminants sediment on the membrane surface and the net 8 in comparative example A resulting in large loads on the separation membranes 7 and the net 8 due to the excess permeate volume $V_1$ in filtration and in comparative example B performing insufficient back wash reverse filtration due to the small permeate volume $V_2$ in back wash reverse filtration, and hence the change of the transmembrane pressure difference is so increased that it is difficult to stably run the spiral wound type membrane element 1 continuously over a long period.

(3) Third Invention

Figure 16:
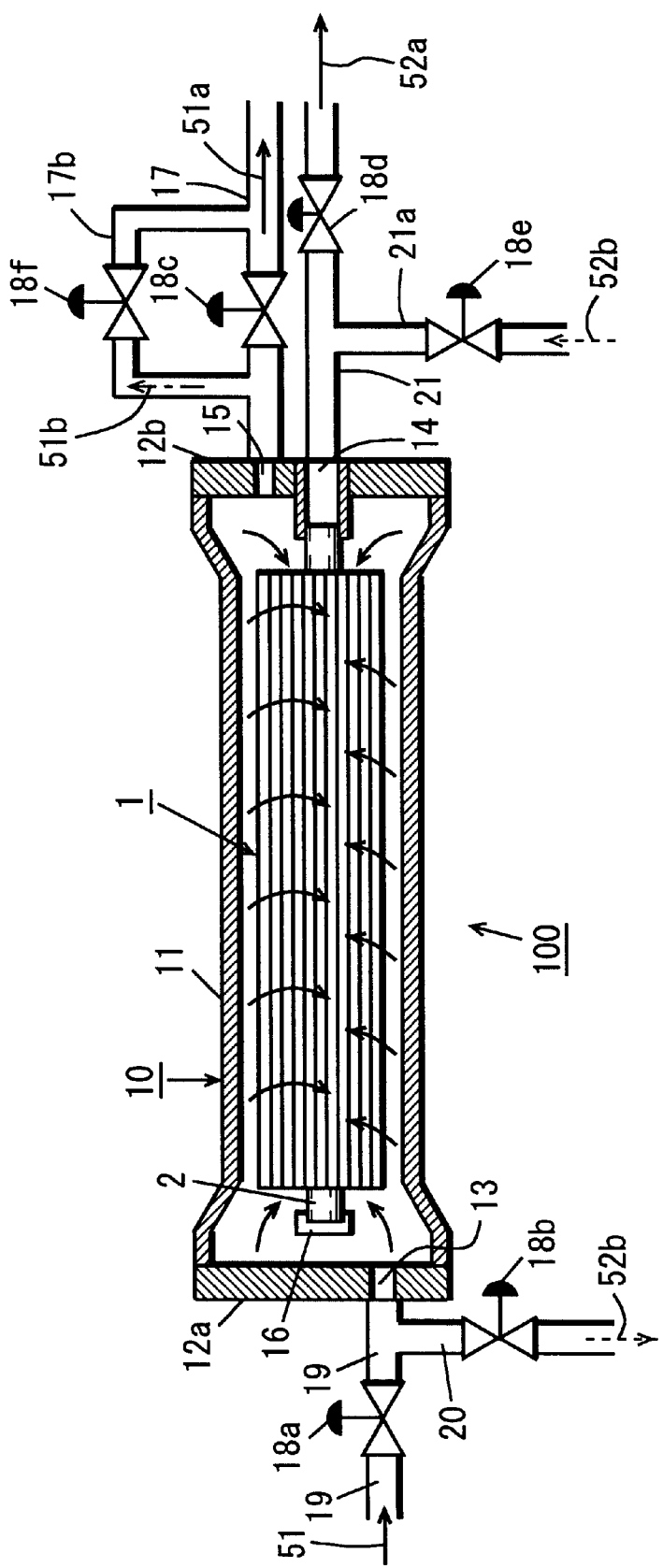
FIG. 16 is a sectional view showing an exemplary spiral wound type membrane module according to the third invention.
Figure 17:
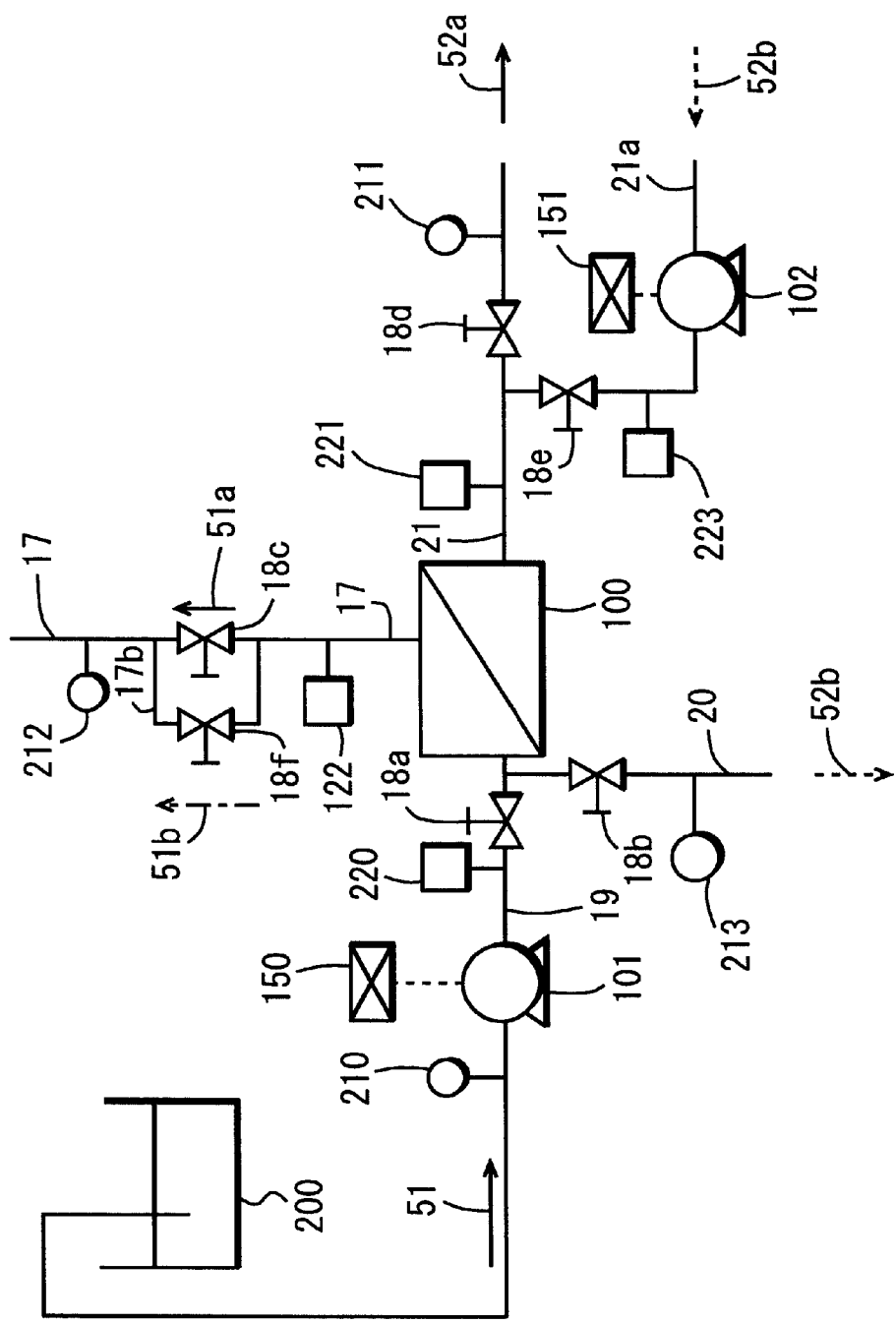
FIG. 17 is a typical block diagram showing a method of running the spiral wound type membrane module of FIG. 16.

FIG. 16 is a sectional view showing an exemplary spiral wound type membrane module according to this invention. FIG. 17 is a typical block diagram showing a method of running the spiral wound type membrane module shown in FIG. 16.

As shown in FIG. 16, the spiral wound type membrane module shown in FIG. 4 is employed as a spiral wound type module 100 in the running method according to this invention.

In this case, a raw water supply pipe 19 is connected to the raw water inlet 13 of the end plate 12a of the pressure vessel 10 of the spiral wound type membrane module 100, and a wash water takeout pipe 20 is further connected to the raw water supply pipe 19. The raw water supply pipe 19 and the wash water takeout pipe 20 are provided with valves 18a and 18b respectively. A raw water takeout pipe 17 is connected to the raw water outlet 15 of the end plate 12b, and a flushing pipe 17b is connected to the raw water takeout pipe 17. The raw water takeout pipe 17 is provided with a valve 18c, and the flushing pipe 17c is provided with a valve 18f in parallel with the valve 18c. A permeate takeout pipe 21 is connected to the permeate outlet 14, and a wash water supply pipe 21a is further connected to the permeate takeout pipe 21. The permeate takeout pipe 21 and the wash water supply pipe 21a are provided with valves 18d and 18e respectively. A timer (not shown) controls switching of the valves 18a, 18b, 18d, 18e, 18c and 18f of the pipes 19, 20, 21, 21a, 17 and 18b to open the valves 18a to 18f by prescribed times at prescribed time intervals respectively.

As shown in FIG. 17, the raw water inlet 13 (see FIG. 16) of the spiral wound type membrane module 100 is connected to a pressure pump 101 through the raw water supply pipe 19, and further connected to a raw water tank 200. An automatic controller 150 controls the pressure pump 101. The raw water supply pipe 19 is provided with a raw water flow meter 210 and a raw water inlet pressure gauge 220. The wash water takeout pipe 20 connected to the raw water supply pipe 19 is provided with a wash water flow meter 213. The raw water takeout pipe 17 connected to the raw water outlet 15 (see FIG. 16) of the spiral wound type membrane module 100 is provided with a raw water outlet pressure gauge 222 and a raw water outlet flow meter 212. Further, the permeate takeout pipe 21 connected to the permeate outlet 14 (see FIG. 16) of the spiral wound type membrane module 100 is provided with a permeate pressure gauge 221 and a permeate flow meter 211. The wash water supply pipe 21a connected to the permeate takeout pipe 21 is provided with a wash water pressure gauge 223 and connected with a pressure pump 102. An automatic controller 151 controls the pressure pump 102.

In this example, the raw water supply pipe 19, the valve 18a and the pressure pump 101 correspond to the raw liquid supply system, and the permeate takeout pipe 21 and the valve 18d correspond to the permeated liquid takeout system. Further, the wash water supply pipe 21a, the valve 18e and the pressure pump 102 correspond to the washing liquid introduction system, and the wash water takeout pipe 20 and the valve 18b correspond to the washing liquid takeout system. In addition, the timer (not shown) controlling the valves 18a to 18f and the automatic controllers 150 and 151 controlling the pressure pumps 101 and 102 correspond to the control system.

When running the spiral wound type membrane module 100, the valves 18a and 18d of the raw water supply pipe 19 and the permeate takeout pipe 21 are opened and the valves 18b, 18e, 18c and 18f of the remaining pipes 20, 21a, 17 and 17b are closed as shown in FIG. 17. Raw water 51 collected from the raw water tank 200 is pressurized by the pressure pump 101 and introduced into the pressure vessel 10 from the raw water inlet 13 of the pressure vessel 10 through the raw water supply pipe 19.

The raw water 51 if lows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the spiral wound type membrane module 100, the raw water 51 infiltrates into the clearances between the envelope-like membranes 3 from the outer peripheral side and both ends of the spiral wound type membrane element 1, as shown in FIG. 16. Permeate permeating through the separation membranes 7 flows into the water collection pipe 2 along the permeate spacers 6. Thus, permeate 52a is taken out from the permeate outlet 14 of the pressure vessel 10 through the permeate takeout pipe 21. Thus, dead end filtration is performed.

In this case, the outer peripheral surface of the spiral membrane component 1a is covered with the separation membrane 9 as shown in FIG. 1, whereby contaminants such as turbid substances larger than the pore size of the separation membrane 9 are captured on at least the outer peripheral portion of the spiral wound type membrane element 1. In other words, only contaminants smaller than the pore size of the separation membrane 9 infiltrate into the clearances between the envelope-like membranes 3. Thus, loads on the separation membranes 7 forming the envelope-like membranes 3 are reduced.

When running the aforementioned spiral wound type membrane module 100, partial raw water 51a may be taken out from the raw water outlet 15 by opening the valve 18c of the raw water takeout pipe 17. In this case, the valve 18c is opened in a prescribed size so that the raw water 51a can be taken out in a prescribed volume. The valve 18c is adjusted with the raw water outlet flow meter 212 or the raw water outlet pressure gauge 222, for example. A flow of the raw water 51a can be formed on the outer peripheral portion of the spiral wound type membrane element 1 by taking out the partial raw water 51a from the raw water takeout pipe 17. Thus, part of contaminants contained in the raw water 51 can be taken out from the pressure vessel 10 through the raw water takeout pipe 17 with the raw water 51a while suppressing sedimentation of the contaminants.

A circulation system connecting the raw water outlet 15 to the raw water tank 200 may be further provided for returning at least part of the taken-out raw water 51a to the raw water tank 200 again by the circulation system. In this case, the raw water 51a can be circulated to be supplied as the raw water 51 again, whereby the permeate 52a is obtained with high recovery.

The aforementioned running of the spiral wound type membrane module 100 is influenced by the temperature or the like as well as by contaminants adhering to and sedimenting on the membrane surface, the raw water spacers 4, the outer peripheral portion etc. of the spiral wound type membrane element 1 following running.

When contaminants sediment on the membrane surface, the outer peripheral portion etc. of the spiral wound type membrane element 1, for example, the permeate hardly permeates through the separation membrane 9 and the envelope-like membranes 3. Thus, the flow rate of the permeate 52a obtained through the permeate takeout pipe 21 is reduced and the flow rate of the raw water 51 supplied through the raw water supply pipe 19 is reduced. In order to suppress such reduction of the flow rate of the permeate 52a or the raw water 51 for regularly stably running the spiral wound type membrane module 100, control is so performed as to regularly maintain the flow rate of the permeate 52a or the raw water 51 constant in the aforementioned method of running a spiral wound type membrane module. The control method in running is now described.

When controlling running so that the flow rate of the permeate 52a is regularly constant, the permeate flow meter 211 provided on the permeate takeout pipe 21 measures the flow rate of the permeate 52a. When contaminants sediment on the membrane surface, the outer peripheral portion etc. of the spiral wound type membrane element 1, the flow rate of the permeate 52a is reduced. When observing such change of the flow rate of the permeate 52a, the permeate flow meter 211 sends a signal to the automatic controller 150. The automatic controller 150 controls the output (rotational frequency) of the pressure pump 101 on the basis of this signal, for adjusting the supply pressure and the supply flow rate of the raw water 51. Thus, the flow rate of the permeate 52a is recovered and regularly maintained constant. Thus, a system capable of regularly obtaining constant volume of product water is implemented.

When controlling running so that the flow rate of the supplied raw water 51 is regularly constant, the raw water flow meter 210 provided on the raw water supply pipe 19 measures the flow rate of the raw water 51. When contaminants sediment on the membrane surface, the outer peripheral portion etc. of the spiral wound type membrane element 1, the flow rate of the raw water 51 is reduced. When observing such change of the flow rate of the raw water 51, t he raw water flow meter 210 sends a signal to the automatic controller 150. The automatic controller 150 controls the output (rotational frequency) of the pressure pump 101 on the basis of this signal, for adjusting the supply pressure for the raw water 51. Thus, the flow rate of the raw water 51 is recovered and regularly maintained constant. Thus, a system regularly making the water collection volume constant is implemented.

When performing dead end filtration by closing the valve 18c of the raw water takeout pipe 17 as described above, the flow rate of the raw water 51 is equal to that of the permeate 52a in theory and hence the operation of maintaining the flow rate of the raw water 51 constant is equivalent to the operation of maintaining the flow rate of the permeate 52a constant.

As described above, control is so performed that the flow rate of the raw water 51 or the permeate 52a is constant when running the spiral wound type membrane module 100, whereby the spiral wound type membrane module 100 can be regularly stably run.

While the above description has been made on the so-called quantitative running for controlling running of the spiral wound type membrane module 100 so that the flow rate of the raw water 51 or the permeate 52a is constant, the so-called constant pressure running may alternatively be performed for controlling running so that the running pressure of the spiral wound type membrane module 100 is constant. In such constant pressure running, running is so controlled that the pressure on the raw water inlet side is constant, for example.

When controlling running so that the pressure on the raw water inlet side is regularly constant, the raw water inlet pressure gauge 220 provided o n the raw water supply pipe 19 measures the pressure of the raw water 51. When contaminants sediment on the membrane surface, the outer peripheral portion etc. of the spiral wound type membrane element 1, the pressure on the raw water inlet side is increased. When observing such change of the pressure on the raw water inlet side, the raw water inlet pressure gauge 220 sends a signal to the automatic controller 150. The automatic controller 150 controls the output (rotational frequency) of the pressure pump 101 on the basis of the signal, for adjusting the supply flow rate of the raw water 51. Thus, increase of the pressure on the raw water inlet side is suppressed so that the pressure on the raw water inlet side is regularly maintained constant.

Also in the constant pressure running performing control so that the pressure on the raw water inlet side is constant, the spiral wound type membrane module 100 can be regularly stably run similarly to the aforementioned quantitative running.

After performing filtration for a prescribed time in the aforementioned manner, back wash reverse filtration is performed from the permeation side with the permeate 52b. In this back wash reverse filtration, the valves 18a, 18d, 18c and 18f of the raw water supply pipe 19, the permeate takeout pipe 21, the raw water takeout pipe 17 and the flushing pipe 17b are closed and the valves 18e and 18b of the wash water supply pipe 21a and the wash water takeout pipe 20 are opened. When the valve 18c of the raw water takeout pipe 17 is opened in a prescribed size for taking out the partial raw water 51a as described above, the valve 18c is kept open in the prescribed size also in washing.

The permeate 52b pressurized by the pressure pump 102 is introduced as wash water into the water collection pipe 2 from the permeate outlet 14 of the spiral wound type membrane module 100 through the wash water supply pipe 21a and the permeate takeout pipe 21. In this case, back wash reverse filtration in the spiral wound type membrane element 1 is performed as shown in FIG. 5.

As shown in FIG. 5, the permeate 52b permeates through the envelope-like membranes 3 from the water collection pipe 2, separates contaminants adhering to the membrane surface, the raw water spacers 4 and the like, and flows toward at least the outer peripheral portion along the raw water spacers 4. The permeate 52b readily separates contaminants captured on at least the outer peripheral portion, particularly the separation membrane 9 of the spiral wound type membrane element 1. The separated contaminants are discharged from the raw water inlet 13 through the wash water takeout pipe 20 with the permeate 52a.

The degree of adhesion of the contaminants to the membrane surface, the outer peripheral portion etc. of the spiral wound type membrane element 1 is reflected on the degree of the change of the pressure on the raw water inlet side in running or the change of the transmembrane pressure difference, the degree of the change of the flow rate of the permeate 52a in running, or the degree of the change of the flow rate of the permeate 52b discharged in back wash reverse filtration. In the aforementioned back wash reverse filtration, therefore, the condition for back wash reverse filtration, i.e., the supply pressure for the permeate 52b employed for back wash reverse filtration, the supply f low rate of the permeate 52b, the time interval for back wash reverse filtration or the time of back wash reverse filtration is adjusted in response to the degree of the change of the pressure on the raw water inlet side in running or the change of the transmembrane pressure difference, the degree of the change of the flow rate of the permeate 52a in running, or the degree of the change of the flow rate of the permeate 52b discharged in back wash reverse filtration. In this case, the automatic controller 151 controls the output (rotational frequency) of the pressure pump 102, for controlling the supply flow rate or the supply pressure for the permeate 52b employed for back wash reverse filtration in response to the degree of contamination of the spiral wound type membrane element 1. A timer (not shown) controls switching of the valves 18a, 18b, 18d, 18e, 18c and 18f of the pipes 19, 20, 21, 21a, 17 and 17b to automatically open the valves 18a to 18f by prescribed times at prescribed time intervals. A control method in washing is now described.

In the spiral wound type membrane module 100 subjected to quantitative running controlling the flow rate of the permeate 52a or the raw water 51 constant as described above, the permeate 52a hardly permeates through the separation membrane 9 and the envelope-like membranes 3 following sedimentation of contaminants on the membrane surface, the outer peripheral portion etc. of the spiral wound type membrane element 1, and the pressure on the raw water inlet side exceeds that on the permeate outlet side. When contaminants further sediment, the difference (transmembrane pressure difference) between the pressure on the raw water inlet side and that on the permeate outlet side is further increased. Thus, the degree of the change of the pressure in the raw water inlet side or the degree of the change of the transmembrane pressure difference reflects the degree of contamination of the spiral wound type membrane element 1, and hence the raw water inlet pressure gauge 220 provided on the raw water supply pipe 19 or the raw water inlet pressure gauge 220 and the permeate outlet pressure gauge 221 provided on the permeate takeout pipe 21 measure the pressure on the raw water inlet side or the transmembrane pressure difference for adjusting the supply flow rate and the supply pressure for the permeate 52b employed for back wash reverse filtration as well as the time interval for back wash reverse filtration and the time for back wash reverse filtration in response to the degree of the change of the pressure on the raw water inlet sidle or the degree of the change of the transmembrane pressure difference. The raw water inlet pressure gauge 220 may measure the pressure on the raw water inlet side for adjusting the supply flow rate and the supply pressure for the permeate 52b employed for back wash reverse filtration as well as the time interval for back wash reverse filtration and the time for back wash reverse filtration in response to the degree of the change of the pressure on the raw water inlet side.

When the change of the pressure on the raw water inlet side or the change of the transmembrane pressure difference is small, for example, the quantity of contaminants sedimenting on the spiral wound type membrane element 1 is small and hence the automatic controller 151 sets the output (rotational frequency) of the pressure pump 102 low for reducing the supply flow rate and the supply pressure for the permeate 52b employed for back wash reverse, filtration. Further, the timer controls switching of the valves 18a to 18f for increasing the time interval for back wash reverse filtration and reducing the time for back wash reverese filtration. When the change of the pressure on the raw water inlet side or the change of the transmembrane pressure difference is large, on the other hand, the quantity of contaminants sedimenting on the spiral wound type membrane element 1 is large and hence the automatic controller 151 sets the output (rotational frequency) of the pressure pump 102 high for increasing the supply flow rate and the supply pressure for the permeate 52b employed for back wash reverse filtration. Further, the timer controls switching of the valves 18a to 18f for reducing the time interval for back wash reverse filtration and increasing the time for back wash reverse filtration.

As hereinabove described, it is possible to readily and reliably remove contaminants with high efficiency and suppress increase of the pressure on the raw water inlet side or the transmembrane pressure difference by controlling the supply flow rate and the supply pressure for the permeate 52b employed for back wash reverse filtration, the time interval for back wash reverse filtration and the time for back wash reverse filtration in response to the degree of the change of the pressure on the raw water inlet side of the spiral wound type membrane module 100 or the degree of the change of the transmembrane pressure difference.

In the spiral wound type membrane module 100 subjected to constant pressure running controlling the pressure on the raw water side constant as described above, the permeate 52a hardly permeates through the separation membrane 9 and the envelope-like membranes 3 following sedimentation of contaminants on the membrane surface, the outer peripheral portion etc. of the spiral wound type membrane element 1, and the flow rate of the permeate 52a is reduced. Thus, the degree of the change of the flow rate of the permeate 52a reflects the degree of contamination of the spiral wound type membrane element 1, and hence the permeate pressure gauge 211 provided on the permeate takeout pipe 21 measures the flow rate of the permeate 52a for adjusting the supply flow rate and the supply pressure for the permeate 52b employed for back wash reverse filtration as well as the time interval for back wash reverse filtration and the time for back wash reverse filtration in response to the degree of the change of the flow rate of the permeate 52a.

When the change of the flow rate of the permeate 52a in running is small, for example, the quantity of contaminants sedimenting on the spiral wound type membrane element 1 is small and hence the automatic controller 151 controls the pressure pump 102 for suppressing the supply pressure and the supply flow rate of the permeate 52b employed for back wash reverse filtration, as described above with reference to quantitative running. Further, the timer controls switching of the valves 18a to 18f for increasing the time interval for back wash reverse filtration and reducing the time for back wash reverse filtration. When the change of the flow rate of the permeate 52a in running is large, on the other hand, the quantity of contaminants sedimenting on the spiral wound type membrane element 1 is larger and hence the automatic controller 151 controls the pressure pump 102 for increasing the supply flow rate and the supply pressure for the permeate 52b employed for back wash reverse filtration. Further, the timer controls switching of the valves 18a to 18f for reducing the time interval for back wash reverse filtration and increasing the time for back wash reverse filtration.

As hereinabove described, it is possible to readily and reliably remove contaminants with high efficiency and suppress reduction of the flow rate of the permeate 52a in running by controlling the supply flow rate and the supply pressure for the permeate 52b employed for back wash reverse filtration, the time interval for back wash reverse filtration and the time for back wash reverse filtration in response to the degree of the change of the flow rate of the permeate 52a in running of the spiral wound type membrane module 100.

Alternatively, the supply flow rate and the supply pressure for the permeate 52b employed for back wash reverse filtration may be controlled while the time interval for back wash reverse filtration and the time for back wash reverse filtration may be changed in response to the degree of reduction of the flow rate of the permeate 52b discharged in back wash reverse filtration. When contaminants sediment on the membrane surface, the outer peripheral portion etc. of the spiral wound type membrane element 1, the permeate 52b supplied in washing hardly permeates through the separation membrane 9 and the envelope-like membranes 3, and hence the flow rate of the permeate 52b discharged from the wash water takeout pipe 20 is reduced. Thus, the degree of the change of the flow rate of the discharged permeate 52b reflects the degree of contamination of the spiral wound type membrane element 1, and hence the wash pressure gauge 213 provided on the permeate takeout pipe 20 measures the flow rate of the discharged permeate 52b for adjusting the supply pressure and the supply flow rate of the permeate 52b employed for back wash reverse filtration as well as the time interval for back wash reverse filtration and the time for back wash reverse filtration in response to the degree of the change of the flow rate of the permeate 52b.

When the change of the flow rate of the permeate 52b discharged from the permeate takeout pipe 20 is small, for example, the quantity of contaminants sedimenting on the spiral wound type membrane element 1 is small and hence the automatic controller 151 controls the output (rotational frequency) of the pressure pump 102 for suppressing the supply flow rate and the supply pressure for the permeate 52b employed for back wash reverse filtration. Further, the timer controls switching of the valves 18a to 18f for increasing the time interval for back wash reverse filtration and reducing the time for back wash reverse filtration. When the change of the flow rate of the discharged permeate 52b is large, on the other hand, the quantity of contaminants sedimenting on the spiral wound type membrane element 1 is large and hence the automatic controller 151 increases the output (rotational frequency) of the pressure pump 102 for increasing the supply flow rate and the supply pressure for the permeate 52b employed for back wash reverse filtration. Further, the timer controls switching of the valves 18a to 18f for reducing the time interval for back wash reverse filtration and increasing the time for back wash reverse filtration.

As hereinabove described, it is possible to readily and reliably remove contaminants with high efficiency and suppress reduction of the flow rate of the discharged permeate 52b by controlling the supply flow rate and the supply pressure for the permeate 52b employed for back wash reverse filtration, the time interval for back wash reverse filtration and the time for back wash reverse filtration in response to the degree of the change of the flow rate of the permeate 52b employed for back wash reverse filtration and thereafter discharged.

After the aforementioned back wash reverse filtration, flushing is performed with the raw water 51b. The valve 18a of the raw water supply pipe 19 is opened and the valves 18b and 18e of the wash water takeout pipe 20 and the wash water supply pipe 21a are closed for supplying the raw water 51b from the raw water inlet 13 through the raw water supply pipe 19 and opening the valve 18f of the flushing pipe 17b. Thus, the raw water 51b linearly flows axially along the outer peripheral passage forming member 5 so that contaminants separated by back wash reverse filtration are discharged from the raw outer outlet 15 through the flushing pipe 17b with the raw water 51b. Further, contaminants remaining on the membrane surface, the outer peripheral portion etc. of the spiral wound type membrane element 1 are separated from the spiral wound type membrane element 1 by flushing, and discharged with the raw water 51b as described above. Consequently, the membrane flux is remarkably recovered as compared with that before washing.

According to the aforementioned washing method performing back wash reverse filtration and flushing, contaminants adhering to the membrane surface, the outer peripheral portion etc. particularly the separation membrane 9 of the spiral wound type membrane element 1 can be readily and reliably discharged along the outer peripheral passage forming member 5 with high efficiency, whereby increase of the resistance of the separation membrane 9 can be suppressed. Thus, a stable permeate flow rate can be regularly maintained. Further, the spiral wound type membrane element 1 can be effectively washed by controlling the condition for back wash reverse filtration in response to the degree of contamination of the spiral wound type membrane element 1, whereby the spiral wound type membrane module 100 can be stably run with high product efficiency of the permeate 52a.

Further, handleability is improved since the outer peripheral portion of the spiral wound type membrane element 1 is covered with the outer peripheral passage forming member 5 as shown in FIG. 1.

As shown in FIG. 16, further, no dead space such as the dead space S shown in FIG. 27 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to use a large pump for supplying the raw water 51, whereby the system cost is reduced.

While the permeate 52b is first introduced into the water collection pipe 2 for separating the contaminants captured on the outer peripheral portion, the membrane surface etc. of the spiral wound type membrane element 1 by back wash reverse filtration and thereafter performing flushing with the raw water 51 in the above description, flushing may alternatively be performed first for thereafter performing back wash reverse filtration. According to this washing method, most of the contaminants captured on the membrane surface, the outer peripheral portion etc. of the spiral wound type membrane element 1 are removed by flushing and those remaining on the membrane surface, the outer peripheral portion etc. of the spiral wound type membrane element 1 can be removed by further performing back wash reverse filtration. Alternatively, flushing may be performed simultaneously with back wash reverse filtration. Also in this case, effects similar to the above can be attained.

At least part of the raw water 51b discharged after flushing or the permeate 52b discharged after back wash reverse filtration may be returned to the raw water tank 200 again. In this case, it is possible to circulate at least part of the raw water 51b or the permeate 52b for supplying the same as the raw water 51 again, whereby the permeate 52a can be obtained with high recovery.

While the method of running a spiral wound type membrane module according to this invention is applied to the spiral wound type membrane module 100 having the spiral wound type membrane element 1 shown in FIG. 1 in the above description, the method of running a spiral wound type membrane module according to this invention is also applicable to a spiral wound type membrane module having a spiral wound type membrane element other than that shown in FIG. 1, such as that shown in FIG. 7(a), 7(b), 8 or 13 described with reference to the first invention, for example. Also in this case, effects similar to those in the case of employing the spiral wound type membrane element 1 of FIG. 1 can be attained.

Another exemplary method of running a spiral wound type membrane module according to this invention is now described with reference to the spiral wound type membrane element 1 shown in FIG. 8.

When running a spiral wound type membrane module having the spiral wound type membrane element 1 of FIG. 8 by a running method similar to that shown in FIGS. 16 and 17, contaminants such as turbid substances larger than the pore size of the net 8 are captured on at least the outer peripheral portion of the spiral wound type membrane element 1 since the outer peripheral surface of the spiral membrane component 1a is covered with the net 8. In other words, only contaminants smaller than the pore size of the net 8 infiltrate into the clearances between the envelope-like membranes 3. Thus, loads on the separation membranes 7 forming the envelope-like membranes 3 are reduced.

Also in this example, running is suppressed so that the flow rate of the permeate 52a or the flow rate of the raw water 51 is constant similarly to the example shown in FIGS. 16 and 17, for performing quantitative running. Thus, the spiral wound type membrane module can be regularly stably run.

As described above with reference to FIG. 17, constant pressure running may be performed by controlling running so that the pressure on the raw water inlet side is constant in addition to the quantitative running also in this case.

In washing, on the other hand, back wash reverse filtration and flushing are performed by a washing method similar to the method of washing the spiral wound type membrane module 100 of FIG. 16 having the spiral wound type membrane element 1 shown in FIG. 1. In this case, back wash reverse filtration in the spiral wound type membrane element 1 of FIG. 8 is performed as shown in FIG. 12.

As shown in FIG. 12, the permeate 52b supplied through the wash water supply pipe 21a permeates through the envelope-like membranes 3 from the water collection pipe 2, separates contaminants adhering to the membrane surface, the raw water spacers 4 etc., and flows toward at least the outer peripheral portion along the raw water spacers 4. The permeate 52b readily separates contaminants captured on at least the outer peripheral portion, particularly the net 8 of the spiral wound type membrane element 1. After performing back wash reverse filtration in this manner, flushing is performed with the raw water 51b. Contaminants separated by back wash reverse filtration are discharged from the raw water outlet 15 through the flushing pipe 17b due to flushing. Contaminants remaining on the membrane surface, the outer peripheral portion etc. of the spiral wound type membrane element 1 are separated from the spiral wound type membrane element 1 due to flushing, and discharged as described above. Consequently, the membrane flux is remarkably recovered as compared with that before washing.

Also in this case, the condition for back wash reverse filtration, i.e., the supply pressure for the permeate 52b employed for back wash reverse filtration, the supply flow rate of the permeate 52b, the time interval for back wash reverse filtration or the time for back wash reverse filtration is controlled in response to the degree of the change of the pressure on the raw water inlet side in running or the degree of the change of the transmembrane pressure difference, the degree of the change of the flow rate of the permeate 52a in running, or the degree of the change of the flow rate of the permeate 52b discharged after back wash reverse filtration, similarly to the example of FIGS. 16 and 17. Thus, the spiral wound type membrane element 1 can be effectively washed stably with high production efficiency of the permeate 52a.

According to the aforementioned washing method, contaminants adhering to the outer peripheral portion, particularly the net 8 of the spiral wound type membrane element 1 shown in FIG. 8 can be readily and reliably discharged along the outer peripheral passage forming member 5, whereby increase of the resistance of the net 8 can be suppressed. Thus, a stable permeate flow rate can be regularly maintained.

In the spiral wound type membrane element 1 shown in FIG. 8, the outer peripheral surface of the spiral membrane component 1a is covered with the net 8, whereby the spiral membrane component 1a is prevented from swelling by the net 8 covering the outer peripheral portion so that the clearances between the envelope like membranes 3 are not enlarged even if back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52a.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

Further, the outer peripheral portion of the spiral wound type membrane element 1 shown in FIG. 8 is covered with the outer peripheral passage forming member 5, whereby handleability of the spiral wound type membrane element 1 is improved.

In the spiral wound type membrane module having the spiral wound type membrane element 1 shown in FIG. 8, no dead space is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51, whereby the system cost is reduced.

While the above description has been made with reference to the spiral wound type membrane module formed by charging the pressure vessel with the single spiral wound type membrane element, the method of running a spiral wound type membrane module according to this invention is also applicable to a spiral wound type membrane module formed by charging a pressure vessel with a plurality of spiral wound type membrane elements.

Figure 18:
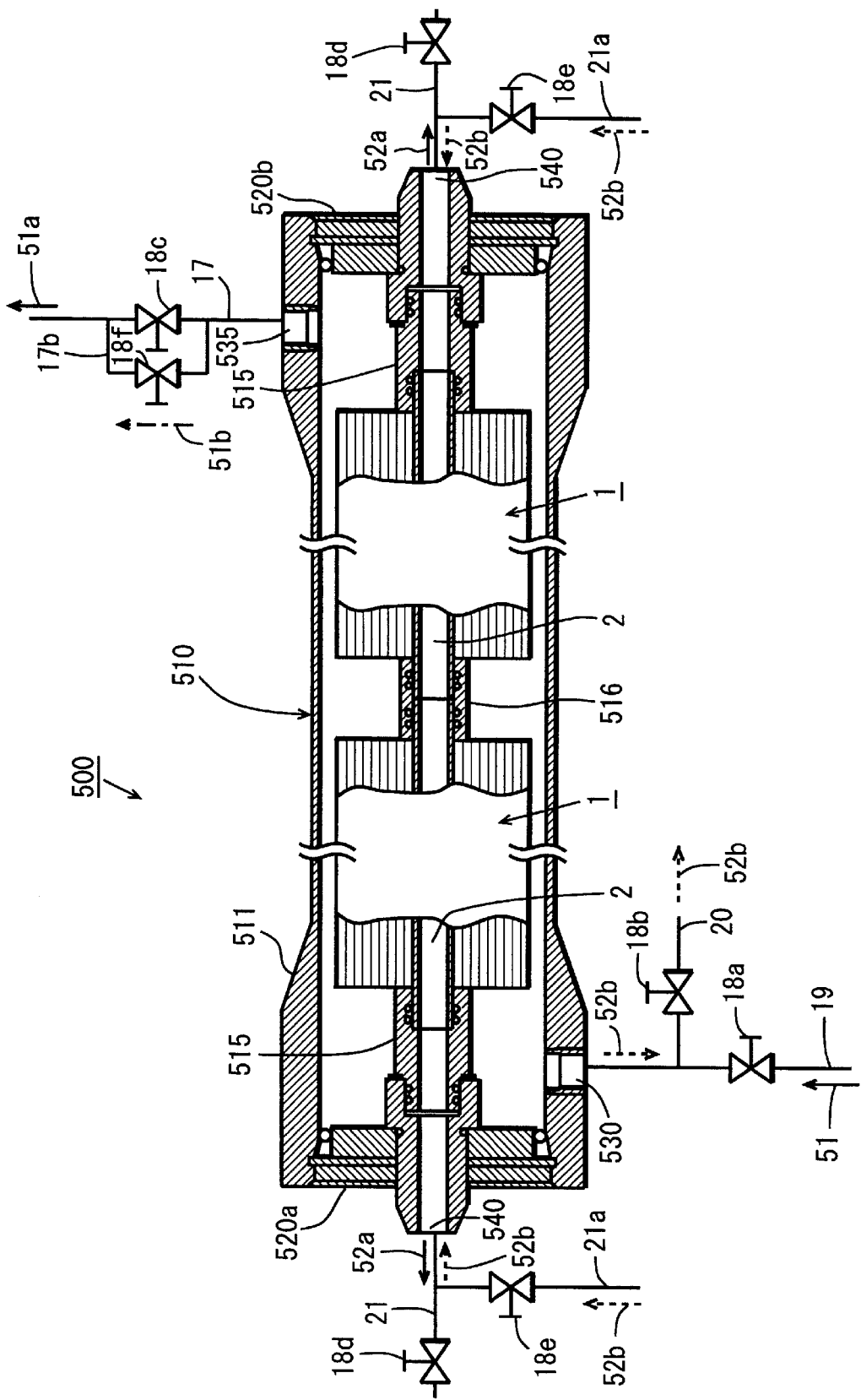
FIG. 18 is a sectional view showing another exemplary method of running the spiral wound type membrane module according to the third invention.

FIG. 18 is a atypical sectional view showing another exemplary method of running a spiral wound type membrane module according to this invention.

As shown in FIG. 18, a pressure vessel 510 is formed by a tubular case 511 and a pair of end plates 520a and 520b. A raw water inlet 530 is formed on the bottom portion of the tubular case 511, and a raw water outlet 535 is formed on the upper portion. The raw water outlet 535 is employed also for deairing. Permeate outlets 540 are provided on the central portions of the end plates 520a and 520b.

The tubular case 511 stores a plurality of spiral wound type membrane elements 1 having water collection pipes 2 serially coupled with each other through an interconnector 516, and both opening ends of the tubular case 511 are sealed with the end plates 520a and 520b respectively. Each spiral wound type membrane element 1 can be prepared from that shown in FIG. 1, 7(a), 7(b), 8 or 13. In this case, the spiral wound type membrane element 1 shown in FIG. 1 is employed. Single end portions of the water collection pipes 2 of the spiral wound type membrane elements 1 located on both end portions are engaged with the permeate outlets 540 of the end plates 520a and 520b through adapters 515 respectively. Thus, a spiral wound type membrane module 500 is formed by charging the pressure vessel 510 with the plurality of spiral wound type membrane elements 1.

A raw water supply pipe 19 is connected to the raw water inlet 530 of the tubular case 511, and a wash water takeout pipe 20 is further connected to the raw water supply pipe 19. The raw water supply pipe 19 and the wash water takeout pipe 20 are provided with valves 18a and 18b respectively. A raw water takeout pipe 17 is connected to the raw water outlet 535 of the tubular case 511, and a flushing pipe 17b is connected to the raw water takeout pipe 17. The raw water takeout pipe 17 is provided with a valve 18c, and the flushing pipe 17c is provided with a valve 18f in parallel with the valve 18c. Permeate takeout pipes 21 are connected to the permeate outlets 540 of the end plates 520a and 520b respectively, and wash water supply pipes 21a are further connected to the permeate takeout pipes 21. The permeate takeout pipes 21 and the wash water supply pipes 21a are provided with valves 18d and 18e respectively. A timer (not shown) controls switching of the valves 18a, 18b, 18d, 18e, 18c and 18f of the pipes 19, 20, 21, 21a, 17 and 18b to open the valves 18a to 18f by prescribed times at prescribed time intervals respectively.

When running the spiral wound type membrane module 500, the valves 18a and 18d of the raw water supply pipe 19 and the permeate takeout pipes 21 are opened and the valves 18b, 18e, 18c and 18f of the remaining pipes 20, 21a, 17 and 17b are closed similarly to the example shown in FIGS. 16 and 17. Raw water 51 collected from a raw water tank (not shown) is pressurized by a pressure pump (not shown) and introduced into the pressure vessel 510 from the raw water inlet 530 of the pressure vessel 510 through the raw water supply pipe 19.

In each spiral wound type membrane element 1, the raw water 51 permeates through the separation membrane 9 from at least the outer peripheral side and infiltrates into the clearances between the envelope-like membranes 3 along the raw water spacers 4. Permeate permeating through the separation membranes 7 flows into the water collection pipe 7 along the permeate spacers 6, and permeate 52a is taken out from the permeate outlets 540 on both ends of the pressure vessel 510.

According to the aforementioned method of running a spiral wound type membrane element and a spiral wound type membrane module, the raw water 51 is supplied from at least the outer peripheral side of each spiral wound type membrane element 1 for performing dead end filtration in each spiral wound type membrane element 1, similarly to the method of running a spiral wound type membrane module shown in FIG. 17. In this case, contaminants are captured on at least the outer peripheral portion in each spiral wound type membrane element 1. Therefore, loads on the separation membranes 7 forming the envelope-like membranes 3 are reduced.

Also when running the spiral wound type membrane module 500, partial raw water 51a may be taken out from the raw water outlet 535 by opening the valve 18c of the raw water takeout pipe 17 for axially forming a flow of the raw water 51a along the outer peripheral portion of each spiral wound type membrane element 1, as described with reference to the method of running the spiral wound type membrane module 100 shown in FIG. 16. In this case, part of contaminants contained in the raw water can be discharged from the pressure vessel 510 while suppressing sedimentation of the contaminants, whereby a more stable permeate flow rate can be obtained. Further, a circulation system connecting the raw water outlet 535 to a raw water tank (not shown) may be provided for returning at least part of the taken-out raw water 51a to the raw water tank. In this case, the circulation system can circulate the raw water 51a and supply the same as the raw water 51 again, whereby the permeate 52a is obtained with high recovery.

Also when running the aforementioned spiral wound type membrane module 500, running is controlled so that the flow rate of the raw water 51 or the flow rate of the permeate 52a is constant, for performing quantitative running. Thus, the spiral wound type membrane module 500 can be regularly stably run.

In addition to the aforementioned quantitative running, running may be so controlled that the pressure on the raw water inlet side is constant for performing constant pressure running as described above with reference to the spiral wound type membrane module 100. Also in such constant pressure running, the spiral wound type membrane module 500 can be regularly stably run similarly to the case of quantitative running.

After performing filtration for a prescribed time, back wash reverse filtration is performed from the permeation side with the permeate 52b by a method similar to that for washing the spiral wound type membrane module 100. In back wash reverse filtration, the valves 18a, 18d, 18c and 18f of the raw water supply pipe 19, the permeate takeout pipes 21, the raw water takeout pipe 17 and the flushing pipe 17b are closed and the valves 18e and 18d of the wash water supply pipes 21a and the wash water takeout pipe 20 are opened. The permeate 52b pressurized by a pressure pump (not shown) on the wash water supply side is introduced as wash water into the water collection pipe 2 from the permeate outlets 540 of the spiral wound type membrane module 500 through the wash water supply pipes 21a and the permeate takeout pipes 21.

In each spiral wound type membrane element 1, the permeate 52b permeates through the envelope-like membranes 3 from the water collection pipe 2, separates contaminants from the membrane surface, the raw water spacers 4 etc. and flows toward at least the outer peripheral portion along the raw water spacers 4, as shown in FIG. 5. The permeate 52b readily separates contaminants captured on at least the outer peripheral portion of each spiral wound type membrane element 1. The separated contaminants are discharged from the raw water inlet 530 through the wash water takeout pipe 20 with the permeate 52b.

Also in back wash reverse filtration of the spiral wound type membrane module 500, the condition for back wash reverse filtration, i.e., the supply pressure for the permeate 52b employed for back wash reverse filtration, the supply flow rate of the permeate 52b, the time interval for back wash reverse filtration or the time of back wash reverse filtration is adjusted in response to the degree of the change of the pressure on the raw water inlet side in running or the change of the transmembrane pressure difference, the degree of the change of the flow rate of the permeate 52a in running, or the degree of the change of the flow rate of the permeate 52b employed for back wash reverse filtration, similarly to the case of the spiral wound type membrane module 100. Thus, each spiral wound type membrane element 1 can be effectively washed for stably performing running with high production efficiency of the permeate 52a.

After the aforementioned back wash reverse filtration, flushing is performed with the raw water 51b. The valve 18a of the raw water supply pipe 19 is opened and the valves 18b and 18e of the wash water takeout pipe 20 and the wash water supply pipes 21a are closed for supplying the raw water 51 from the raw water inlet 530 through the raw water supply pipe 19 and opening the valve 18f of the flushing pipe 17b. Thus, the raw water 51b linearly flows axially along the outer peripheral passage forming member 5, and contaminants separated by back wash reverse filtration are discharged from the raw water outlet 535 through the flushing pipe 17b with the raw water 51b. Further, contaminants remaining on the membrane surface, the outer peripheral portion etc. of each spiral wound type membrane element 1 are separated from each spiral wound type membrane element 1 by flushing and discharged with the raw water 51b as described above. Consequently, the membrane flux is remarkably recovered as compared with that before washing.

Also in the spiral wound type membrane module 500 of this example, flushing may be performed before or simultaneously with back wash reverse filtration, similarly to the case of the spiral wound type membrane module 100. Also in this case, effects similar to those of the aforementioned case performing flushing after back wash reverse filtration can be attained.

According to the aforementioned washing method, contaminants adhering to the membrane surface, the raw water spacers 4, the outer peripheral portion etc. of each spiral wound type membrane element 1 can be readily and reliably discharged along the outer peripheral passage forming member 5 with high efficiency in the spiral wound type membrane module 500 shown in FIG. 18, whereby a stable permeate flow rate can be obtained.

The spiral wound type membrane module 500 is charged with the plurality of spiral wound type membrane elements 1, whereby the spiral wound type membrane module 500 has a large capacity of treatment and the permeate 52a can be efficiently obtained.

As shown in FIG. 18, no dead space is defined in the clearance between each spiral wound type membrane element 1 and the pressure vessel 510 due to the aforementioned filtration mode, whereby high reliability is attained with no problems such as propagation of germs such as microorganisms, occurrence of a bad smell resulting from decomposition of organic matter and decomposition of the separation membranes.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51, whereby the system cost is reduced.

(4) Fourth Invention

Figure 19:
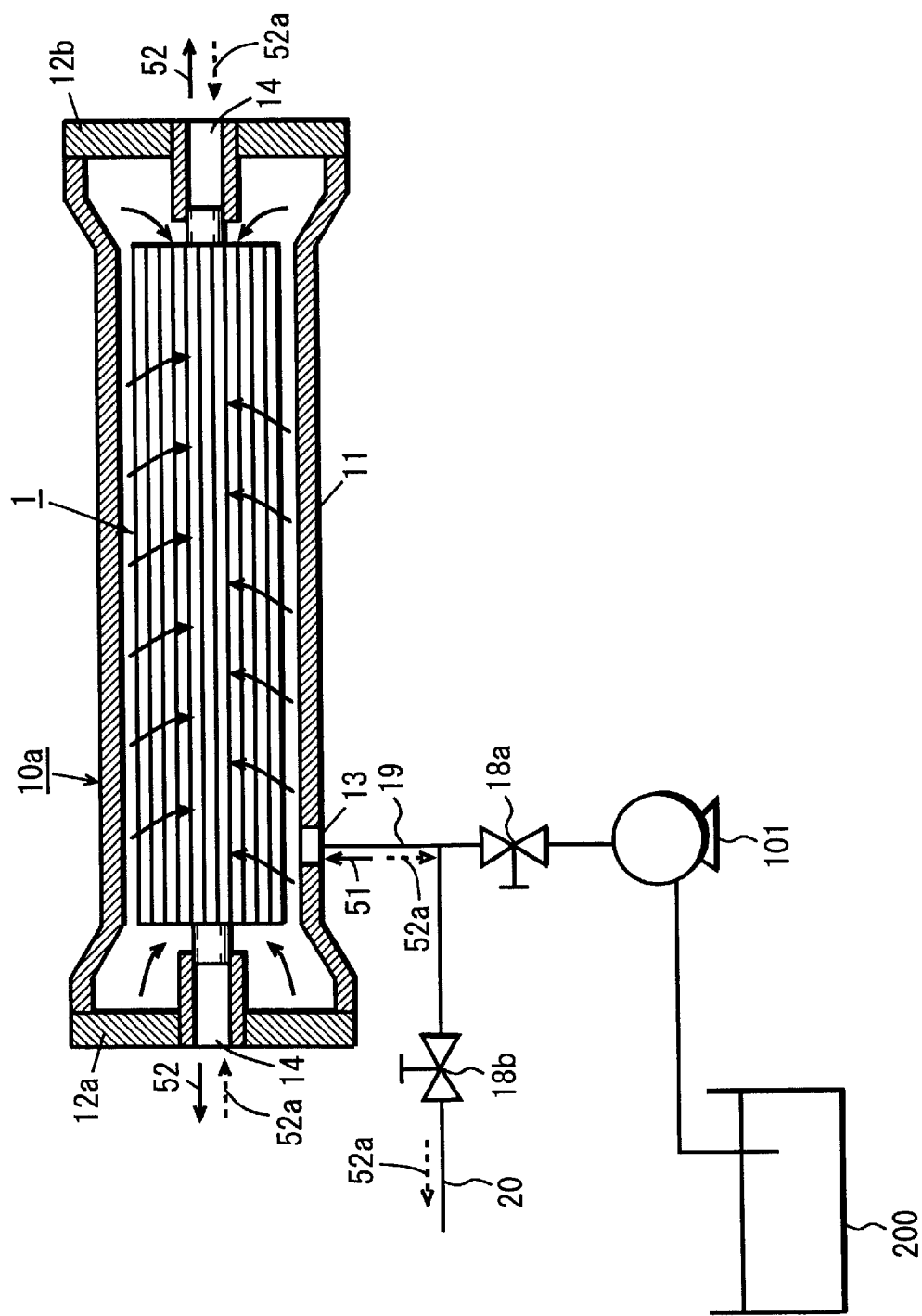
FIG. 19 is a sectional view showing an exemplary method of running a spiral wound type membrane module according to the fourth invention.

FIG. 19 is a sectional view showing an exemplary method of running a spiral wound type membrane module according to this invention. As shown in FIG. 19, a pressure vessel (pressure-resistant vessel) 10a of the spiral wound type membrane module is formed by a tubular case 11 and a pair of end plates 12a and 12b. A raw water inlet 13 is formed on an end of the bottom portion of the tubular case 11. Permeate outlets 14 are provided on the centers of the end plates 12a and 12b.

The tubular case 11 stores the spiral wound type membrane element 1 shown in FIG. 1, and both opening ends of the tubular case 11 are sealed with the end plates 12a and 12b respectively. Both ends of the water collection pipe 2 are engaged with the permeate outlets 14 of the end plates 12a and 12b respectively. Thus, the spiral wound type membrane module is formed by charging the pressure vessel 10a with the single spiral wound type membrane element 1.

The raw water inlet 13 on the bottom portion of the tubular case 11 is connected with a pipe 19. The pipe 19 is connected with a raw water tank 200 through a pressure pump 101, and further connected with another pipe 20. The pipes 19 and 20 are provided with valves 18a and 18b respectively.

In running of the spiral wound type membrane element 1, the valve 18a of the pipe 19 is opened and the valve 18b of the pipe 20 is closed. Raw water 51 collected from the raw water tank 200 is pressurized by the pressure pump 101, and introduced into the pressure vessel 10a from the raw water inlet 13 thereof through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 19, the raw water 51 infiltrates into the clearances between the envelope-like membranes 3 from the outer peripheral side and both ends of the spiral wound type membrane element 1. Permeate permeating through the separation membranes 7 flows into the water collection pipe 2 along the permeate spacers 6. Thus, permeate 52 is taken out from the permeate outlet 14 of the pressure vessel 10. Thus, dead end filtration is performed.

In this example, the valve 18a and the pipe 19 correspond to the supply system, and a pipe (not shown) connected to the permeate outlet 14 corresponds to the takeout system.

In this case, the outer peripheral surface of the spiral membrane component 1a is covered with the separation membrane 9 as shown in FIG. 1 whereby contaminants such as turbid substances larger than the pore size of the separation membrane 9 are captured on at least the outer peripheral portion of the spiral wound type membrane element 1. In other words, only contaminants smaller than the pore size of the separation film 9 infiltrate into the clearances between the envelope-like membranes 3. Thus, loads on the separation membranes 7 forming the envelope-like membranes 3 are reduced.

Figure 20:
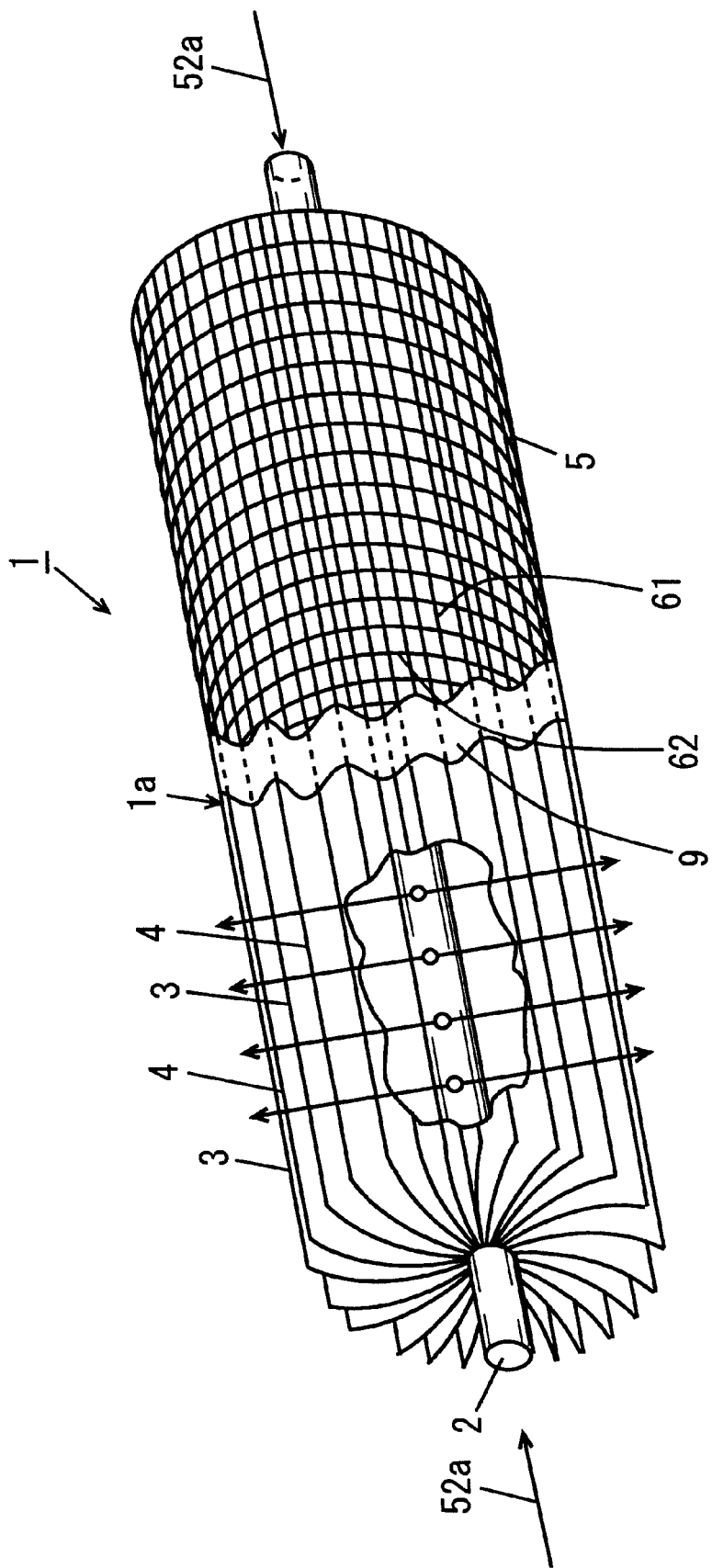
FIG. 20 is a partially fragmented perspective view showing back wash reverse filtration in a spiral wound type membrane element of the spiral wound type membrane module shown in FIG. 19.

After performing filtration for a constant period, back wash reverse filtration is performed from the permeation side with the permeate 52a. FIG. 20 is a partially fragmented perspective view showing back wash reverse filtration in the spiral wound type membrane element 1 of the spiral wound type membrane module shown in FIG. 19. In back wash reverse filtration, the valve 18a of the pipe 19 is closed and the valve 18b of the pipe 20 is opened for introducing the permeate 52a into the water collection pipe 2 from the permeate outlet 14 shown in FIG. 19. As shown in FIG. 20, the permeate 52a permeates through the envelope-like membranes 3 from the water collection pipe 2, separates contaminants adhering to the membrane surface, the raw water spacers 4 etc. and flows toward at least the outer peripheral portion along the raw water spacers 4. The permeate 52 readily separates contaminants captured on at least the outer peripheral portion of the spiral wound type membrane element 1. The separated contaminants are discharged from the raw water inlet 13 and the pipe 20 shown in FIG. 19 with the permeate 52a.

In this example, the pipe (not shown) connected to the permeate outlet corresponds to the introduction system, and the valve 18b and the pipes 19 and 20 correspond to the takeout system.

According to the aforementioned washing method, the contaminants adhering to the outer peripheral portion, the raw water spacers 4, the membrane surface etc. of the spiral wound type membrane element 1, particularly those adhering to the separation membrane 9 can be readily and reliably separated and the separated contaminants can be readily discharged along the outer peripheral passage forming member 5, whereby increase of the resistance of the separation membrane 9 can be suppressed. Thus, a stable permeate flow rate can be maintained. Further, handleability of the spiral wound type membrane element 1 is improved since the outer peripheral portion of the spiral wound type membrane element 1 is covered with the outer peripheral passage forming member 5 as shown in FIG. 11.

As shown in FIG. 19, further, no dead space such as the dead space S shown in FIG. 27 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element from all directions, whereby the spiral wound type membrane element 1 is not deformed and neither packing holders nor a protective sheath is required. Thus, the component cost and the manufacturing cost are reduced.

Further, it is not necessary to use a large pump for the pressure pump 101 supplying the raw water 51 due to dead end filtration. Thus, the system cost is reduced.

In washing, the permeate 52a discharged through the pipe 20 may be partially or entirely returned to the raw water tank 200 again. This case is now described.

Figure 21:
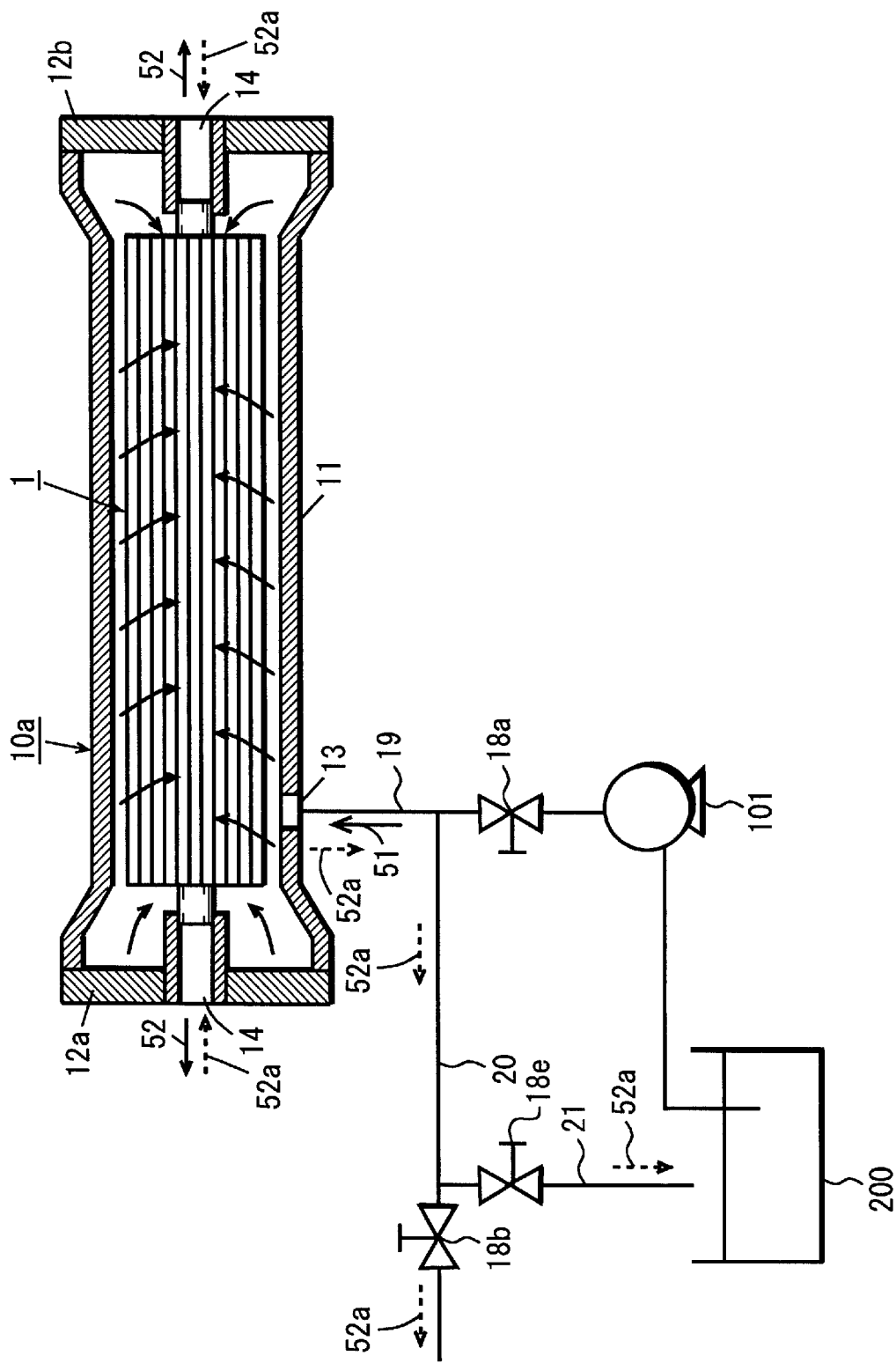
FIG. 21 is a sectional view showing another exemplary spiral wound type membrane module according to the fourth invention.

FIG. 21 is a sectional view showing another exemplary method of running a spiral wound type membrane module according to this invention. The spiral wound type membrane module shown in FIG. 21 is similar in structure to that shown in FIG. 19 except the following points:

As shown in FIG. 21, a pipe 21 is further provided upstream a valve 18b of a pipe 20. The pipe 21 is provided with a valve 18e.

In this examples a valve 18a of a pipe 19 is opened and the valves 18b and 18e of the pipes 20 and 21 are closed in running. In this case, dead end filtration is performed by a method similar to the method of running a spiral wound type membrane module shown in FIG. 19.

In washing, the valves 18b and 18e of the pipes 20 and 21 are opened and the valve 18a of the pipe 19 is closed. In this case, back wash reverse filtration is performed by a method similar to the method of washing a spiral wound type membrane module shown in FIG. 20, and permeate 52a employed for back wash reverse filtration is taken out from a pressure vessel 10 through a raw water inlet 13. This permeate 52a is guided to the pipe 20 through the pipe 19. In this example, further, the valve 18e of the pipe 21 is open so that part of the permeate 52a is guided from the pipe 20 to the pipe 21 and returned to a raw water tank 200 through the pipe 21. On the other hand, remaining permeate 52a is discharged through the pipe 20.

In this example , the pipes 19, 20 and 21 and the valve 18e correspond to the circulation system.

According to the method of running a spiral wound type membrane module in this example, effects similar to those in the case shown in FIG. 19 are attained in running and washing. In this example, further, it is possible to recover the permeate 52a employed for back wash reverse filtration to the raw water tank 200 in washing for supplying the same as raw water 51 again, whereby permeate 52 can be obtained from the spiral wound type membrane module with high recovery.

In washing, the valve 18b of the pipe 20 may be fully closed for entirely returning the permeate 52a employed for back wash reverse filtration to the raw water tank 200.

While the raw water inlet 13 is provided on an end of the bottom portion of the tubular case 11 in each of the spiral wound type membrane modules shown in FIGS. 19 and 21, the position of the raw water inlet 13 is not restricted to this. For example, the raw water inlet 13 may alternatively be provided on an end of the upper portion of the tubular case 11, or on the center of the upper portion or the bottom portion of the tubular case 11. Further, the raw water inlet 13 may be provided on the end plate 12a or 12b.

While dead end filtration is performed when running the spiral wound type membrane module and back wash reverse filtration is performed when washing the same in each of the aforementioned examples shown in FIGS. 19 and 21, part of the raw water 51 may be taken out from the pressure vessel 10a in running. Further, flushing may be performed with the raw water in washing. These cases are now described.

Figure 22:
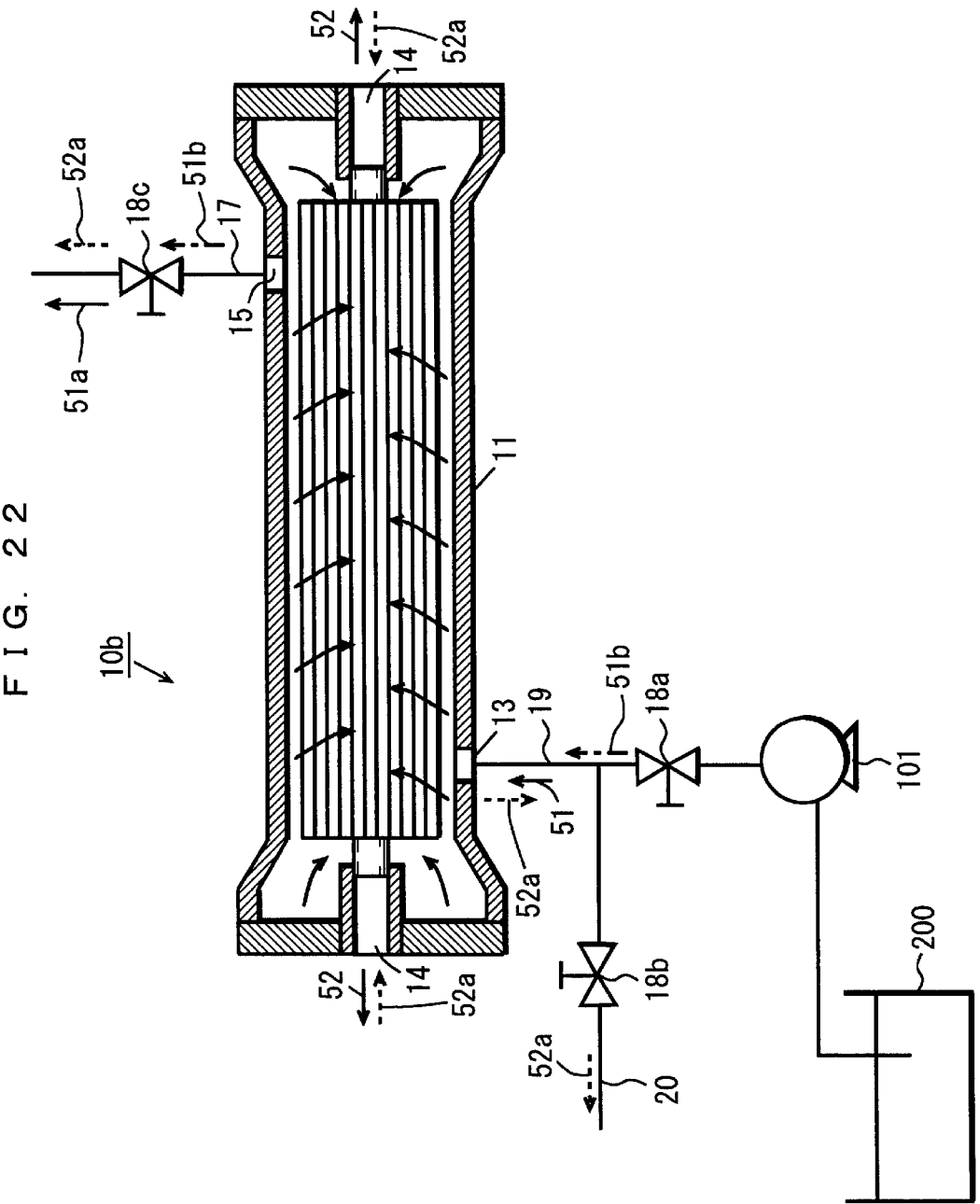
FIG. 22 is a sectional view showing still another exemplary method of running a spiral wound type membrane module according to the fourth invention.

FIG. 22 is a sectional view showing still another exemplary method of running a spiral wound type membrane module according to this invention. The spiral wound type membrane module shown in FIG. 22 is similar in structure to that shown in FIG. 19 except the following points:

In the spiral wound type membrane module shown in FIG. 22, a raw water outlet 15 is provided on an end of the upper portion of a tubular case 11 of a pressure vessel 10b. The raw water outlet 15 is connected with a pipe 17, which is provided with a valve 18c. The raw water outlet 15 is employed also for deairing.

In this example, a valve 18a of a pipe 19 and the valve 18c of the pipe 17 are opened and a valve 18b of a pipe 20 is closed in running. In this case, raw water 51 is introduced into the pressure vessel 10b from the raw water inlet 13 through the pipe 19, similarly to the example shown in FIG. 19.

In this example, partial raw water 51a axially flows along the outer peripheral portion of a spiral wound type membrane element 1 in the introduced raw water 51, and discharged from the raw water outlet 15 of the pressure vessel 10b through the pipe 17. The remaining raw water flows along an outer peripheral passage forming member 5 similarly to the example shown in FIG. 19, and filtrates into the clearances between envelope-like membranes 3 from the outer peripheral side and both ends of the spiral wound type membrane element 1, similarly to the example shown in FIG. 19. Permeate permeating through separation membranes 7 flows into a water collection pipe 2 along permeate spacers 6. Thus, permeate 52 is taken out from a permeate outlet 14 of the pressure vessel 10b.

In this example, the valve 18a and the pipe 19 correspond to the supply system, a pipe (not shown) connected to the permeate outlet 14 corresponds to the first takeout system, and the pipe 17 and the valve 18c correspond to the second takeout system.

In this example, a flow of the raw water 51 is axially formed along the outer peripheral portion of the spiral wound type membrane element 1, whereby part of contaminants contained in the raw water 51 can be discharged from the pressure vessel 10b with the raw water 51a while suppressing sedimentation of the contaminants.

When running the spiral wound type membrane module in this example, the valve 18c of the pipe 17 may be regularly or intermittently opened. When intermittently opening the valve 18c, the volume of the raw water 51a discharged from the raw water outlet 15 is suppressed, whereby the recovery of the permeate 52 is increased as compared with the case of regularly opening the valve 18c.

In washing, the valve 18a of the pipe 19 is closed and the valves 18b and 18c of the pipes 20 and 17 are opened for performing back wash reverse filtration by a method similar to the washing method shown in FIG. 20. In this case, the permeate 52a employed for back wash reverse filtration is discharged from the raw water inlet 13 and the raw water outlet 15 through the pipes 17 and 20.

In this case, the pipe (not shown) connected to the permeate outlet 14 corresponds to the introduction system, and the pipe 17 and the valve 18c correspond to the takeout system.

Thus, in this example, the permeate 52a is discharged from the raw water inlet 13 and the raw water outlet 15 on both ends of the pressure vessel 10b as shown in FIG. 22, whereby contaminants captured on the membrane surface, the outer peripheral portion etc. of the spiral wound type membrane element 1 can be efficiently separated and discharged by back wash reverse filtration. Further, the spiral wound type membrane module is quickly started when restarting running.

According to the aforementioned washing method, contaminants adhering to the outer peripheral portion, the raw water spacers 4, the membrane surface etc. of the spiral wound type membrane element 1, particularly those adhering to the separation membrane 9 can be readily separated and the contaminants can be readily discharged along the outer peripheral passage forming member 5, whereby increase of the resistance of the separation membrane 9 can be suppressed. Thus, a stable permeate flow rate can be regularly maintained.

Also in the aforementioned method of running a spiral wound type membrane module while taking out the partial raw water 51a in the supplied raw water 51, no dead space is defined in the clearance between the spiral wound type membrane element 1 and the pressure vessel 10b. Thus, high reliability is attained with no problems such as propagation of germs such as microorganisms, occurrence of a bad smell resulting from decomposition of organic matter and decomposition of the separation membranes 7 and 9.

Further, pressure is applied to the spiral wound type membrane element from all directions, whereby the spiral wound type membrane element 1 is not deformed and neither packing holders nor a protective sheath is required. Thus, the component cost and the manufacturing cost are reduced.

Further, it is not necessary to use a large pump for the pressure pump 101 supplying the raw water 51, whereby the system cost is reduced.

In the method of running a spiral wound type membrane module shown in FIG. 22, flushing may be performed with the raw water in washing. After performing the aforementioned back wash reverse filtration for example, the valve 18a of the pipe 19 is opened and the value 18b of the pipe 20 is closed for supplying the raw water 51b from the raw water inlet 13 through the pipe 19 and opening the valve 18c of the pipe 17. Thus, the supplied raw water 51b linearly flows axially along the outer peripheral passage forming member 5, for performing flushing.

In this example, the pipe 17 and the valve 18c correspond to the first and second takeout systems.

While the permeate 52a employed for back wash reverse filtration and the raw water 51b employed for flushing are taken out from the same raw water outlet 15 in the example shown in FIG. 22, the permeate 52a employed for back wash reverse filtration and the raw water 51b employed for flushing may alternatively be taken out from different outlets when the pressure vessel 10b has another outlet.

In washing, back wash reverse filtration and flushing are performed in the spiral wound type membrane element 1 as shown in FIG. 5. In this case, contaminants separated from the spiral wound type membrane element 1 by back wash reverse filtration are readily and reliably discharged from the raw water outlet 15 of FIG. 22 through the pipe 17 with the raw water 51b by flushing. Further, contaminants not separated by back wash reverse filtration but remaining on the outer peripheral portion, the raw water spacers 4, the membrane surface etc. of the spiral wound type membrane element 1 are readily and reliably separated and discharged from the raw water outlet 15 through the pipe 17 by flushing. As a result of the aforementioned back wash reverse filtration and flushing, the membrane flux is remarkably recovered as compared with that before washing, and the spiral wound type membrane module can be more stably run with higher reliability.

While flushing is performed with the raw water 51b after separating contaminants captured on the outer peripheral portion etc. of the spiral wound type membrane element 1 by back wash reveres filtration, back wash reverse filtration may alternatively be performed after performing flushing with the raw water 51b. In this case, most of contaminants captured on the membrane surface, the outer peripheral portion etc. of the spiral wound type membrane element 1 are removed by flushing, and contaminants remaining on the outer peripheral portion etc. of the spiral wound type membrane element 1 can be further removed by back wash reverse filtration. Alternatively, flushing with the raw water 51b may be performed simultaneously with back wash reverse filtration. Also in this case, effects similar to the above can be obtained.

In the method of running the aforementioned spiral wound type membrane module shown in FIG. 22, further, the partial raw water 51a taken out in running may be circulated to be returned to the raw water tank 100 again. This case is now described.

Figure 23:
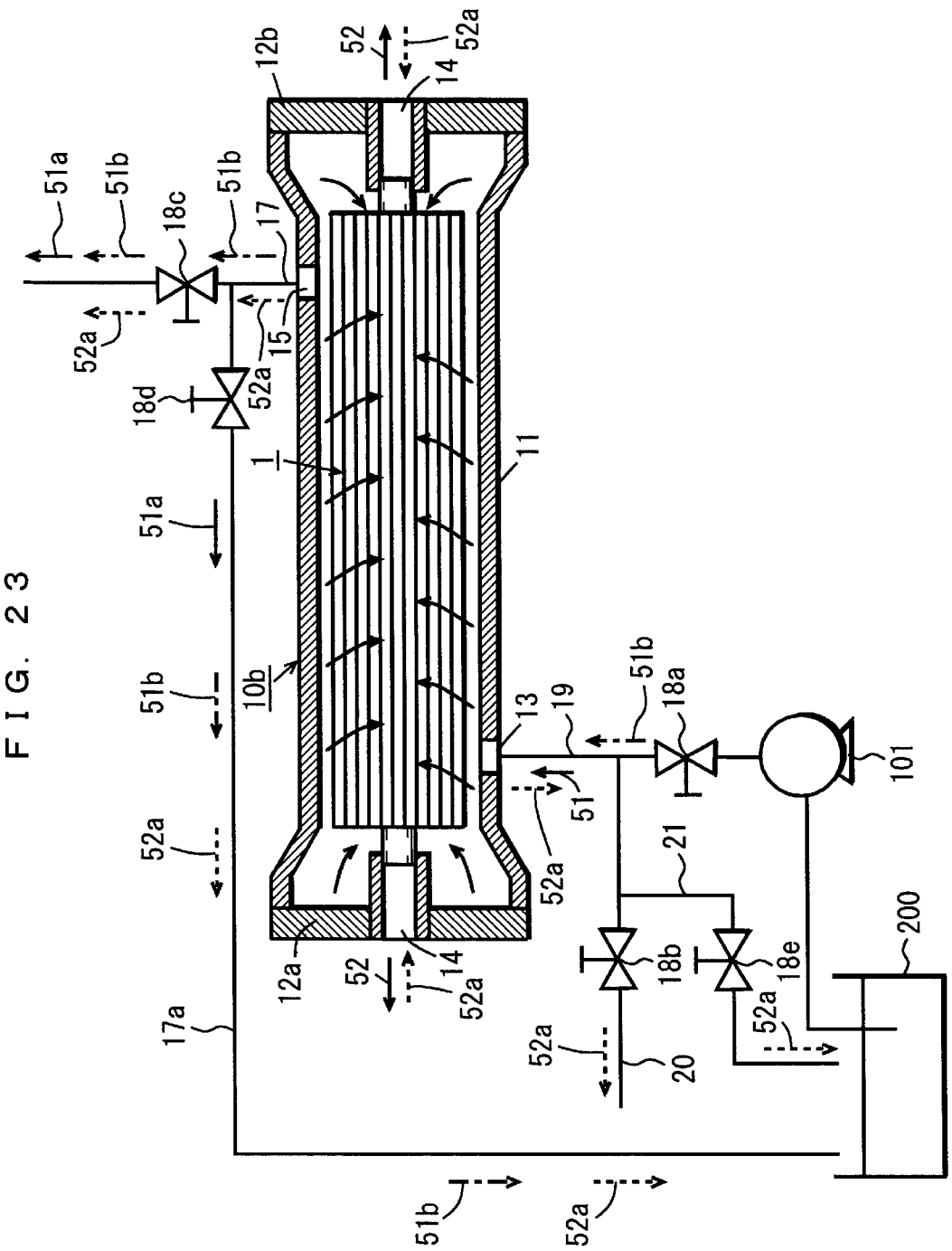
FIG. 23 is a sectional view showing a further exemplary method of running a spiral wound type membrane module according to the fourth invention.

FIG. 23 is a sectional view showing still another exemplary method of running a spiral wound type membrane module according to this invention. The spiral wound type membrane module shown in FIG. 23 is similar in structure to that shown in FIG. 22 except the following points:

A pipe 17a is further connected upstream a valve 18c of a pipe 17. Another pipe 21 is further connected upstream a valve 18b of a pipe 20. The pipes 17a and 21 are provided with valves 18d and 18b respectively, and the pipes 17a and 21 are further connected to a raw water tank 200.

In this example, the valves 18a and 18d of the pipes 19 and 17a are opened and the valves 18b and 18e of the pipes 20 and 21 and a valve 18c of a pipe 17 are closed in running. In this case, raw water 51 is introduced into a pressure vessel 10b from a raw water inlet 13 thereof through the pipe 19, similarly to the example shown in FIG. 22. In the raw water 51 introduced into the pressure vessel 10b, partial raw water 51a axially flows along the outer peripheral portion of a spiral wound type membrane element 1. In this example, the valve 18d of the pipe 17a is open, and hence the partial raw water 51a is taken out from the raw water outlet 15 of the pressure vessel 10b and thereafter returned to the raw water tank 200 through the pipe 17a. The remaining raw water is filtered by the spiral wound type membrane element 1 and taken out from a permeate outlet 14 of the pressure vessel 10b as permeate 52.

In this example, the pipe 17a and the valve 18d correspond to the circulation system.

In this example, a flow of the raw water 51a is axially formed along the outer peripheral portion of the spiral wound type membrane element 1 as shown in FIG. 23, whereby sedimentation of contaminants contained in the raw water can be suppressed. Further, the raw water 51a taken out from the raw water outlet 15 is circulated, whereby the permeate 52 can be obtained with higher recovery.

When running the spiral wound type membrane module according to this example, the valve 18d of the pipe 17a may be regularly or intermittently opened. Thus, a flow of the raw water 51a can be regularly or intermittently formed axially along the outer peripheral portion of the spiral wound type membrane element 1.

In this example, further, the valve 18d of the pipe 17a may be opened while opening the valve 18c of the pipe 17. Thus, part of the raw water 51a taken out from the raw water outlet 15 can be discharged through the pipe 17 and the remaining raw water 51a can be returned to the raw water tank 200. In this case, part of contaminants can be discharged from the pressure vessel 10b with the raw water 51a.

In washing, on he other hand, the valves 18a, 18b and 18c of the pipes 19, 20 and 17 are closed and the valves 18d and 18e of the pipes 17a and 21 are closed for performing back wash reverse filtration by a method similar to that in the example shown in FIG. 22. In this case, permeate 52a employed for back wash reverse filtration is taken out from the raw water inlet 13 and the raw water outlet 15 and thereafter returned to the raw water tank 200 again through the pipes 21 and 17a.

In this examples, the pipe 17a and the valve 18d correspond to the circulation system.

Thus, in this example, the permeate 52a can be taken out from the raw water inlet 13 and the raw water outlet 15 provided on both ends of the pressure vessel 10b, whereby contaminants captured on the membrane surface, the outer peripheral portion etc. of the spiral wound type membrane element 1 can be efficiently separated and discharged from the pressure vessel 10b by back wash reverse filtration while the spiral wound type membrane module can be quickly started when restarting running. Further, the permeate 52a employed for back wash reverse filtration can be recovered to the raw water tank 200 to be supplied as the raw water 51 again, whereby the permeate 52 can be obtained with high recovery.

According to the method of running a spiral wound type membrane module in this example, as hereinabove described, effects similar to those in the method of running a spiral wound type membrane module shown in FIG. 22 can be attained in running and washing. In this example, further, the raw water 51a and the permeate 52a taken out from the pressure vessel 10b are returned to the raw water tank 200, whereby the permeate 52 can be obtained with high recovery.

In the method of running a spiral wound type membrane module shown in FIG. 23, flushing with the raw water may be performed in washing. In this case, the aforementioned back wash reverse filtration is performed, for example, and thereafter the valve 18a of the pipe 19 is opened while the valves 18b and 18e of the pipes 20 and 21 are closed for supplying raw water 51b from the raw water inlet 13 through the pipe 19. In this case, the raw water 51b employed for flushing is returned to the raw water tank 200 through the pipe 17a. Contaminants can be readily and reliably separated and discharged by such back wash reverse filtration and flushing. Thus, the membrane flux of the spiral wound type membrane module is remarkably recovered as compared with that before washing, and the spiral wound type membrane module can be more stably run with higher reliability.

While flushing is performed after back wash reverse filtration in the above description, flushing may alternatively be performed before or simultaneously with back wash reverse filtration. Also in this case, effects similar to the above can be attained.

In washing, the valves 18b and 18c of the pipes 20 and 17 may be opened for discharging part of the permeate 52a employed for back wash reverse filtration or part of the raw water 51b employed for flushing through the pipes 20 and 17. In this case, separated contaminants can be discharged with the permeate 52a or the raw water 51b through the pipes 17 and 20.

While the raw water inlet 13 and the raw water outlet 15 are provided on both ends of the pressure vessel 10b in each of the spiral wound type membrane modules shown in FIGS. 22 and 23, the positions of the raw water inlet 13 and the raw water outlet 15 are not restricted to these.

While the method of running a spiral wound type membrane module according to this invention is applied the spiral wound type membrane module formed by charging the pressure vessel 10b with the single spiral wound type membrane element 1 in the above description, the method of running a spiral wound type membrane module according to this invention is also applicable to a spiral wound type membrane module formed by charging a pressure vessel with a plurality of spiral wound type membrane elements. The method of running such a spiral wound type membrane module is now described.

Figure 24:
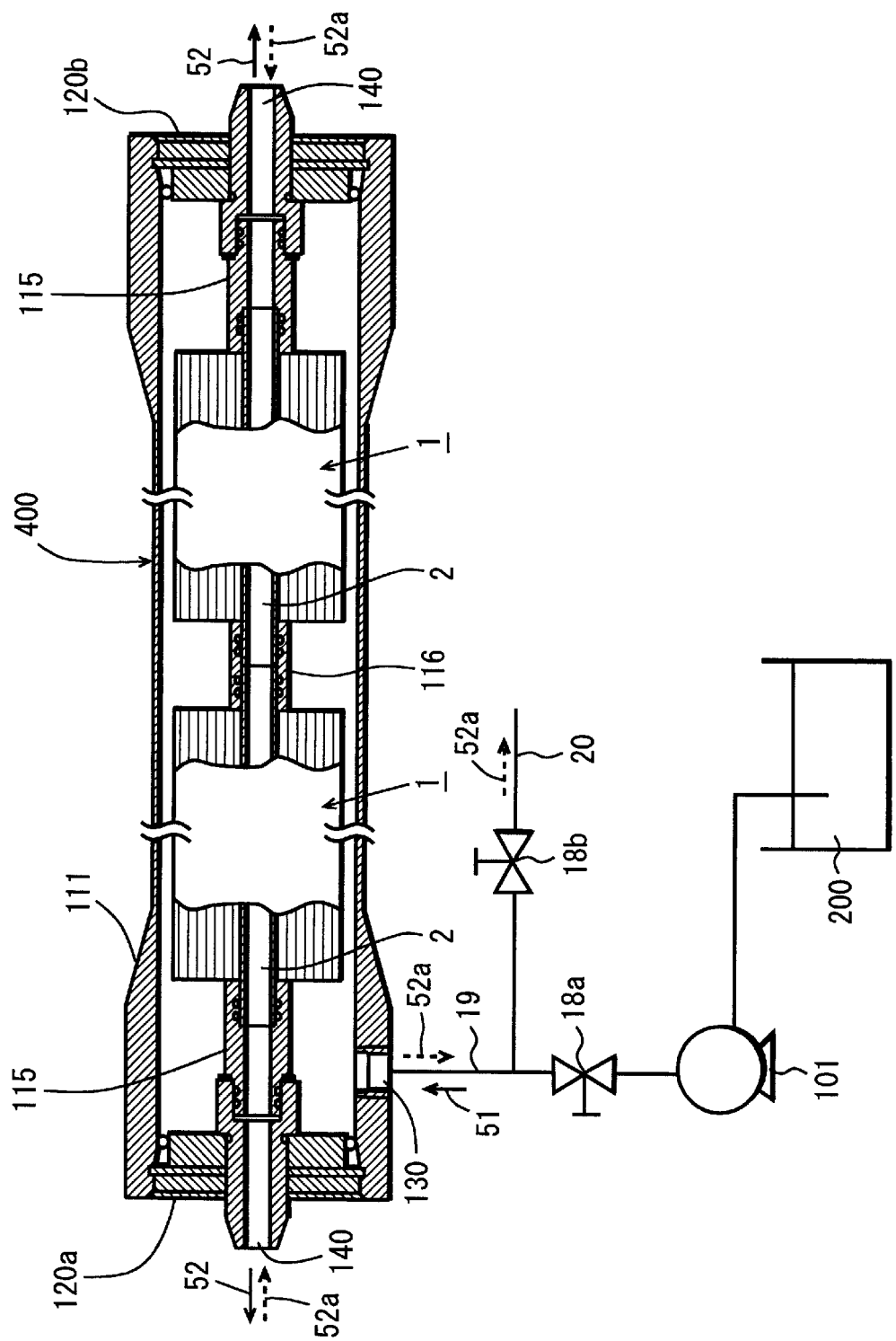
FIG. 24 is a sectional view showing a further exemplary method of running a spiral wound type membrane module according to the fourth invention
Figure 25:
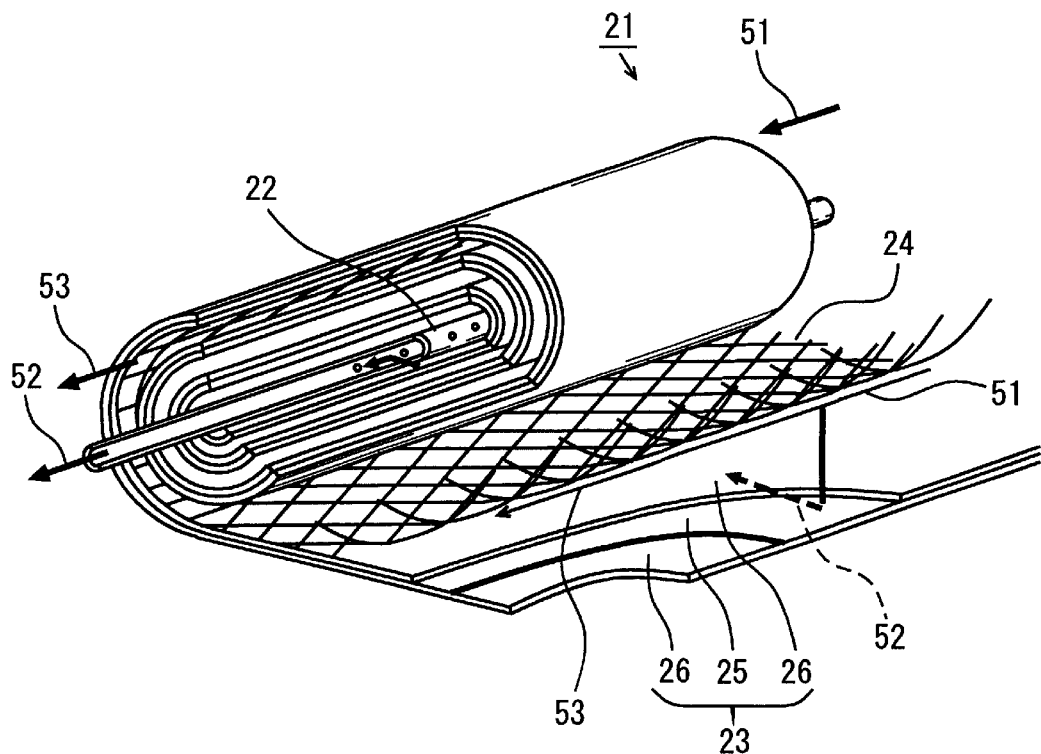
FIG. 25 is a partially fragmented perspective view showing a conventional spiral wound type membrane element.
Figure 26:
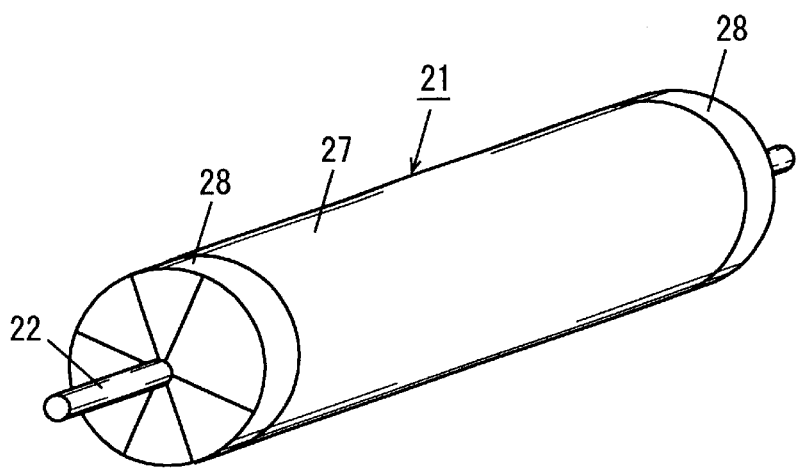
FIG. 26 is a perspective view showing the appearance of the conventional spiral wound type membrane element.

FIG. 24 is a sectional view showing a further exemplary method of running a spiral wound type membrane module according to this invention. The method of running a spiral wound type membrane module shown in FIG. 24 is similar to that shown in FIG. 19 except the following points:

As shown in FIG. 24, a pressure vessel 400 is formed by a tubular case 111 and a pair of end plates 120a and 120b. A raw water inlet 130 is formed on the bottom portion of the tubular case 111, and a deairing port (not shown) is formed on the upper portion. Permeate outlets 140 are provided on the central portions of the end plates 120a and 120b.

The tubular case 111 stores a plurality of spiral wound type membrane elements 1 having water collection pipes 2 serially coupled with each other by an interconnector 116, and both opening ends of the tubular case 111 are sealed with the end plates 120a and 120b respectively. Single end portions of the water collect ion pipes 2 of the spiral wound type membrane elements 1 located on both end portions are engaged with the permeate outlets 140 of the end plates 120a and 120b through adapters 115 respectively. Thus, a spiral wound type membrane module is formed by charging the pressure vessel 400 with the plurality of spiral wound type membrane elements 1.

When running the aforementioned spiral wound type membrane module, raw water 51 is introduced into the pressure vessel 400 from the raw water inlet 130 of the pressure vessel 400 through the pipe 19. The raw water 51 flows along an outer peripheral passage forming member 5 of each spiral wound type membrane element 1. In each spiral wound type membrane element 1, the raw water 51 permeates through a separation membrane 9 from at least the outer peripheral side and infiltrates into the clearances between envelope-like membranes 3 along raw water spacers 4. Permeate permeating through separation membranes 7 flows into a water collection pipe 7 along permeate spacers 6, and permeate 52a is taken out from the permeate outlets 140 provided on both ends of the pressure vessel 400.

After performing filtration for a constant time, back wash reverse filtration is performed from the permeation side with permeate 52a. In the back wash reverse filtration, the permeate 52a is introduced into the water collection pipe 2 of each spiral wound type membrane element 1 from the permeate outlets 140 provided on both ends of the pressure vessel 400. In each spiral would type membrane element 1, the permeate 52a permeates through the envelope-like membranes 3 from the water collection pipe 2, separates contaminants from the membrane surface and flows toward at least the outer peripheral portion along the raw water spacers 4, as shown in FIG. 20. The permeate 52a readily separates contaminants captured on at least the outer peripheral portion of each spiral wound type membrane element 1. The separated contaminants are discharged from the raw water inlet 130 through the pipe 20 with the permeate 52a.

In this example, as hereinabove described, the raw water 51 is supplied from at least the outer peripheral side of each spiral wound type membrane element 1 in running for performing dead end filtration in each spiral wound type membrane element 1, similarly to the example shown in FIG. 19. In this case, contaminants contained in the raw water 51 are captured on at least the outer peripheral portion in each spiral wound type membrane element 1. Therefore, loads on the separation membranes 7 forming the envelope-like membranes 3 are reduced.

Further, contaminants adhering to the membrane surface, the raw water spacers 4, the outer peripheral portion etc. of each spiral wound type membrane element 1 can be readily separated and readily discharged along the outer peripheral passage forming member 5 in washing, whereby a stable permeate flow rate can be maintained.

In addition, the spiral wound type membrane module is charged with the plurality of spiral wound type membrane elements 1, whereby the spiral wound type membrane module has a large capacity of treatment and the permeate 52 can be efficiently obtained.

As shown in FIG. 24, no dead space is defined in the clearance between each spiral wound type membrane element 1 and the pressure vessel 400 due to the aforementioned filtration mode, whereby high reliability is attained with no problems such as propagation of germs such as microorganisms, occurrence of a bad smell resulting from decomposition of organic matter and decomposition of the separation membranes 7.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for the pressure pump 101 supplying the raw water 51 due to dead end filtration. Thus, the system cost is reduced.

While the running method similar to that shown in FIG. 19 is applied to the spiral wound type membrane module formed by charging the pressure vessel 400 with the plurality of spiral wound type membrane elements 1 in the above description, a running method similar to the methods of running spiral wound type membrane modules shown in FIGS. 21 to 23 can be applied to the spiral wound type membrane module charged with the plurality of spiral wound type membrane elements 1.

While each of the spiral wound type membrane modules shown in FIGS. 19 and 21 to 24 is horizontally set, the method of setting the spiral wound type membrane module is not restricted to the horizontal one. The spiral wound type membrane module may alternatively be vertically set or set in an inclined manner, for example. However, a setting method capable of efficiently removing contaminants adhering to the membrane surface, the outer peripheral portion etc. of each spiral wound type membrane element 1 is preferable.

While both ends of the water collection pipe 2 are open and the permeate 52 is taken out from the permeate outlets 14 or 140 provided on both ends of the pressure vessel 10a, 10b or 400 in each of the spiral wound type membrane modules shown in FIGS. 19 and 21 to 24, an end of the water collection pipe 2 may alternatively be sealed. In this case, a permeate outlet is provided on one end plate of the pressure vessel, for example, so that the opening end of the water collection pipe 2 is engaged with this permeate outlet.

While the spiral wound type membrane element 1 shown in FIG. 1 is employed in each of the aforementioned examples shown in FIGS. 19 and 21 to 24, a spiral wound type membrane element such as that shown in FIG. 7(*a*), 7(*b*), 8 or 13 described above with reference to the first invention, for example, can be employed in the spiral wound type membrane module according to this invention, in addition to the spiral wound type membrane element 1 shown in FIG. 1. Also in this case, effects similar to those in the case of employing the spiral wound type membrane element 1 shown in FIG. 1 can be attained.

As a further example of the spiral wound type membrane module according to this invention, the case of employing the spiral wound type membrane element 1 shown in FIG. 8 is now described.

When running a spiral wound type membrane module having the spiral wound type membrane element 1 shown in FIG. 8 by a running method similar to that shown in each of FIGS. 19 and 21 to 24, the outer peripheral surface of the spiral membrane component 1a is covered with the net 8 as shown in FIG. 8 and hence contaminants such as turbid substances larger than the pore size of the net 8 are captured on at least the outer peripheral portion of the spiral wound type membrane element 1 in filtration of the spiral wound type membrane module. In other words, only contaminants larger than the pore size of the net 8 infiltrate into the clearances between the envelope-like membranes 3. Thus, loads on the separation membranes 7 forming the envelope-like membranes 3 are reduced.

Further, contaminants adhering to the membrane surface, the raw water spacers 4, the outer peripheral portion etc., particularly the net 8 of the spiral wound type membrane element 1 can be readily separated and readily discharged along the outer peripheral passage forming member 5 by back wash reverse filtration, whereby increase of the resistance of the net 8 can be suppressed. Thus, a stable permeate flow rate can be maintained.

Also when applying the running method according to this invention to a spiral wound type membrane module having the spiral wound type membrane element 1 shown in FIG. 8, effects similar to those in the case of applying the same to the spiral wound type membrane module having the spiral wound type membrane element shown in FIG. 1 can be attained.

In the spiral wound type membrane element 1 shown in FIG. 8, the outer peripheral surface of the spiral membrane component 1a is covered with the net 8, whereby the spiral membrane component 1a is prevented from swelling by the net 8 covering the outer peripheral portion so that the clearances between the envelope-like membranes 3 are not enlarged even if back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

While the invention has been described in detail, the foregoing description is in all aspects illustrative and not restrictive. It is understood that numerous other modifications and variations can be devised without departing from the scope of the invention.

What is claimed is:

1. A method of running a spiral wound membrane element for dead-end filtration, said spiral membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said spiral membrane element being disposed in a pressure vessel to allow raw liquid to flow through a continuous space extending from one end of the spiral membrane element to a second end of the spiral membrane element between an outermost peripheral surface of the membrane element and the pressure vessel, said method comprising steps of:

supplying a raw liquid containing an amount of contaminants from at least an outer peripheral side of said spiral wound membrane element;

flowing the raw liquid through the outer peripheral passage forming member to the outer peripheral portion of the spiral membrane component;

separating contaminants from the raw liquid with the spiral membrane component by dead-end filtration, thereby producing a captured contaminants component and a permeate liquid;

routing the permeate liquid from the spiral membrane component to the perforated hollow pipe and removing the permeate liquid from at least one opening end of said perforated hollow pipe; and introducing a washing liquid from at least one opening end of said perforated hollow pipe and discharging said washing liquid derived from the outer peripheral surface of said perforated hollow pipe from at least the outer peripheral portion of said spiral wound membrane element to remove the contaminants component.

2. The method of running a spiral wound membrane element according to claim 1, further comprising a step of discharging said washing liquid from at least the outer peripheral portion of said spiral wound membrane element and thereafter axially feeding a raw liquid along the outer peripheral portion of said spiral wound membrane element in washing.

3. The method of running a spiral wound membrane element according to claim 1, further comprising a step of axially feeding a raw liquid along the outer peripheral portion of said spiral wound membrane element before introducing said washing liquid from at least one opening end of said perforated hollow pipe.

4. The method of running a spiral wound membrane element according to claim 1, further comprising a step of axially feeding a raw liquid along the outer peripheral portion of said spiral wound membrane element in parallel with introduction of said washing liquid from at least one opening end of said perforated hollow pipe.

5. The method of running a spiral wound membrane element according to claim 4, wherein
   said spiral wound membrane component further includes a permeate passage forming member inserted in said envelope-like membranes and extended outward from side portions of said envelope-like membranes closer to the outer peripheral portion, the extended portion of said permeate passage forming member being wound around the outer peripheral surface of said spiral membrane component as said net.

6. The method of running a spiral wound membrane element according to claim 1, wherein said liquid-permeable material of said spiral wound membrane element is a separation membrane.

7. The method of running a spiral wound membrane element according to claim 1, wherein
   the thickness of said outer peripheral passage forming member of said spiral wound membrane element is at least 0.6 mm and not more than 30 mm.

8. The method of running a spiral wound membrane element according to claim 1, wherein
   said outer peripheral passage forming member is so arranged that a raw liquid substantially linearly flows in a direction substantially parallel to the axial direction of said perforated hollow pipe in said spiral wound membrane element.

9. The method of running a spiral wound membrane element according to claim 1, wherein
   said discharging step includes using the permeated liquid as said washing liquid.

10. A method of running a spiral wound membrane element for dead-end filtration,
    said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
    said spiral membrane element being disposed in a pressure vessel to allow raw liquid to flow through a continuous space extending from one end of the spiral membrane element to a second end of the spiral membrane element between an outermost peripheral surface of the membrane element and the pressure vessel,
    said method comprising steps of:
      supplying a raw liquid containing an amount of contaminants from at least an outer peripheral side of said spiral wound membrane element;
      flowing the raw liquid through the outer peripheral passage forming member to the outer peripheral portion of the spiral membrane component;
      separating contaminants from the raw liquid with the spiral membrane component by dead-end filtration, thereby producing a captured contaminants component and a permeate liquid;
      routing the permeate liquid from the spiral membrane component to the perforated hollow pipe; and
      removing the permeate liquid from at least one opening end of said perforated hollow pipe.

11. The method of running a spiral wound membrane element according to claim 10, further comprising a step of introducing a washing liquid from at least one opening end of said perforated hollow pipe and discharging said washing liquid derived from the outer peripheral surface of said perforated hollow pipe from at least the other peripheral portion of said spiral wound membrane element in washing.

12. A method of running a spiral wound membrane elememt for dead-end filtration,
    said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering outer peripheral portion of said spiral membrane component and an outer peripheral passage forming member entirely or partially covering the outer peripheral surface of said liquid-permeable membrane,
    said spiral membrane element being disposed in a pressure vessel to allow raw liquid to flow through a continuous space extending from one end of the spiral membrane element to a second end of the spiral membrane element between an outermost peripheral surface of the membrane element and the pressure vessel,
    said method comprising steps of:
      supplying a raw liquid containing an amount of contaminants from at least an outer peripheral side of said spiral wound membrane element while regularly or periodically feeding a partial raw liquid axially along the outer peripheral portion of said spiral wound membrane element;
      flowing the raw liquid through the outer peripheral passage forming member to the outer peripheral portion of the spiral membrane component;
      separating contaminants from the raw liquid with the spiral membrane component by dead-end filtration, thereby producing a captured contaminants component and a permeate liquid;
      routing the permeate liquid from the spiral membrane component to the perforated hollow pipe; and routing permeate from the outer peripheral portion of the spiral wound membrane element to the perforated hollow pipe; and removing the permeate liquid from at least one opening end of said perforated hollow pipe.

13. The method of running a spiral wound membrane element according to claim 12, wherein said supplying step further comprises a step of returning said partial raw liquid to the outer peripheral side of said spiral wound membrane element.

14. A method of running a spiral wound membrane module for dead-end filtration comprising a pressure vessel having a raw liquid inlet and one or a plurality of spiral wound membrane elements stored in said pressure vessel, said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said spiral membrane element being disposed in a pressure vessel to allow raw liquid to flow through a continuous space extending from one end-of the spiral membrane element to a second end of the spiral membrane element between an outermost peripheral surface of the membrane element and the pressure vessel, said method comprising steps of:

supplying a raw liquid containing an amount of contaminants from at least an outer peripheral side of said spiral wound membrane element through said raw liquid inlet of said pressure vessel;

flowing the raw liquid through the outer peripheral passage forming member to the outer peripheral portion of the spiral membrane component;

separating contaminants from the raw liquid with the spiral membrane component by dead-end filtration, thereby producing a captured contaminants component and a permeate liquid;

routing the permeate liquid from the spiral membrane component to the perforated hollow pipe; and removing the permeate liquid from at least one opening end of said perforated hollow pipe.

15. A method of running a spiral wound membrane module for dead-end filtration comprising a pressure vessel having a raw liquid inlet and a raw liquid outlet and one or a plurality of spiral wound membrane elements stored in said pressure vessel, said spiral wound membrane element comprising a spiral membrane component including a perforated hollow pipe,a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said spiral membrane element being disposed in a pressure vessel to allow raw liquid to flow through a continuous space extending from one end of the spiral membrane element to a second end of the spiral membrane element between an outermost peripheral surface of the membrane element and the pressure vessel, said method comprising steps of:

supplying a raw liquid containing an amount of contaminants from at least an outer peripheral side of said spiral wound membrane element through said raw liquid inlet of said pressure vessel while regularly or periodically feeding a partial raw liquid axially along the outer peripheral portion of said spiral wound membrane element for removing said partial raw liquid from said pressure vessel through said raw liquid outlet;

flowing the raw liquid through the outer peripheral passage forming member to the outer peripheral portion of the spiral membrane component;

separating contaminants from the raw liquid with the spiral membrane component by dead-end filtration, thereby producing a captured contaminants component and a permeate liquid;

routing the permeate liquid from the spiral membrane component to the perforated hollow pipe; and removing the permeate liquid from at least one opening end of said perforated hollow pipe.

16. The method of running a spiral wound membrane module according to claim 15, wherein said supplying step further comprises a step of supplying through the raw liquid inlet a raw liquid removed from said pressure vessel.

17. A method of running a spiral wound membrane module for dead-end filtration comprising a pressure vessel having a raw liquid inlet and one or a plurality of spiral wound membrane elements stored in said pressure vessel, said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said spiral membrane element being disposed in a pressure vessel to allow raw liquid to flow through a continuous space extending from one end of the spiral membrane element to a second end of the spiral membrane element between an outermost peripheral surface of the membrane element and the pressure vessel, said method comprising steps of:

supplying a raw liquid containing an amount of contaminants, and having a supply pressure from at least an outer peripheral side of said spiral wound membrane element at a constant flow rate through said raw liquid inlet of said pressure vessel;

flowing the raw liquid through the outer peripheral passage forming member to the outer peripheral portion of the spiral membrane component;

separating contaminants from the raw liquid with the spiral membrane component by dead-end filtration, thereby producing a captured contaminants component and a permeate liquid;

routing the permeate liquid from the spiral membrane component to the perforated hollow pipe; and removing the permeate liquid from at least one opening end of said perforated hollow pipe.

18. The method of running a spiral wound membrane module according to claim 17, wherein
said supplying step further comprises a step of controlling the supply pressure for said raw liquid thereby controlling a flow rate of said raw liquid constant.

19. The method of running a spiral wound membrane module according to claim 17, wherein
a pressure pump is provided on a raw liquid supply side of said spiral wound membrane module, and
said supplying step further comprising a step of controlling the flow rate of said raw liquid constant by controlling an output of said pressure pump.

20. The method of running a spiral wound membrane module according to claim 17, wherein
said pressure vessel further has a raw liquid outlet and said supplying step further comprising a step of regularly or intermittently removing part of said raw liquid from said pressure vessel through said raw liquid outlet and returning at least part of the removed raw liquid to the raw liquid supply side.

21. A method of running a spiral wound membrane module for dead-end filtration comprising a pressure vessel having a raw liquid inlet and one or a plurality of spiral wound membrane elements stored in said pressure vessel,
said spiral wound membrane element comprising a spiral membrane component including a perforated hollow pipe a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said spiral membrane element being disposed in a pressure vessel to allow raw liquid to flow through a continuous space extending from one end of the spiral membrane element to a second end of the spiral membrane element between an outermost peripheral surface of the membrane element and the pressure vessel,
said method comprising steps of:
supplying a raw liquid containing an amount of contaminants, and having a supply pressure and a flow rate, from at least an outer peripheral side of said spiral wound membrane element through said raw liquid inlet of said pressure vessel;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe.

22. The method of running a spiral wound membrane module according to claim 21, wherein
said supplying step further comprises a step of controlling the flow rate of said permeated liquid constant by controlling the supply pressure or the supply flow rate of said raw liquid.

23. The method of running a spiral wound membrane module according to claim 21, wherein
a pressure pump having a pump output is provided on a raw liquid supply side of said spiral wound membrane module, and
said supplying step further comprises a step of controlling the flow rate of said permeated liquid constant by controlling the output of said pressure pump.

24. A method of running a spiral wound membrane module for dead-end filtration comprising a pressure vessel and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, wherein said pressure vessel has one or a plurality of liquid ports,
said spiral membrane element being disposed in a pressure vessel to allow raw liquid to flow through a continuous space extending from one end of the spiral membrane element to a second end of the spiral membrane element between an outermost peripheral surface of the membrane element and the pressure vessel,
said method comprising steps of:
supplying a raw liquid having an amount of contaminants from at least an outer peripheral side of said spiral wound membrane element through any one of said one or a plurality of liquid ports;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe.

25. A method of running a spiral wound membrane module for dead-end filtration comprising a pressure vessel and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable material covering the outer peripheral portion of said spiral membrane component and an outer peripheral passage forming member entirely or partially covering the outer peripheral surface of said liquid-permeable material, wherein said pressure vessel has a plurality of liquid ports,
said spiral membrane element being disposed in a pressure vessel to allow raw liquid to flow through a continuous space extending from one end of the spiral membrane element to a second end of the spiral membrane element between an outermost peripheral surface of the membrane element and the pressure vessel, said method comprising steps of:
supplying a raw liquid having an amount of contaminants from at least an outer peripheral side of said spiral wound membrane element through any one of said plurality of liquid ports of said pressure vessel;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
removing part of said raw liquid from said pressure vessel through another one of said plurality of liquid ports regularly or intermittently.

26. The method of running a spiral wound membrane module according to claim 25, wherein said supplying step includes a step of returning at least part of said raw liquid taken out from said pressure vessel to the supply side again.

* * * * *